(12) United States Patent
Kanki et al.

(10) Patent No.: US 11,065,844 B2
(45) Date of Patent: Jul. 20, 2021

(54) LAMINATED GLASS

(71) Applicant: NIPPON SHEET GLASS COMPANY, LIMITED, Tokyo (JP)

(72) Inventors: Satoshi Kanki, Tokyo (JP); Takahiro Asai, Tokyo (JP); Hisashi Ogawa, Tokyo (JP); Hisashi Asaoka, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/830,863

(22) Filed: Mar. 26, 2020

(65) Prior Publication Data
US 2020/0238662 A1 Jul. 30, 2020

Related U.S. Application Data

(63) Continuation of application No. 16/277,408, filed on Feb. 15, 2019, now abandoned, which is a
(Continued)

(30) Foreign Application Priority Data

Feb. 14, 2014 (JP) ................. 2014-027049
Feb. 14, 2014 (JP) ................. 2014-027050
(Continued)

(51) Int. Cl.
*B32B 17/06* (2006.01)
*B60J 1/00* (2006.01)
(Continued)

(52) U.S. Cl.
CPC ........ *B32B 17/06* (2013.01); *B32B 17/10036* (2013.01); *B32B 17/10633* (2013.01);
(Continued)

(58) Field of Classification Search
CPC .............. B32B 17/06; B32B 17/10036; B32B 17/10633; B32B 17/10761;
(Continued)

(56) References Cited

U.S. PATENT DOCUMENTS

| | | | |
|---|---|---|---|
| 4,583,815 A | 4/1986 | Taga et al. | |
| 2002/0150744 A1 | 10/2002 | Nagai | |

(Continued)

FOREIGN PATENT DOCUMENTS

| | | | |
|---|---|---|---|
| JP | 59-7043 A | 1/1984 | |
| JP | 4-74737 A | 3/1992 | |

(Continued)

OTHER PUBLICATIONS

Fisher et al., WO 2013181484, May 12, (Year: 2013).*
(Continued)

*Primary Examiner* — Lawrence D Ferguson
(74) *Attorney, Agent, or Firm* — Birch, Stewart, Kolasch & Birch, LLP

(57) ABSTRACT

A laminated glass according to the present invention includes an outer glass sheet, an inner glass sheet that is arranged opposite to the outer glass sheet and has a smaller thickness than that of the outer glass sheet, and an interlayer sandwiched between the outer glass sheet and the inner glass sheet. A transmittance with respect to light having a wavelength of 850 to 950 nm is 30 to 80%. The outer glass sheet has a thickness of 1.8 to 2.3 mm. The inner glass sheet has a thickness of 0.6 to 2.0 mm. The interlayer includes a plurality of layers including at least a core layer. The core layer has a Young's modulus of 1 to 20 MPa at a frequency of 100 Hz and a temperature of 20° C., the Young's modulus being lower than the Young's modulus of the other layer.

8 Claims, 22 Drawing Sheets

Related U.S. Application Data continuation of application No. 15/118,735, filed as application No. PCT/JP2015/054044 on Feb. 13, 2015, now Pat. No. 10,252,492.

(30) Foreign Application Priority Data

| | | |
|---|---|---|
| Feb. 27, 2014 | (JP) | 2014-037626 |
| Mar. 4, 2014 | (JP) | 2014-042214 |
| Mar. 4, 2014 | (JP) | 2014-042215 |
| Mar. 4, 2014 | (JP) | 2014-042217 |
| Mar. 6, 2014 | (JP) | 2014-043802 |
| Mar. 6, 2014 | (JP) | 2014-044445 |
| Mar. 7, 2014 | (JP) | 2014-044705 |

(51) Int. Cl.
  *B60J 1/02* (2006.01)
  *C03C 27/10* (2006.01)
  *B32B 17/10* (2006.01)

(52) U.S. Cl.
  CPC ......... *B32B 17/10761* (2013.01); *B60J 1/001* (2013.01); *B60J 1/008* (2013.01); *B60J 1/02* (2013.01); *C03C 27/10* (2013.01); *B32B 2307/102* (2013.01); *B32B 2307/412* (2013.01); *B32B 2307/56* (2013.01); *B32B 2309/02* (2013.01)

(58) Field of Classification Search
  CPC ........ B32B 2307/102; B32B 2307/412; B32B 2307/56; B32B 2309/02; B60J 1/001; B60J 1/008; B60J 1/02; C03C 27/10
  See application file for complete search history.

(56) References Cited

U.S. PATENT DOCUMENTS

| | | |
|---|---|---|
| 2006/0008658 A1 | 1/2006 | Fukatani et al. |
| 2007/0154694 A1 | 7/2007 | Samuels et al. |
| 2008/0206533 A1 | 8/2008 | Yaoita et al. |
| 2010/0227135 A1 | 9/2010 | Takagi et al. |
| 2010/0295331 A1 | 11/2010 | Rehfeld et al. |
| 2012/0052274 A1 | 3/2012 | Rehfeld et al. |
| 2013/0288061 A1* | 10/2013 | Kitano .............. B32B 17/10018 428/437 |
| 2013/0316158 A1 | 11/2013 | Rehfeld et al. |
| 2013/0323517 A1 | 12/2013 | Kitano et al. |

FOREIGN PATENT DOCUMENTS

| | | |
|---|---|---|
| JP | 8-72674 A | 3/1996 |
| JP | 2002-326847 A | 11/2002 |
| JP | 2007-70200 A | 3/2007 |
| JP | 2008-37668 A | 2/2008 |
| JP | 2009-522136 A | 6/2009 |
| JP | 2010-150065 A | 7/2010 |
| JP | 2012-519646 A | 8/2012 |
| JP | WO2012/115197 A1 | 8/2012 |
| JP | 2013-100229 A | 5/2013 |
| JP | 5647380 B1 | 12/2014 |
| WO | WO 2005/018969 A1 | 3/2005 |
| WO | WO 2008/075604 A1 | 6/2008 |
| WO | WO 2013/181484 A1 | 12/2013 |
| WO | WO 2015/041324 A1 | 3/2015 |

OTHER PUBLICATIONS

European Office Action, dated Mar. 13, 2019, for European Application No. 15749265.3.
Extended European Search Report, dated Jul. 31, 2017, for European Application No. 15749265.3.
International Search Report for PCT/JP2015/054044 dated Apr. 28, 2015.
Japanese Office Action and English translation, dated Jul. 25, 2017, for Japanese Application No. 2014-027050.
Japanese Office Action and English translation, dated Jul. 25, 2017, for Japanese Application No. 2014-042214.
Japanese Office Action and English translation, dated Jul. 25, 2017, for Japanese Application No. 2014-042215.
Japanese Office Action and English translation, dated Jul. 25, 2017, for Japanese Application No. 2014-042217.
Written Opinion of the International Searching Authority for PCT/JP2015/054044 (PCT/ISA/237) dated Apr. 28, 2015.

* cited by examiner

Fig. 1
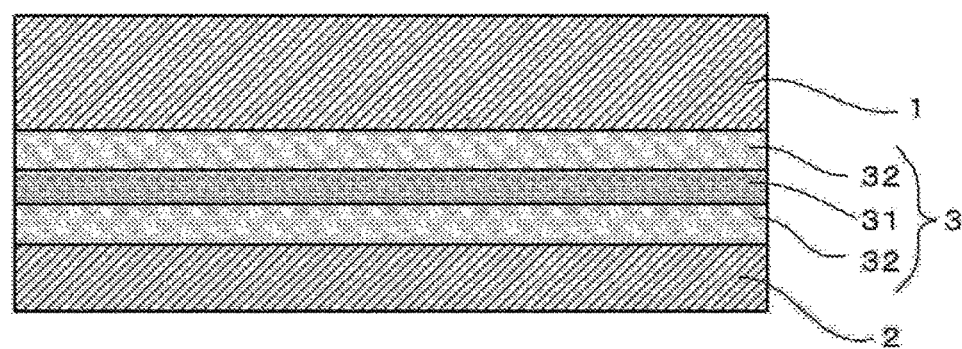
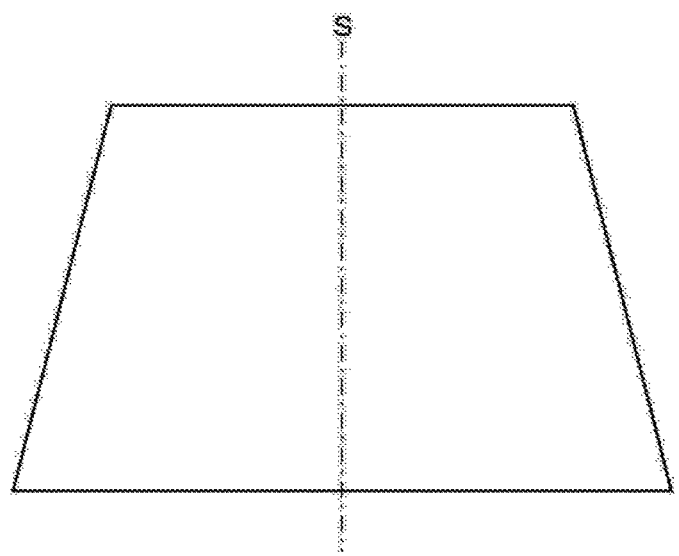
Fig. 2A
Fig. 2B

Fig22. Shape dependence of acoustic laminate glass STL

LAMINATED GLASS

CROSS-REFERENCE TO RELATED APPLICATIONS

This application is a Continuation of application Ser. No. 16/277,408, filed on Feb. 15, 2019, which is a Continuation of application Ser. No. 15/118,735, filed on Aug. 12, 2016 (issued as U.S. Pat. No. 10,252,492, on Apr. 9, 2019), which was filed as PCT International Application No. PCT/JP2015/054044 on Feb. 13, 2015, which claims the benefit under 35 U.S.C. § 119(a) to Patent Application No. 2014-027049, filed in Japan on Feb. 14, 2014, Patent Application No. 2014-027050, filed in Japan on Feb. 14, 2014, Patent Application No. 2014-037626, filed in Japan on Feb. 27, 2014, Patent Application No. 2014-042214, filed in Japan on Mar. 4, 2014, Patent Application No. 2014-042215, filed in Japan on Mar. 4, 2014, Patent Application No. 2014-042217, filed in Japan on Mar. 4, 2014, Patent Application No. 2014-043802, filed in Japan on Mar. 6, 2014, Patent Application No. 2014-044445, filed in Japan on Mar. 6, 2014, and Patent Application No. 2014-044705, filed in Japan on Mar. 7, 2014, all of which are hereby expressly incorporated by reference into the present application.

TECHNICAL FIELD

The present invention relates to a laminated glass to be used for an automobile windshield and the like, and a structure to which the laminated glass is attached.

BACKGROUND ART

In recent years, safety performance of automobiles has dramatically improved. In order to avoid a collision with a preceding vehicle, for example, a safety system is proposed in which the distance to the preceding vehicle and the velocity of the preceding vehicle are detected and a brake automatically engages in an abnormal approach to the preceding vehicle. In such a system, the distance to the preceding vehicle and the like are measured using a laser radar or a camera. In general, the laser radar or the camera is arranged on the inner side of a windshield, and the measurements are performed by emitting infrared rays ahead. Therefore, a system using a laser radar requires a glass plate for a windshield that transmits light at a predetermined transmittance. It is said that a glass plate having a small thickness is generally suitable for such a glass plate for a windshield. That is, use of a glass plate having a large thickness involves a risk that an infrared transmittance that is suitable for the safety system cannot be achieved.

However, a reduction in thickness of a windshield causes a decrease in sound insulation performance, and thus there is a problem in that sound occurring outside a vehicle enters the interior of the vehicle, deteriorating the environment in the vehicle. In order to solve this problem, for example, Patent Literature 1 discloses a laminated glass for an automobile that maintains the sound insulation performance at a predetermined frequency while having a decreased surface density. This laminated glass includes a pair of glass sheets and a resin interlayer that is arranged between the glass sheets.

CITATION LIST

Patent Literature

Patent Literature 1: JP 2002-326847A

SUMMARY OF INVENTION

Technical Problem

A laminated glass as disclosed in Patent Literature 1 has a problem in that even though the decrease in the sound insulation performance due to a reduction in thickness can be prevented to some extent, glass breakage due to an external force to the vehicle exterior side is likely to occur because the thickness of the glass plate on the vehicle exterior side is also reduced. In order to solve this problem, a method of decreasing the surface density of the laminated glass as a whole by thinning only the glass sheet on the vehicle interior side while keeping the thickness of the glass sheet on the vehicle exterior side at the same level as that of a conventional laminated glass is conceivable. In this respect, the inventors of the invention have conducted research as described below.

First, the inventors of the invention found that, as shown in FIG. 35, a configuration in which the glass plate on the vehicle interior side and the glass plate on the vehicle exterior side had different thicknesses exhibited lower sound insulation performance in a frequency range of 2000 to 5000 Hz, which humans can easily hear, than a configuration in which the exterior and interior glass plates had the same thickness. FIG. 35 is a graph showing the results of a simulation of the relationship between frequency and sound transmission loss (STL). This graph indicates a laminated glass (referred to as "first laminated glass" hereinafter) including two glass sheets each having a thickness of 1.5 mm and a laminated glass (referred to as "second laminated glass" hereinafter) including glass sheets having different thicknesses of 2.0 mm and 1.0 mm. In both laminated glasses, a resin interlayer is arranged between the two glass sheets. It can be seen from this graph that the sound transmission loss of the second laminated glass is lower than that of the first laminated glass in a frequency range of 3000 to 5000 Hz. That is, it was found that the use of glass sheets having different thicknesses decreased the sound insulation performance in a frequency range of 2000 to 5000 Hz, which humans can easily hear.

As described above, if glass plates having different thicknesses are combined, the problem of the decrease in the sound transmission loss arises, even though weight reduction can be achieved. In particular, the sound insulation performance in the frequency range of 2000 to 5000 Hz, which humans can easily hear, decreases, and a problem thus arises in that the environment in the vehicle is deteriorated.

As described above, the problem arises in that a reduction in thickness of a glass plate causes a decrease in the sound insulation performance, whereas a glass plate having a large thickness involves a risk that an infrared transmittance that is suitable for the safety system as described above cannot be achieved, causing failure. The present invention (invention 1) was made in order to solve the foregoing problems, and it is an object thereof to provide a laminated glass including glass plates having different thicknesses capable of improving sound insulation and contributing to setting the infrared transmittance to be in a predetermined range. Specifically, invention 1 provides an invention with the following aspects.

Solution to Problem

Invention 1
Aspect 1 is a laminated glass including:
an outer glass sheet;
an inner glass sheet arranged opposite to the outer glass sheet, the inner glass sheet having a smaller thickness than that of the outer glass sheet; and an interlayer sandwiched between the outer glass sheet and the inner glass sheet, wherein a transmittance with respect to light having a wavelength of 850 to 950 nm is 20 to 80%, the inner glass sheet has a thickness of 0.4 to 2.0 mm, the outer glass sheet has a thickness of 1.8 to 2.3 mm, the interlayer includes a plurality of layers including at least a core layer, and the core layer has a Young's modulus of 1 to 20 MPa at a frequency of 100 Hz and a temperature of 20° C., the Young's modulus being lower than a Young's modulus of the other layer.

Aspect 2 is the laminated glass according to aspect 1, wherein a transmittance with respect to light having a wavelength of 700 nm to 800 nm is 30 to 80%.

Aspect 3 is the laminated glass according to aspect 1, wherein the inner glass sheet has a thickness of 0.6 to 1.6 mm.

Aspect 4 is the laminated glass according to aspect 1, wherein the inner glass sheet has a thickness of 0.8 to 1.4 mm.

Aspect 5 is the laminated glass according to aspect 1, wherein the inner glass sheet has a thickness of 0.8 to 1.3 mm.

Aspect 6 is the laminated glass according to any of aspects 1 to 5, wherein the core layer has a thickness of 0.1 to 2.0 mm.

Aspect 7 is the laminated glass according to any of aspects 1 to 6, wherein the core layer has a Young's modulus of 1 to 16 MPa at a frequency of 100 Hz and a temperature of 20° C.

Aspect 8 is the laminated glass according to any of aspects 1 to 7, wherein the interlayer has at least one outer layer, the outer layer being in contact with the core layer and having 560 MPa or more at a frequency of 100 Hz and a temperature of 20° C.

Aspect 9 is a structure to which a laminated glass is attached including:

the laminated glass according to any of aspects 1 to 8; and an attachment portion with which the laminated glass is attached to the structure at an attachment angle of 45 degrees or less to the vertical.

Invention 2

There are various sounds that are problematic inside a vehicle, and many of these sounds have a frequency higher than 5000 Hz. For example, a braking sound and wind sound include sounds having a frequency higher than 5000 Hz, causing the deterioration of comfortability inside the vehicle. Accordingly, a sound having a frequency higher than 5000 Hz has a significant influence on the interior of the vehicle, and there has been a demand for a laminated glass for an automobile that can block a sound having such a frequency. In particular, in hybrid cars and EVs, the frequency of a motor is higher than 5000 Hz, and therefore, a technique for improving the sound insulation performance for such a frequency band is required. In particular, such automobiles barely make an engine sound or make no engine sound, and therefore, the sound insulation performance with respect to a sound in a frequency band higher than 5000 Hz is important.

As described above, a problem arises in that a reduction in thickness of a glass plate causes a decrease in the sound insulation performance, whereas a glass plate having a large thickness involves a risk that an infrared transmittance that is suitable for the safety system, which is an object of invention 1, cannot be achieved, thus causing failure. Invention 2 was made in order to solve the foregoing problems, and it is an object thereof to provide a laminated glass including glass plates having different thicknesses capable of improving the sound insulation performance with respect to a high-frequency sound having a frequency higher than 5000 Hz and contributing to set the infrared transmittance to be in a predetermined range. Specifically, invention 2 provides an invention with the following aspects.

Aspect 1 is a laminated glass including:

an outer glass sheet;

an inner glass sheet arranged opposite to the outer glass sheet; and an interlayer sandwiched between the outer glass sheet and the inner glass sheet, wherein the interlayer includes a core layer and at least one outer layer that is arranged on at least the outer glass sheet side out of the outer glass sheet side and the inner glass sheet side between which the core layer is sandwiched, a transmittance with respect to light having a wavelength of 850 to 950 nm is 20 to 80%, the total thickness of the outer glass sheet and the inner glass sheet is 3.8 mm or less, and the outer layer has a Young's modulus of 560 MPa or more at a frequency of 100 Hz and a temperature of 20° C.

Aspect 2 is the laminated glass according to aspect 1, wherein a transmittance with respect to light having a wavelength of 700 to 800 nm is 30 to 80%.

Aspect 3 is the laminated glass according to aspect 1, wherein the core layer has a Young's modulus of 18 MPa or less at a frequency of 100 Hz and a temperature of 20° C.

Aspect 4 is the laminated glass according to aspect 1, wherein the core layer has a Young's modulus of 14 MPa or less at a frequency of 100 Hz and a temperature of 20° C.

Aspect 5 is the laminated glass according to any of aspects 1 to 4, wherein the core layer has a tan δ of 0.9 or less at a frequency of 100 Hz and a temperature of 20° C.

Aspect 6 is the laminated glass according to any of aspects 1 to 5, wherein at least a pair of the outer layers between which the core layer is sandwiched are provided.

Aspect 7 is the laminated glass according to aspect 6, wherein the outer layer arranged on the outer glass sheet side has a larger Young's modulus than that of the outer layer arranged on the inner glass sheet side.

Aspect 8 is the laminated glass according to any of aspects 1 to 7, wherein the thickness of the outer glass sheet is different from the thickness of the inner glass sheet.

Invention 3

A band-shaped shading region (shading band) colored green, blue, etc. may be formed on a laminated glass for a vehicle, particularly on a windshield, in order to improve antiglare properties, heat shielding properties, and the like. Although the shading region may be formed on the surface of a glass sheet, the shading region is often formed by coloring the interlayer in a band shape. On the other hand, since the windshield requires a legal visual field region that is to transmit visible light at a transmittance of higher than or equal to a predetermined value (70% or more, for example), the shading region of the windshield is arranged outside the visual field region, that is, generally in the upper portion of the windshield.

In recent years, safety performance of automobiles has dramatically improved. In order to avoid a collision with a preceding vehicle, for example, a safety system is proposed in which the distance to the preceding vehicle and the velocity of the preceding vehicle are detected and a brake automatically engages in an abnormal approach to the preceding vehicle. In such a system, the distance to the preceding vehicle and the like are measured with laser or infrared rays using a device such as a laser radar or a camera. In general, it is desired that this device is attached to the upper region of the windshield in order to ensure safety and cause the device to sufficiently exhibit its functions.

However, as described above, the shading region may be formed in this region, and therefore, receiving light through the shading region runs the risk that a transmittance with respect to laser or infrared rays is significantly reduced, thus causing a decrease in sensitivity of the device. Therefore, conventionally, there is no choice but to change the position to which the device is attached or to give up on the coexistence of the device and the shading region.

As described above, the laminated glass for a windshield has various problems, and there is a demand for a laminated glass that is adapted to not only the achievement of the above-described sound insulation performance and reduction in weight but also the antiglare performance and heat shielding performance as well as a recent safety technique. Invention 2 was made in order to solve the foregoing problems, and it is an object thereof to provide a laminated glass including glass plates having different thicknesses that can achieve both sound insulation and weight reduction and to which a device for a safety system can be attached even if a shading region is provided in the laminated glass. Specifically, invention 3 provides an invention with the following aspects.

Aspect 1 is a laminated glass including:
an outer glass sheet;
an inner glass sheet arranged opposite to the outer glass sheet, the inner glass sheet having a smaller thickness than that of the outer glass sheet;
a first interlayer sandwiched between the outer glass sheet and the inner glass sheet, a colored shading region being formed in a portion of the first interlayer, a through hole being formed in the shading region; and
a transparent second interlayer arranged in the through hole of the first interlayer,
wherein the inner glass sheet has a thickness of 0.4 to 2.0 mm,
the outer glass sheet has a thickness of 1.8 to 2.3 mm,
the first and second interlayers each include a plurality of layers including at least a core layer,
at least one of the layers constituting the first interlayer is colored and forms the shading region, and
the core layers of the first and second interlayers each have a Young's modulus of 1 to 20 MPa at a frequency of 100 Hz and a temperature of 20° C., the Young's modulus being lower than a Young's modulus of the other layer.

Aspect 2 is the laminated glass according to aspect 1, wherein the first and second interlayers each have at least one outer layer, the outer layer being in contact with the core layer and having 560 MPa or more at a frequency of 100 Hz and a temperature of 20° C.

Aspect 3 is the laminated glass according to aspect 1 or 2, wherein the inner glass sheet has a thickness of 0.6 to 1.6 mm.

Aspect 4 is the laminated glass according to aspect 1 or 2, wherein the inner glass sheet has a thickness of 0.8 to 1.4 mm.

Aspect 5 is the laminated glass according to aspect 1 or 2, wherein the inner glass sheet has a thickness of 0.8 to 1.3 mm.

Aspect 6 is the laminated glass according to any of aspects 1 to 5, wherein the core layer has a thickness of 0.1 to 2.0 mm.

Aspect 7 is the laminated glass according to any of aspects 1 to 6, wherein the core layer has a Young's modulus of 1 to 16 MPa at a frequency of 100 Hz and a temperature of 20° C.

Aspect 8 is a structure to which a laminated glass is attached including:
the laminated glass according to any of aspects 1 to 7; and
an attachment portion with which the laminated glass is attached to the structure at an attachment angle of 45 degrees or less to the vertical.

Invention 4

Invention 4 also has the problem of sound insulation in invention 2, and the sound insulation performance with respect to a sound in a frequency band higher than or equal to 5000 Hz is important.

Other than the above-mentioned problem of sound insulation, a windshield has a problem in that ice covering the surface of the windshield causes poor visibility and the difference in temperature between the inside and the outside of a vehicle causes fog. It should be noted that such a problem may arise not only when the laminated glass is used in a vehicle but also when the laminated glass is used in a building.

Invention 4 was made in order to solve the foregoing problems, and it is an object thereof to provide a laminated glass capable of particularly improving the sound insulation performance with respect to a high-frequency sound having a frequency higher than 5000 Hz, melting ice covering the surface, and preventing fog. Specifically, invention 4 provides an invention with the following aspects.

Aspect 1 is a laminated glass including:
an outer glass sheet;
an inner glass sheet arranged opposite to the outer glass sheet;
an interlayer sandwiched between the outer glass sheet and the inner glass sheet; and
a heating wire arranged along the interlayer, the heating wire generating heat when an electric current is applied to the heating wire,
wherein the interlayer includes a core layer and a pair of outer layers that are arranged on the outer glass sheet side and the inner glass sheet side, the core layer being sandwiched between the outer layers, the outer layers having a higher hardness than that of the core layer, and
at least one of the pair of outer layers has a Young's modulus of 560 MPa or more at a frequency of 100 Hz and a temperature of 20° C.

Aspect 2 is the laminated glass according to aspect 1, wherein the heating wire is arranged between the interlayer and the outer glass sheet or between the interlayer and the inner glass sheet, and
the outer layer arranged on a side opposite to the heating wire with the core layer being located between the outer layer and the heating wire has a Young's modulus of 560 MPa or more at a frequency of 100 Hz and a temperature of 20° C.

Aspect 3 is the laminated glass according to aspect 2, wherein the heating wire is arranged between the interlayer and the outer glass sheet.

Aspect 4 is the laminated glass according to any of aspects 1 to 3, further including a heat shielding means arranged between the heating wire and the at least one outer layer having a Young's modulus of 560 MPa or more at a frequency of 100 Hz and a temperature of 20° C.

Aspect 5 is the laminated glass according to aspect 1, wherein the heating wire is arranged between the interlayer and the outer glass sheet or between the interlayer and the inner glass sheet, and the outer layer arranged between the core layer and the heating wire has a Young's modulus of 560 MPa or more at a frequency of 100 Hz and a temperature of 20° C.

Aspect 6 is the laminated glass according to any of aspects 1 to 5, wherein the core layer has a Young's modulus of 18 MPa or less at a frequency of 100 Hz and a temperature of 20° C.

Aspect 7 is the laminated glass according to any of aspects 1 to 5, wherein the core layer has a Young's modulus of 14 MPa or less at a frequency of 100 Hz and a temperature of 20° C.

Aspect 8 is the laminated glass according to any of aspects 1 to 7, wherein the core layer has a tan δ of 0.9 or less at a frequency of 100 Hz and a temperature of 20° C.

Aspect 9 is the laminated glass according to any of aspects 1 to 8, wherein the outer layer arranged on the outer glass sheet side has a larger Young's modulus than that of the outer layer arranged on the inner glass sheet side.

Aspect 10 is the laminated glass according to any of aspects 1 to 9, wherein the thickness of the outer glass sheet is different from the thickness of the inner glass sheet.

Invention 5

Other than the problem of sound insulation the same as the problem in invention 4, a windshield also has a problem in that light incident from the outside of a vehicle into the inside of the vehicle increases the temperature of the inside of the vehicle. Moreover, light from the outside has an influence on the field of vision, and therefore, there is a demand for the adjustment of the amount of transmitted light. However, a laminated glass that can control light from the outside while improving the above-described sound insulation performance has not been proposed. It should be noted that such a problem may arise not only when the laminated glass is used in a vehicle but also when the laminated glass is used in a building.

Invention 5 was made in order to solve the foregoing problems, and it is an object thereof to provide a laminated glass capable of particularly improving the sound insulation performance with respect to a high-frequency sound having a frequency higher than 5000 Hz, and controlling light from the outside. Specifically, invention 5 provides an invention with the following aspects.

Aspect 1 is a laminated glass including:
an outer glass sheet;
an inner glass sheet arranged opposite to the outer glass sheet; and
an interlayer arranged between the outer glass sheet and the inner glass sheet,
wherein the interlayer includes a core layer, first and second outer layers between which the core layer is sandwiched, a functional film that is in contact with one of the first and second outer layers and that can control light from the outside, and a third outer layer arranged between the functional film and the outer glass sheet or the inner glass sheet,
the first to third outer layers each have a higher hardness than that of the core layer, and
one of the outer layers, which are in contact with the functional film, has a Young's modulus of 560 MPa or more at a frequency of 100 Hz and a temperature of 20° C.

Aspect 2 is the laminated glass according to aspect 1, wherein the outer layers, which are in contact with the functional film, of the first to third outer layers each have a Young's modulus of 560 MPa or more at a frequency of 100 Hz and a temperature of 20° C.

Aspect 3 is the laminated glass according to aspect 1 or 2, wherein the functional film is a heat-ray reflecting film.

Aspect 4 is the laminated glass according to any of aspects 1 to 3, wherein the heat reflecting film is arranged between the outer glass sheet and the core layer.

Aspect 5 is the laminated glass according to any of aspects 1 to 4, wherein the core layer has a Young's modulus of 18 MPa or less at a frequency of 100 Hz and a temperature of 20° C.

Aspect 6 is the laminated glass according to any of aspects 1 to 4, wherein the core layer has a Young's modulus of 14 MPa or less at a frequency of 100 Hz and a temperature of 20° C.

Aspect 7 is the laminated glass according to any of aspects 1 to 6, wherein the core layer has a tan δ of 0.9 or less at a frequency of 100 Hz and a temperature of 20° C.

Aspect 8 is the laminated glass according to aspect 7, wherein the outer layer arranged on the outer glass sheet side has a larger Young's modulus than that of the outer layer arranged on the inner glass sheet side.

Aspect 9 is the laminated glass according to any of aspects 1 to 8, wherein the thickness of the outer glass sheet is different from the thickness of the inner glass sheet.

Invention 6

Other than the problem of sound insulation the same as the problem in invention 4, a windshield also has a problem in that light incident from the outside of a vehicle into the inside of the vehicle increases the temperature of the inside of the vehicle. It should be noted that such a problem may arise not only when the laminated glass is used in a vehicle but also when the laminated glass is used in a building.

Invention 6 was made in order to solve the foregoing problems, and it is an object thereof to provide a laminated glass capable of particularly improving the sound insulation performance with respect to a high-frequency sound having a frequency higher than 5000 Hz and preventing an increase in the temperature of the inside of a vehicle or a building.

Specifically, invention 6 provides an invention with the following aspects.

Aspect 1 is a laminated glass including:
an outer glass sheet;
an inner glass sheet arranged opposite to the outer glass sheet; and
an interlayer arranged between the outer glass sheet and the inner glass sheet; and
ITO fine particles contained in the interlayer,
wherein the interlayer includes a core layer, and a first outer layer and a second outer layer between which the core layer is sandwiched and that each have a higher hardness than that of the core layer,
at least the second outer layer out of the first outer layer and the second outer layer has a Young's modulus of 560 MPa or more at a frequency of 100 Hz and a temperature of 20° C.,
the ITO fine particles are contained in at least one of the first outer layer and the second outer layer, and
the content of the ITO fine particles in the first outer layer is larger than the content of the ITO fine particles in the second outer layer.

Aspect 2 is the laminated glass according to aspect 1, wherein at least the second outer layer out of the first outer layer and the second outer layer has a Young's modulus of 560 MPa or more at a frequency of 100 Hz and a temperature of 20° C.

Aspect 3 is the laminated glass according to aspect 1 or 2, wherein the first outer layer is arranged on the outer glass sheet side.

Aspect 4 is the laminated glass according to any of aspects 1 to 3, wherein the core layer has a Young's modulus of 18 MPa or less at a frequency of 100 Hz and a temperature of 20° C.

Aspect 5 is the laminated glass according to any of aspects 1 to 3, wherein the core layer has a Young's modulus of 14 MPa or less at a frequency of 100 Hz and a temperature of 20° C.

Aspect 6 is the laminated glass according to any of aspects 1 to 5, wherein the core layer has a tan δ of 0.9 or less at a frequency of 100 Hz and a temperature of 20° C.

Aspect 7 is the laminated glass according to any of aspects 1 to 6, wherein the outer layer arranged on the outer glass sheet side has a larger Young's modulus than that of the outer layer arranged on the inner glass sheet side.

Aspect 8 is the laminated glass according to any of aspects 1 to 7, wherein the thickness of the outer glass sheet is different from the thickness of the inner glass sheet.

Invention 7

As in invention 1, if glass sheets having different thicknesses are combined, a problem of a decrease in the sound transmission loss arises, even though weight reduction can be achieved. In particular, the sound insulation performance in the frequency range of 2000 to 5000 Hz, which humans can easily hear, decreases, and a problem thus arises in that the environment in the vehicle is deteriorated. It should be noted that such a problem may occur not only in glass for automobiles but also in all types of laminated glass that are required to achieve weight reduction and sound insulation.

Invention 7 was made in order to solve the foregoing problems, and it is an object thereof to provide a laminated glass including glass sheets having different thicknesses that achieves both weight reduction and sound insulation, and a structure to which the laminated glass is attached. Specifically, invention 7 provides an invention with the following aspects.

Aspect 1 is a laminated glass including:
an outer glass sheet;
an inner glass sheet arranged opposite to the outer glass sheet, the inner glass sheet having a smaller thickness than that of the outer glass sheet; and
an interlayer sandwiched between the outer glass sheet and the inner glass sheet,
wherein the interlayer includes a core layer, a first outer layer that is adjacent to the core layer and is arranged on the outer glass sheet side, and a second outer layer that is adjacent to the core layer and is arranged on the inner glass sheet side,
the first and second outer layers each have a larger Young's modulus than that of the core layer, and
the first outer layer has a smaller thickness than that of the second outer layer.

Aspect 2 is the laminated glass according to aspect 1, wherein the total thickness of the outer glass sheet and the first outer layer is equal to the total thickness of the inner glass sheet and the second outer layer.

Aspect 3 is the laminated glass according to aspect 1 or 2, wherein at least one of the first and second outer layers has a Young's modulus of 560 MPa or more at a frequency of 100 Hz and a temperature of 20° C.

Aspect 4 is the laminated glass according to any of aspects 1 to 3, wherein the core layer has a Young's modulus of 20 MPa or less at a frequency of 100 Hz and a temperature of 20° C.

Aspect 5 is the laminated glass according to any of aspects 1 to 4, wherein the inner glass sheet has a thickness of 0.8 to 1.6 mm.

Aspect 6 is the laminated glass according to any of aspects 1 to 4, wherein the inner glass sheet has a thickness of 1.0 to 1.4 mm.

Aspect 7 is the laminated glass according to any of aspects 1 to 4, wherein the inner glass sheet has a thickness of 0.8 to 1.3 mm.

Aspect 8 is the laminated glass according to any of aspects 1 to 7, wherein the core layer has a thickness of 0.1 to 2.0 mm.

Aspect 9 is the laminated glass according to any of aspects 1 to 8, wherein the outer glass sheet has a thickness of 1.8 to 5.0 mm.

Aspect 10 is a structure to which a laminated glass is attached including:
the laminated glass according to any of aspects 1 to 9; and
an attachment portion with which the laminated glass is attached to the structure at an attachment angle of 45 degrees or less to the vertical.

Invention 8

It is known that sound transmission loss (STL), called a coincidence effect, due to resonance at a certain frequency occurs in a glass sheet, thus causing a significant decrease in sound insulation performance. For example, it is known that, as shown in the formula below, generally, the smaller the thickness of a glass sheet, the more the coincidence frequency is shifted toward the high-frequency side.

$$f_c = \frac{c^2}{2\pi h} \sqrt{\frac{12\rho_m(1-v^2)}{E}} \quad \text{Formula 1}$$

$f_c$: coincidence critical frequency (Hz)
$\rho_m$: density of material
$E$: Young's modulus of material
$v$: Poisson's ratio of material
$h$: thickness of material
$c$: speed of sound
* Coincidence effect is a sharp drop in sound transmission loss at the characteristic frequency.

FIG. 36 is a graph showing the results of a simulation of the relationship between frequency and sound transmission loss (STL). This graph shows the results of simulations of a glass sheet having a thickness of 3.1 mm and a glass sheet having a thickness of 2.3 mm. As seen from these results, STL decreases in the frequency range of 2000 to 5000 Hz, which humans can easily hear, in the glass sheet having a thickness of 3.1 mm, but the minimum value of STL shifts to a frequency range of 4000 Hz or higher in the glass sheet having a thickness of 2.3 mm. Accordingly, the reduction in thickness of a glass sheet makes it possible to improve STL in a frequency range that humans can easily hear. However, there is a problem in that the reduction in thickness reduces the strength of a glass sheet.

Invention 8 was made in order to solve the foregoing problems, and it is an object thereof to provide a laminated glass capable of suppressing a reduction in strength and improving sound insulation. Specifically, invention 8 provides an invention with the following aspects.

Aspect 1 is a laminated glass including:
a first glass sheet;
a second glass sheet arranged opposite to the first glass sheet; and
an interlayer sandwiched between the first glass sheet and the second glass sheet,
wherein the interlayer includes a core layer, a first outer layer that is adjacent to the core layer and is arranged on the first glass sheet side, and a second outer layer that is adjacent to the core layer and is arranged on the second glass sheet side, the first and second outer layers each have a larger Young's modulus than that of the core layer, the first outer layer is formed such that the thickness decreases from one end portion of the surface of the interlayer toward the other end portion, and the second outer layer is formed such that the thickness increases from the one end portion of the surface of the interlayer toward the other end portion Aspect 2 is the laminated glass according to aspect 1, wherein the total thickness of the first outer layer and the second outer layer is constant at any position between one end portion and the other end portion of the surface of the interlayer.

Aspect 3 is the laminated glass according to aspect 1 or 2, wherein the difference in Young's modulus between the first and second outer layers and the core layer is 400 MPa or more at a frequency of 100 Hz and a temperature of 20° C.

Aspect 4 is the laminated glass according to any of aspects 1 to 3, wherein at least one of the first and second outer layers has a Young's modulus of 560 MPa or more at a frequency of 100 Hz and a temperature of 20° C.

Aspect 5 is the laminated glass according to any of aspects 1 to 4, wherein the core layer has a Young's modulus of 50 MPa or less at a frequency of 100 Hz and a temperature of 20° C.

Aspect 6 is the laminated glass according to any of aspects 1 to 5, wherein the total thickness of the outer glass sheet and the inner glass sheet is 3.8 mm or less.

Invention 9

In recent years, a laminated glass in which an interlayer made of a resin film or the like is sandwiched between an outer glass sheet and an inner glass sheet is widely used. This laminated glass is produced in the following process, for example.

First, an interlayer to be used in a laminated glass is formed by cutting the interlayer into a larger size than the sizes of the outer glass sheet and the inner glass sheet. Next, the interlayer is sandwiched between the outer glass sheet and the inner glass sheet to form a laminated glass, and this laminated glass is placed into a rubber bag and preliminarily bonded together under vacuum suction. Furthermore, the preliminarily bonded laminated glass is permanently bonded by thermocompression bonding using an autoclave. Lastly, to finish the manufacturing of the laminated glass, a portion of the interlayer that protrudes from the outer peripheral edge of each of the glass sheets is cut off (edge cutting step).

JP 2000-327376A proposes an edge cutting device that can be used in the above-mentioned edge cutting step of cutting off a portion of a film that protrudes from the outer peripheral edge of a glass sheet. Moreover, J P 2013-129552A proposes a V-shaped cutter blade that can be used in the above-mentioned edge cutting step.

FIG. 37 shows an example of a conventional edge cutting step. In the conventional edge cutting step described in the above two documents, as shown by the example in FIG. 37, the portion of the interlayer, which protrudes from the entire outer peripheral edge of each of the glass sheets, is cut off. Therefore, before the protruding portion of the interlayer is cut off along the outer peripheral edge of each of the glass sheets (arrows S101 to S105 in FIG. 37), a notch has to be formed toward the outer peripheral edge of each of the glass sheets in the protruding portion of the interlayer such that the cutter blade reaches the outer peripheral edge of each of the glass sheets (arrow S100 in FIG. 37).

However, unlike the case where the interlayer is cut off along the outer peripheral edge of each of the glass sheets, in the case where a notch is formed toward the outer peripheral edge of each of the glass sheets in the protruding portion of the interlayer, there is no target serving as a cutting guide, such as the outer peripheral edge of each of the glass sheets. Therefore, in the case where a notch is formed in the protruding portion of the interlayer, the interlayer may escape from the cutter blade, thus making it difficult to cut off the interlayer.

Invention 9 was made in order to solve the foregoing problems, and it is an object thereof to provide a technique for facilitating the cutting off of the interlayer in the edge cutting step. Specifically, invention 9 provides an invention with the following aspects.

Aspect 1 is a method for manufacturing a laminated glass, the method including:

preparing a first glass sheet and a second glass sheet capable of being arranged opposite to the first glass sheet;

preparing an interlayer arranged between the first glass sheet and the second glass sheet, the interlayer having a shape larger than those of both the glass sheets;

performing thermocompression bonding on the interlayer between the first glass sheet and the second glass sheet such that a protruding portion that is a portion of the interlayer protruding from the outer peripheral edge of each of the glass sheets is formed, and a cutout portion in which the interlayer is aligned with the outer peripheral edge of each of the glass sheets or enters the inside with respect to the outer peripheral edge is formed; and cutting off the protruding portion of the interlayer along the outer peripheral edge of each of the first glass sheet and the second glass sheet using the cutout portion as a starting point.

Aspect 2 is the method for manufacturing a laminated glass according to aspect 1, wherein a recessed notch portion is provided in at least a portion of the peripheral edge portion of the interlayer so as to form the cutout portion.

Aspect 3 is the method for manufacturing a laminated glass according to aspect 2, wherein the notch portion forms an acute angle with respect to the outer peripheral edge of each of the first glass sheet and the second glass sheet.

Aspect 4 is the method for manufacturing a laminated glass according to any of aspects 1 to 3, wherein the interlayer includes a plurality of layers, and at least one of the layers has a Young's modulus of 560 MPa or more at a frequency of 100 Hz and a temperature of 20° C.

Aspect 5 is the method for manufacturing a laminated glass according to any of aspects 1 to 3, wherein the interlayer includes a plurality of layers including at least a core layer, and the core layer has a Young's modulus of 1 to 20 MPa at a frequency of 100 Hz and a temperature of 20° C.

Aspect 6 is a laminated glass including:

a first glass sheet;

a second glass sheet arranged opposite to the first glass sheet; and an interlayer sandwiched between the first glass sheet and the second glass sheet, wherein a portion that enters the inside with respect to the outer peripheral edge of each of the first glass sheet and the second glass sheet is locally formed in the peripheral edge portion of the interlayer.

Aspect 7 is the laminated glass according to aspect 6, wherein the interlayer includes a plurality of layers, and at least one of the layers has a Young's modulus of 560 MPa or more at a frequency of 100 Hz and a temperature of 20° C.

Aspect 8 is the laminated glass according to aspect 6 or 7, wherein the interlayer includes a plurality of layers including at least a core layer, and the core layer has a Young's modulus of 1 to 20 MPa at a frequency of 100 Hz and a temperature of 20° C.

BRIEF DESCRIPTION OF DRAWINGS

FIG. 1 is a cross-sectional view showing an embodiment of a laminated glass according to the present invention.

FIGS. 2A and 2B are a front view and a cross-sectional view, respectively, showing a depth of bend of a curved laminated glass.

DESCRIPTION OF EMBODIMENTS

Figure 3:
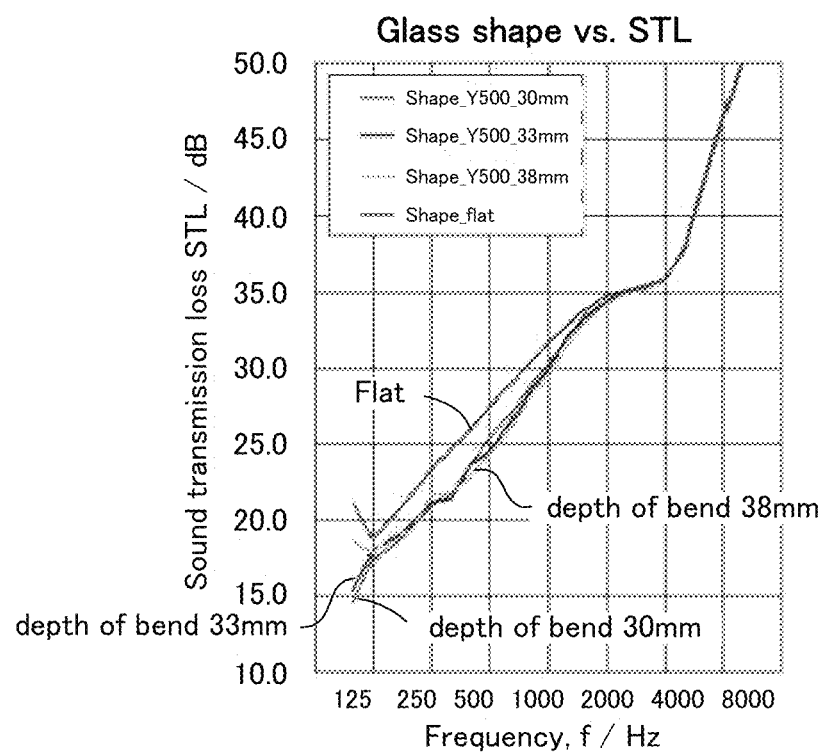
FIG. 3 is a graph showing a relationship between general frequency and sound transmission loss with respect to glass sheets having a curved shape and a glass sheet having a flat shape.

Hereinafter, an embodiment in which a laminated glass according to the present invention is applied to a windshield for an automobile will be described with reference to the drawings. In particular, the laminated glass according to this embodiment is applied to a windshield in which a front safety system using a laser radar or the like is employed.

FIG. 1 is a cross-sectional view of a laminated glass according to this embodiment. As shown in this diagram, the laminated glass according to this embodiment is constituted by an outer glass sheet 1, an inner glass sheet 2, and an interlayer 3 that is sandwiched between these glass sheets. The outer glass sheet 1 is a glass sheet to be arranged on a side that is likely to be subject to disturbance, and the inner glass sheet 2 is a glass sheet to be arranged on the side opposite to the outer glass sheet 1. Accordingly, for example, when this laminated glass is used as a window glass of an automobile, the outer glass sheet constitutes the glass sheet on the exterior side of the automobile, and when this laminated glass is used as a building material, the outer glass sheet constitutes the glass sheet that faces outside the building. However, depending on possible disturbance, the arrangement may be reversed. The individual members will be described below.

1. Outer Glass Sheet and Inner Glass Sheet

Known glass sheets can be used as the outer glass sheet 1 and the inner glass sheet 2, and these glass sheets can also be made of heat-ray absorbing glass, regular clear glass or green glass, or UV green glass. However, in the case where this laminated glass is used for a window of an automobile, there is a need to attain a visible light transmittance that conforms to the safety standards of a country in which the automobile is to be used. For example, an adjustment can be made so that the outer glass sheet 1 ensures a required solar absorptance and the inner glass sheet 2 provides a visible light transmittance that meets the safety standards. Examples of clear glass, heat-ray absorbing glass, and soda-lime based glass are shown below.

Clear Glass
$SiO_2$: 70 to 73 mass %
$Al_2O_3$: 0.6 to 2.4 mass %
CaO: 7 to 12 mass %
MgO: 1.0 to 4.5 mass %
$R_2O$: 13 to 15 mass % (R is an alkali metal)
Total iron oxide ($T-Fe_2O_3$) in terms of $Fe_2O_3$: 0.08 to 0.14 mass %

Heat-Ray Absorbing Glass
With regard to the composition of heat-ray absorbing glass, a composition obtained based on the composition of clear glass by setting the ratio of the total iron oxide ($T-Fe_2O_3$) in terms of $Fe_2O_3$ to 0.4 to 1.3 mass %, the ratio of $CeO_2$ at 0 to 2 mass %, and the ratio of $TiO_2$ to 0 to 0.5 mass % and reducing the components (mainly $SiO_2$ and $Al_2O_3$) forming the framework of glass by an amount corresponding to the increases in $T-Fe_2O_3$, $CeO_2$, and $TiO_2$ can be used, for example.

Soda-Lime Based Glass
$SiO_2$: 65 to 80 mass %
$Al_2O_3$: 0 to 5 mass %
CaO: 5 to 15 mass %
MgO: 2 mass % or more
NaO: 10 to 18 mass %
$K_2O$: 0 to 5 mass %
MgO+CaO: 5 to 15 mass %
$Na_2O+K_2O$: 10 to 20 mass %
$SO_3$: 0.05 to 0.3 mass %
$B_2O_3$: 0 to 5 mass %
Total iron oxide ($T-Fe_2O_3$) in terms of $Fe_2O_3$: 0.02 to 0.03 mass %

Although there is no particular limitation on the thickness of the laminated glass according to this embodiment, the total thickness of the outer glass sheet 1 and the inner glass sheet 2 is preferably set to 2.4 to 3.8 mm, more preferably 2.6 to 3.4 mm, and particularly preferably 2.7 to 3.2 mm, from the viewpoint of weight reduction. As described above, there is a need to reduce the total thickness of the outer glass sheet 1 and the inner glass sheet 2 in order to reduce the weight. Therefore, although there is no particular limitation on the thicknesses of the glass sheets, the thicknesses of the outer glass sheet 1 and the inner glass sheet 2 can be determined as described below, for example.

The outer glass sheet 1 is mainly required to have durability and impact resistance against external interference. For example, when this laminated glass is used as a windshield of an automobile, the impact-resistance performance with respect to flying objects such as small stones is required. On the other hand, a larger thickness is not preferable because the weight increases. From this viewpoint, the thickness of the outer glass sheet 1 is preferably 1.8 mm or more, more preferably 1.9 mm or more, even more preferably 2.0 mm or more, still more preferably 2.1 mm or more, and most preferably 2.2 mm or more. On the other hand, the upper limit of the thickness of the outer glass 1 is preferably 5.0 mm or less, more preferably 4.0 mm or less, even more preferably 3.1 mm or less, still more preferably 2.5 mm or less, yet more preferably 2.4 mm, and most preferably 2.3 mm or less. Among these, a thickness of more than 2.1 mm and 2.5 mm or less, especially, a thickness of 2.2 mm or more and 2.4 mm or less is preferable. It is possible to determine which thickness is to be used in accordance with the application of the glass sheet.

Although the thickness of the inner glass sheet can be made to be equal to that of the outer glass sheet 1, the thickness of the inner glass sheet can be made to be smaller than that of the outer glass sheet 1 in order to reduce the weight of the laminated glass, for example. Specifically, the thickness of the inner glass sheet 2 is preferably 0.4 mm or more, more preferably 0.6 mm or more, even more preferably 0.8 mm or more, still more preferably 1.0 mm or more, and most preferably 1.3 mm or more. On the other hand, the upper limit of the thickness of the inner glass 2 is preferably 2.0 mm or less, more preferably 1.8 mm or less, even more preferably 1.6 mm or less, still more preferably 1.4 mm or less, yet more preferably 1.3 mm or less, and most preferably less than 1.1 mm. Among these, a thickness of 0.6 mm or more and less than 1.1 mm is preferable, for example. With regard to the inner glass sheet 2 as well, it is possible to determine which thickness is to be used in accordance with the application of the glass sheet.

The shapes of the outer glass sheet 1 and the inner glass sheet 2 according to this embodiment may be flat or curved. However, the STL decreases more in the case of a curved shape, and therefore, a glass plate having a curved shape particularly needs an acoustic countermeasure. It can be considered that the reason as to why STL values decrease more in the case of curved shapes than in the case of flat shapes is that the effect of the resonance mode is greater in the case of curved shapes.

Furthermore, it is supposed that in the case of a glass plate having a curved shape, the larger the depth of bend, the lower the sound insulation performance. "Depth of bend" is an amount indicating the bend of the glass sheet. For example, as shown in FIG. 2, when a straight line L connecting the center of an upper side and the center of a lower side of a glass sheet is set, the greatest distance of the distances between this straight line L and the glass sheet is defined as the "depth of bend".

FIG. 3 is a graph showing a relationship between general frequency and sound transmission loss with respect to glass sheets having a curved shape and a glass sheet having a flat shape. It can be seen from FIG. 3 that there is not much difference in the sound transmission loss among the glass sheets having a curved shape whose depths of bend are within a range of 30 to 38 mm, but when compared with the glass sheet having a flat shape, those curved glass sheets have a low sound transmission loss in a frequency band 4000 Hz or lower. Accordingly, in the case where a glass sheet having a curved shape is produced, smaller depth of bend is better, but if the depth of bend exceeds 30 mm, it is preferable to set the Young's modulus of the core layer of the interlayer to 18 MPa (frequency 100 Hz, temperature 20° C.) or less, as described later.

Figure 4:
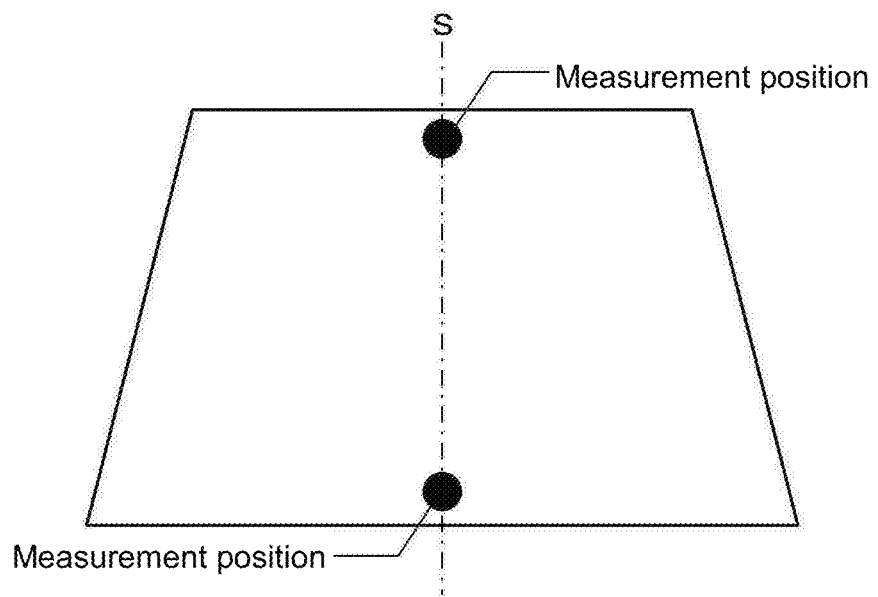
FIG. 4 is a schematic plan view showing thickness measurement positions on a laminated glass.

Here, an example of a method of measuring the thickness of a curved glass sheet will be described. First, with respect to the measurement position, as shown in FIG. 4, the measurement is performed at two positions: an upper position and a lower position on a center line S extending vertically in the center of a glass sheet in the horizontal direction. Although there is no particular limitation on the measuring device, a thickness gauge such as SM-112 manufactured by TECLOCK Corporation can be used, for example. During measurement, the glass sheet is arranged such that the curved surface of the glass sheet is placed on a flat surface, and an end portion of the glass sheet is sandwiched and measured with the above-mentioned thickness gauge. It should be noted that a flat glass sheet can also be measured in the same manner as a curved glass sheet.

2. Interlayer

The interlayer 3 includes a plurality of layers. For example, as shown in FIG. 1, the interlayer 3 can be configured by three layers, namely a soft core layer 31 and outer layers 32 that are harder than the core layer 31 and between which the core layer 31 is sandwiched. However, there is no limitation to this configuration, and it is sufficient if the interlayer 3 includes a plurality of layers including the core layer 31 and at least one outer layer 32 arranged on the outer glass sheet 1 side. For example, the interlayer 3 including two layers, namely the core layer 31 and one outer layer 32 arranged on the outer glass sheet 1 side, or the interlayer 3 in which an even number of two or more of the outer layers 32 are arranged on each side of the core layer 31 so that the core layer 31 is arranged at the center, or the interlayer 3 in which an odd number of outer layers 32 are arranged on one side of the core layer 31 and an even number of outer layers 32 are arranged on the other side so that the core layer 31 is sandwiched therebetween can also be formed. It should be noted that in the case where only one outer layer 32 is provided, the outer layer 32 is provided on the outer glass sheet 1 side as mentioned above, which is for the purpose of improving the breakage resistance performance with respect to an external force from the outside of a vehicle or a building. Moreover, when the number of outer layers 32 is increased, the sound insulation performance is improved.

Although there is no particular limitation on the hardness of the core layer 31 as long as the core layer 31 is softer than the outer layer 32, materials of the core layer 31 can be selected based on the Young's modulus, for example. At a frequency of 100 Hz and a temperature of 20° C., the Young's modulus is preferably 1 to 20 MPa, more preferably 1 to 18 MPa, even more preferably 1 to 16 MPa, and particularly preferably 1 to 14 MPa. When the Young's modulus is set to be in such a range, it is possible to prevent a decrease in STL in a low frequency range of about 3500 Hz or lower.

In this regard, the inventors of the invention found that in general, when the Young's modulus of the core layer was reduced, the sound insulation performance was improved in a frequency range of 3000 to 5000 Hz. In this regard, Table 1 below shows the sound insulation performance of a laminated glass having an outer glass sheet and an inner glass sheet made of clear glass, and an interlayer including a core layer and outer layers located on both sides of this core layer. The outer glass sheet has a thickness of 2.0 mm, the inner glass sheet has a thickness of 1.3 mm, and the interlayer has a thickness of 0.76 mm, with the core layer having a thickness of 0.10 mm and each of the outer layers having a thickness of 0.33 mm. Table 1 below shows the sound transmission losses in a frequency range of 1250 to 10000 Hz. Specifically, the sound transmission losses are calculated in a case where the Young's modulus (measured at a frequency of 100 Hz and a temperature of 20° C.) of the core layer is set to 25 MPa, 12.5 MPa, and 6.25 MPa (the calculation method is in accordance with a method in Examples, which will be described later), the sound transmission losses in the case where the Young's modulus is set to 25 MPa are used as references (the sound transmission losses in this case are shown as 0 in the table below because they are used as references), and differences in sound transmission loss (in dB) when the Young's modulus is set to 12.5 MPa and 6.25 MPa are shown. In this case, the outer layers have a Young's modulus of 560 MPa (temperature 20° C., frequency 100 Hz). It can be seen from Table 1 that in a frequency range of 3150 to 5000 Hz, the sound transmission loss is improved as the Young's modulus of the interlayer is reduced from 25 MPa to 12.5 MPa and 6.25 MPa.

TABLE 1

|  | 1250 | 1600 | 2000 | 2500 | 3150 | 4000 | 5000 | 6300 | 8000 | 10000 |
|---|---|---|---|---|---|---|---|---|---|---|
| 6.25 MPa | 0.3 | 0.6 | 1.1 | 1.7 | 2.2 | 2.3 | 0.3 | −2.4 | −1.7 | −1.2 |
| 12.5 MPa | 0.1 | 0.3 | 0.6 | 0.9 | 1.3 | 1.3 | 0 | −1.1 | −0.8 | −0.5 |
| 25 MPa | 0.0 | 0.0 | 0.0 | 0.0 | 0.0 | 0.0 | 0.0 | 0.0 | 0.0 | 0.0 |

With regard to the measurement method, it is possible to use a solid viscoelasticity measuring apparatus DMA 50 manufactured by Metravib and perform frequency dispersion measurement with a strain amount of 0.05%, for example. In the following description, the Young's modulus as used herein refers to a measurement value obtained by using the above-described method, unless otherwise stated. However, although an actual measured value is used in measurement at a frequency equal to or lower than 200 Hz, a value that is calculated based on actual measured values is used at a frequency higher than 200 Hz. This calculated value is based on a master curve that is calculated from actual measured values using the WLF method.

On the other hand, as described later, it is preferable that the outer layers 32 have a large Young's modulus for the purpose of improving the sound insulation performance in a high frequency range, and the Young's modulus can be set to 400 MPa or more, 440 MPa or more, 560 MPa or more, 600 MPa or more, 650 MPa or more, 700 MPa or more, 750 MPa or more, 880 MPa or more, or 1300 MPa or more at a frequency of 100 Hz and a temperature of 20° C. Meanwhile, there is no particular limitation on the upper limit of the Young's modulus of each of the outer layers 32, but the Young's modulus can be set from the viewpoint of workability, for example. It is empirically known that when the Young's modulus is set to 1750 MPa or more, for example, the workability decreases, in particular, cutting is difficult. Also, in the case where a pair of outer layers 32 between which the core layer 31 is sandwiched are provided, it is preferable to set the Young's modulus of the outer layer 32 on the outer glass sheet 1 side to be greater than the Young's modulus of the outer layer 32 on the inner glass sheet 2 side. This improves the breakage resistance performance with respect to an external force from the outside of a vehicle or a building.

At a frequency of 100 Hz and a temperature of 20° C., tan δ of the core layer 31 can be set to 0.1 to 1.6, 0.1 to 1.2, and 0.1 to 0.9, for example. When tan δ is within the above-mentioned range, the sound insulation performance is improved.

In this regard, the inventors of the invention found that in general, when tan δ of the core layer was increased, the sound insulation performance was improved in a frequency range of 5000 to 10000 Hz. In this regard, Table 2 below shows the sound insulation performance of a laminated glass having an outer glass sheet and an inner glass sheet made of clear glass, and an interlayer including a core layer and outer layers located on both sides of this core layer. The outer glass sheet has a thickness of 2.0 mm, the inner glass sheet has a thickness of 1.3 mm, and the interlayer has a thickness of 0.76 mm, with the core layer having a thickness of 0.10 mm and each of the outer layers having a thickness of 0.33 mm. It should be noted that in this case, the Young's moduli of the core layer and the outer layers are 12.5 MPa and 560 MPa (measured at a frequency of 100 Hz and a temperature of 20° C.), respectively. Table 2 below shows the sound transmission losses in a frequency range of 1250 to 10000 Hz. Specifically, the sound transmission losses are calculated in a case where tan δ (measured at a frequency of 100 Hz and a temperature of 20° C.) of the core layer is set to 0.8, 1.2, and 1.6 (the calculation method is in accordance with a method in Examples, which will be described later), the sound transmission losses in the case where tan δ is set to 0.8 are used as references (the sound transmission losses in this case are shown as 0 in the table below because they are used as references), and differences in sound transmission loss (in dB) when tan δ is set to 1.2 and 1.6 are shown. It should be noted that the outer layers have a tan δ of 0.26. It can be seen from Table 2 that in a frequency range of 5000 to 10000 Hz, the sound transmission loss is improved as tan δ of the interlayer is increased from 0.8 to 1.2 and 1.6.

TABLE 2

| | 1250 | 1600 | 2000 | 2500 | 3150 | 4000 | 5000 | 6300 | 8000 | 10000 |
|---|---|---|---|---|---|---|---|---|---|---|
| 1.6 | −0.1 | −0.2 | −0.3 | −0.4 | −0.4 | 0.2 | 1.4 | 2.0 | 1.5 | 1.2 |
| 1.2 | 0.0 | −0.1 | −0.2 | −0.2 | −0.2 | 0.2 | 0.9 | 1.2 | 0.9 | 0.7 |
| 0.8 | 0.0 | 0.0 | 0.0 | 0.0 | 0.0 | 0.0 | 0.0 | 0.0 | 0.0 | 0.0 |

Although there is no particular limitation on the materials constituting the layers 31 and 32, the resin materials are required to be such that at least the Young's moduli of the layers can be set within respective ranges as described above. The outer layers 32 can be made of a polyvinyl butyral resin (PVB), for example. A polyvinyl butyral resin has excellent adhesiveness to the glass sheets and penetration resistance and is thus preferable. On the other hand, the core layer 31 can be made of an ethylene vinyl acetate resin (EVA) or a polyvinyl acetal resin, which is softer than the polyvinyl butyral resin included in the outer layers. When the soft core layer is sandwiched between the outer layers, it is possible to significantly improve the sound insulation performance while keeping the adhesiveness and the penetration resistance that are equivalent to those of a single-layered resin interlayer.

Generally, the hardness of a polyvinyl acetal resin can be controlled by adjusting (a) the degree of polymerization of polyvinyl alcohol, which is the starting material, (b) the degree of acetalization, (c) the type of plasticizer, (d) the ratio of the plasticizer to be added, and the like. Accordingly, a hard polyvinyl butyral resin that is used for the outer layers and a soft polyvinyl butyral resin that is used for the core layer can be produced with the same polyvinyl butyral resin by appropriately adjusting at least one condition selected from the aforementioned conditions. Furthermore, the hardness of a polyvinyl acetal resin can be controlled based on the type of aldehyde that is used for acetalization and whether co-acetalization using a plurality of kinds of aldehydes or pure acetalization using a single kind of aldehyde is performed. Although not necessarily applicable to every case, the larger the number of carbon atoms of the aldehyde that is used to obtain a polyvinyl acetal resin, the softer the resulting polyvinyl acetal resin tends to be. Accordingly, for example, if the outer layers are made of a polyvinyl butyral resin, a polyvinyl acetal resin that is obtained by acetalizing an aldehyde having 5 or more carbon atoms (e.g., n-hexyl aldehyde, 2-ethylbutyl aldehyde, n-heptyl aldehyde, or n-octyl aldehyde) with polyvinyl alcohol can be used for the core layer. It should be noted that there is no limitation to the above-mentioned resins and the like as long as predetermined Young's moduli can be obtained.

The total thickness of the interlayer 3 is not particularly specified, but is preferably 0.3 to 6.0 mm, more preferably 0.5 to 4.0 mm, and particularly preferably 0.6 to 0.2 mm. Meanwhile, the thickness of the core layer 31 is preferably 0.1 to 2.0 mm and more preferably 0.1 to 0.6 mm. If the thickness is less than 0.1 mm, the soft core layer 31 is unlikely to have an effect, and if the thickness is more than 2.0 mm or 0.6 mm, the total thickness is increased, resulting in an increase in cost. On the other hand, the thickness of each of the outer layers 32 is not particularly limited, but is preferably 0.1 to 2.0 mm and more preferably 0.1 to 1.0 mm, for example. Alternatively, it is also possible to fix the total thickness of the interlayer 3 and adjust the thickness of the core layer 31 without exceeding the fixed total thickness.

Figure 5:
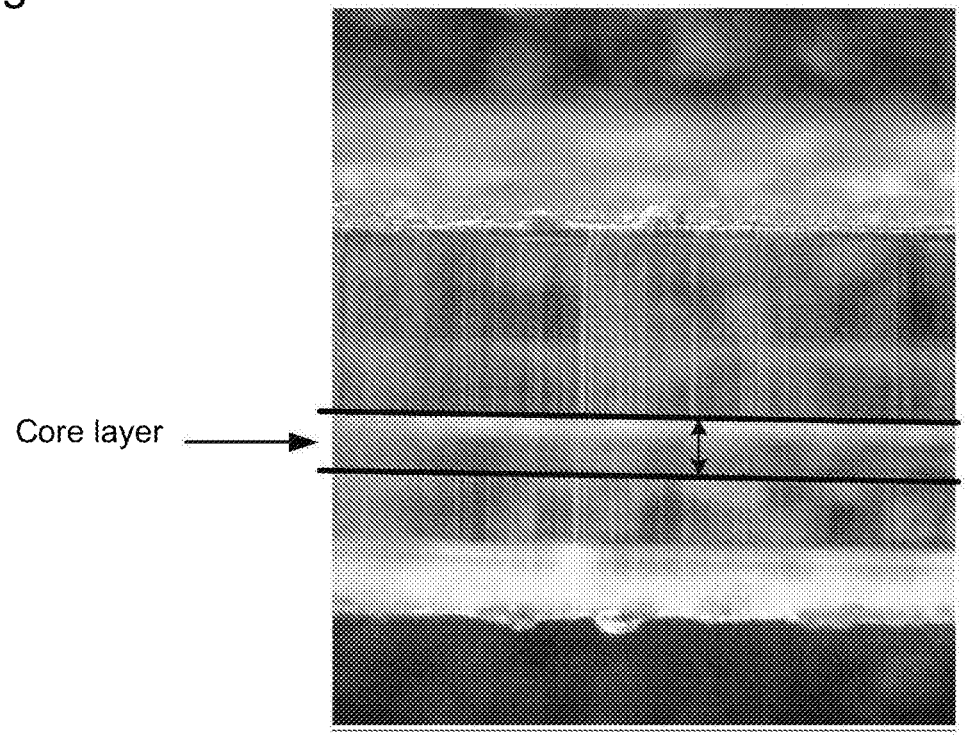
FIG. 5 is an example of an image that is used for measurement of a core layer.

The thickness of the core layer 31 can be measured as described below, for example. First, the cross section of a laminated glass is enlarged by a factor of 175 and displayed using a microscope (e.g., VH-5500 manufactured by Keyence Corporation). Then, the thickness of the core layer 31 is visually identified and measured. At this time, in order to eliminate variations seen in visual identification, the measurement is performed five times, and an average value is taken as the thickness of the core layer 31. For example, an enlarged photograph of a laminated glass as shown in FIG. 5 is taken, in which the core layer has been identified, and the thickness of the identified core layer is measured.

It should be noted that the interlayer 3 is not required to have a constant thickness over the entire surface. For example, the interlayer 3 can also have a wedge shape so as to be suited to a laminated glass that is used for a head-up display. In this case, the thickness of the interlayer 3 is measured at a position with the smallest thickness, that is, in the lowest side portion of the laminated glass. If the interlayer 3 has a wedge shape, the outer glass sheet and the inner glass sheet are not arranged in parallel, but it should be construed that such an arrangement is also included in the "opposite arrangement" of the outer glass sheet and the inner glass sheet of the present invention. That is, the "opposite arrangement" of the present invention includes the arrangement of the outer glass sheet and the inner glass sheet when the interlayer 3 whose thickness increases at a rate of change of 3 mm or less per meter, for example.

Although there is no particular limitation on the method of manufacturing the interlayer 3, examples thereof include a method in which a resin component, such as the above-described polyvinyl acetal resin, a plasticizer, and other additives, if necessary, are mixed and uniformly kneaded, and then the layers are collectively extruded, and a method in which two or more resin films that are produced using this method are laminated with a pressing process, a lamination process, or the like. In the method of laminating with the pressing process, the lamination process, or the like, each of the resin films before laminating may have a single-layer structure or may have a multilayer structure.

3. Infrared Transmittance of Laminated Glass

As mentioned above, the laminated glass according to this embodiment is used in a windshield of an automobile for a front safety system using a laser radar, a camera, or the like.

In such safety systems, infrared rays are emitted toward a preceding vehicle to measure the velocity of a preceding automobile and the distance to the preceding automobile. Therefore, infrared transmittance in a predetermined range is required to be achieved in the laminated glass.

With regard to such a transmittance, when a regular sensor is used in a laser radar, for example, a useful transmittance with respect to light (infrared rays) having a wavelength of 850 to 950 nm is 20% or more and 80% or less, and preferably 20% or more and 60% or less. A method of measuring transmittance is performed in accordance with JIS R3106, and UV3 100 (manufactured by Shimadzu Corporation) can be used as a measurement apparatus. Specifically, a transmittance with respect to unidirectional light that is emitted at a right angle to the surface of the laminated glass is measured.

Some of the safety systems as mentioned above use not a laser radar but an infrared camera to measure the velocity of a preceding vehicle and the distance to the preceding vehicle. In such a case, when a regular camera is used in a laser radar, for example, a useful transmittance with respect to light (infrared rays) having a wavelength of 700 to 800 nm is 30% or more and 80% or less, and preferably 40% or more and 60% or less. A method of measuring transmittance is performed in accordance with ISO9050.

4. Method of Manufacturing Laminated Glass

There is no particular limitation on the method of manufacturing the laminated glass according to this embodiment, and a conventionally known method of manufacturing a laminated glass can be adopted. For example, first, the interlayer 3 is sandwiched between the outer glass sheet 1 and the inner glass sheet 2, and these are placed into a rubber bag and preliminarily bonded together at about 70 to 110° C. under vacuum suction. Preliminary bonding can be performed using a method other than this method. For example, the interlayer 3 is sandwiched between the outer glass sheet 1 and the inner glass sheet 2, and these are heated at 45 to 65° C. in an oven. Subsequently, this laminated glass is pressed by a roller at 0.45 to 0.55 MPa. Then, this laminated glass is again heated at 80 to 105° C. in an oven and thereafter again pressed by a roller at 0.45 to 0.55 MPa. Thus, preliminary bonding is finished.

Next, permanent bonding is performed. The preliminarily bonded laminated glass is permanently bonded using an autoclave at a pressure of 8 to 15 atmospheres and at 100 to 150° C. Specifically, permanent bonding can be performed under the conditions of a pressure of 14 atmospheres and 145° C. Thus, the laminated glass according to this embodiment is manufactured.

5. Vehicle Body

The laminated glass according to this embodiment can be applied to window glasses of various automobiles. Since the laminated glass according to this embodiment has excellent sound insulation performance with respect to a sound in a frequency band higher than or equal to 5000 Hz as described later, a significant sound insulation effect is obtained when the laminated glass according to this embodiment is attached to a hybrid car or an EV out of these automobiles. This is because motors used in hybrid cars and EVs operate at a high frequency and thus are likely to generate a high-frequency sound.

6. Usage Position in Vehicle Body

The laminated glass according to this embodiment can be applied to a window glass at any position in an automobile. However, the laminated glass according to this embodiment can be used for not only a windshield but also a side glass and a rear glass.

7. Structure to which Laminated Glass is Attached

Figure 6A:
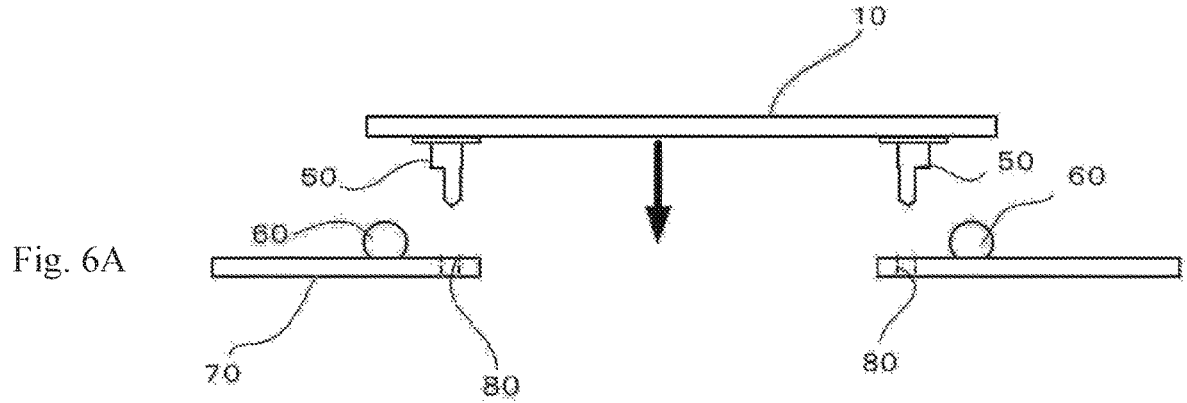
FIGS. 6A-6C are schematic diagrams showing a method of attaching a laminated glass.
Figure 6B:
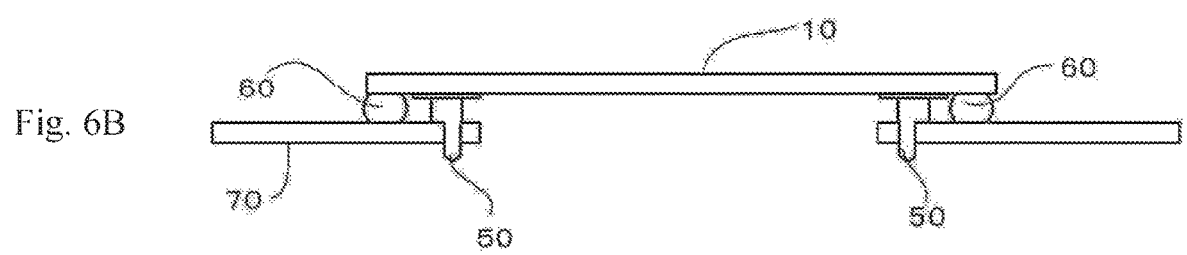

The above-described laminated glass can be attached to a structure such as an automobile or a building, for example. At this time, the laminated glass is attached to the structure via an attachment portion. For example, a frame such as a urethane frame, an adhesive material, a clamp, and the like for attachment to an automobile may correspond to the attachment portion. The following is an example of attachment to an automobile. As shown in FIG. 6A, first, pins 50 are attached to both ends of the laminated glass 10 beforehand, and an adhesive material 60 is applied to a frame 70 of an automobile, which is an attachment target. Through holes 80 into which the pins are respectively inserted are formed in the frame beforehand. Then, as shown in FIG. 6B, the laminated glass 10 is attached to the frame 70. First, the pins 50 are inserted into the respective through holes 80, and the laminated glass 10 is temporarily fixed to the frame 70. At this time, the pins 50 are inserted only halfway into the respective through holes 80 because a step is formed in each of the pins 50, and therefore, a gap is created between the frame 70 and the laminated glass 10. In this gap, the above-described adhesive material 60 is applied, and thus the laminated glass 10 and the frame 70 are fixed to each other via the adhesive material 60 as time elapses.

Figure 6C:
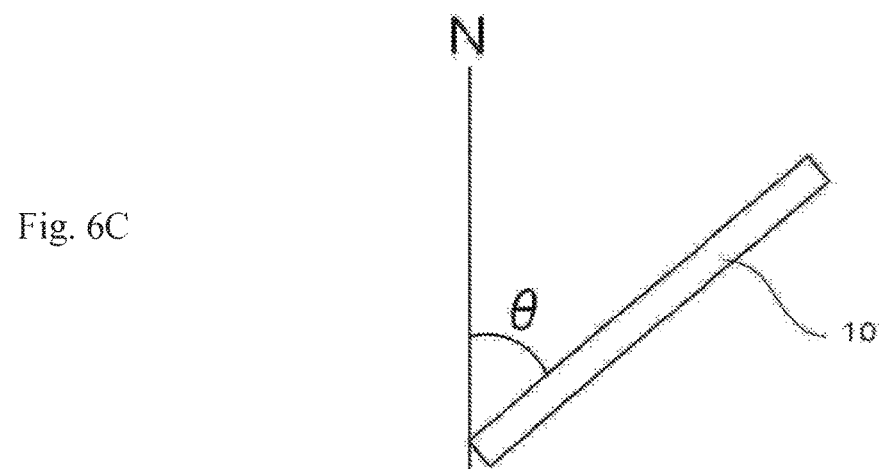

In attaching the laminated glass to the structure as described above, the attachment angle θ of the laminated glass 10 is preferably set at an angle of 45 degrees or less to the vertical N, as shown in FIG. 6C.

8. Features 8.1

With this embodiment, the following effects can be obtained by setting the Young's modulus of the core layer 31, which forms a portion of the interlayer 3, to a value as small as 1 to 20 MPa at a frequency of 100 Hz and a temperature of 20° C. First, if the interlayer has a large Young's modulus, even a laminated glass has strong properties that act like a single glass panel. Moreover, as shown in the above-described Formula 1, generally, the smaller the thickness or the Young's modulus of a glass panel, the more the coincidence frequency is shifted toward the high-frequency side.

Figure 7:
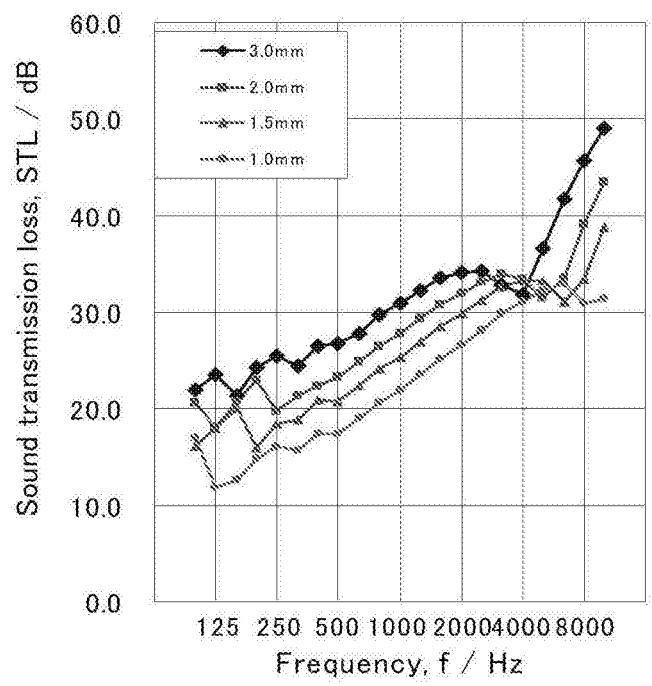
FIG. 7 is a graph showing a relationship between frequency and sound transmission loss with respect to pieces of single-sheet glass having varying thicknesses.

Taking these into account, for example, if the interlayer 3 has a large Young's modulus, even a laminated glass having a total thickness of 4 mm has a coincidence frequency of 3 to 4 kHz, similar to a single sheet of glass having a thickness of 4 mm, and thus the performance in a frequency band that humans can easily hear is low. On the other hand, if the interlayer 3 has a small Young's modulus, the performance of the laminated glass is a combined performance of two glass sheets. For example, the performance of a laminated glass constituted by a 2-mm glass sheet and a 1-mm glass sheet would tend to be a combined performance of the two glass sheets. That is, the thickness of each of the glass sheets shown in FIG. 7 is smaller than 4 mm, and therefore, their coincidence frequencies is shifted toward the high-frequency side, so that the 2-mm glass sheet has a coincidence frequency around 5000 Hz, and the 1-mm glass sheet has a coincidence frequency at 8000 Hz. The performance of a laminated glass including these glass sheets having the respective thicknesses of 1 mm and 2 mm is a combined performance of these glass sheets, and therefore, this laminated glass has a coincidence frequency between 5000 and 8000 Hz. It should be noted that FIG. 7 is a graph showing the relationship between frequency and sound transmission loss with respect to single sheets of glass rather than a laminated glass.

Thus, in this embodiment, the Young's modulus of the core layer 31, which forms a portion of the interlayer 3, is set to 1 to 20 MPa at a frequency of 100 Hz and a temperature of 20° C. so that the performance of the laminated glass is a combined performance of the outer glass sheet 1 and the inner glass sheet 2. For this reason, even if the thickness of the inner glass sheet 2 is set to be as small as 0.4 to 2.0 mm, the sound insulation performance does not decrease at frequencies that humans can easily hear. That is, the coincidence frequency is shifted toward the high-frequency side by reducing the thickness of the inner glass sheet 2, and therefore, the sound transmission loss that has decreased in a frequency range of 2000 to 5000 Hz due to the reduction in the thickness of the inner glass sheet 2 as described above can be increased. Consequently, it is possible to reduce the weight of the laminated glass and also improve the sound insulation performance in the frequency range of 2000 to 5000 Hz, which humans can easily hear.

8.2

Moreover, the following effects can be obtained by setting the Young's modulus of each of the outer layers 32, which form a portion of the interlayer 3, to 560 MPa or more at a frequency of 100 Hz and a temperature of 20° C.

That is, the inventors of the invention have found that an increase in the Young's modulus of each of the outer layers 32 of the interlayer 3 improved the sound insulation performance in a frequency range of about 4000 Hz or higher. For example, it was found that when compared with a commonly used outer layer having a Young's modulus of 441 Hz (20° C., 100 Hz), the use of the outer layers 32 having a Young's modulus of 560 MPa (20° C., 100 Hz) improved the STL at a frequency of 6300 Hz by 0.3 dB. Generally, humans are considered as being capable of recognizing a change in sound of 0.3 dB or more. Thus, a sound insulation effect that can be recognized by humans can be achieved in a high frequency range by increasing the Young's modulus. Also, it was found that the higher the Young's moduli of the outer layers 32, the higher the sound insulation performance. For example, it was found that if the Young's modulus is 880 MPa (20° C., 100 Hz) or more, the STL would be reduced by 1.0 dB or more at a frequency of 6300 Hz, and if the Young's modulus is 1300 MPa (20° C., 100 Hz) or more, the STL would be further reduced.

On the other hand, it is known that in a low frequency range of 1000 to 3500 Hz, an increase in the Young's modulus of the outer layer would result in a decrease in the STL. However, it was also found that this decrease is small.

Moreover, as shown in the above-mentioned Formula 1, generally, the smaller the thickness or the Young's modulus of a glass panel, the more the coincidence frequency is shifted toward a high-frequency side.

Accordingly, it is advantageous to use the outer layers 32 having a high Young's modulus in a laminate glass having a small thickness as described above.

As mentioned above, for example, setting the thickness of the inner glass sheet 2 to 0.6 to 2.0 mm and the thickness of the outer glass sheet 1 to 1.8 to 2.3 mm, and reducing the total thickness of the laminated glass 10 to 3.8 mm or less contributes to setting a transmittance with respect to light having a wavelength of 850 to 950 nm (infrared rays) to be 20% or more and 80% or less. Therefore, the laminated glass 10 can be adopted as a windshield for a safety system using a laser radar.

9. Modified Examples

Although an embodiment of the present invention has been described above, the present invention is not limited to the above embodiment, and various modifications can be carried out without departing from the gist of the invention. It should be noted that modified examples below can be implemented in combination as appropriate. Moreover, modified examples below can be implemented in the same manner as in the above embodiment (e.g., manufacturing method) unless otherwise stated.

9.1

A laminated glass according to the example below is applied to a windshield for an automobile. In particular, this laminated glass is applied to a windshield in which a front safety system using a laser radar or the like is employed.

Figure 8:
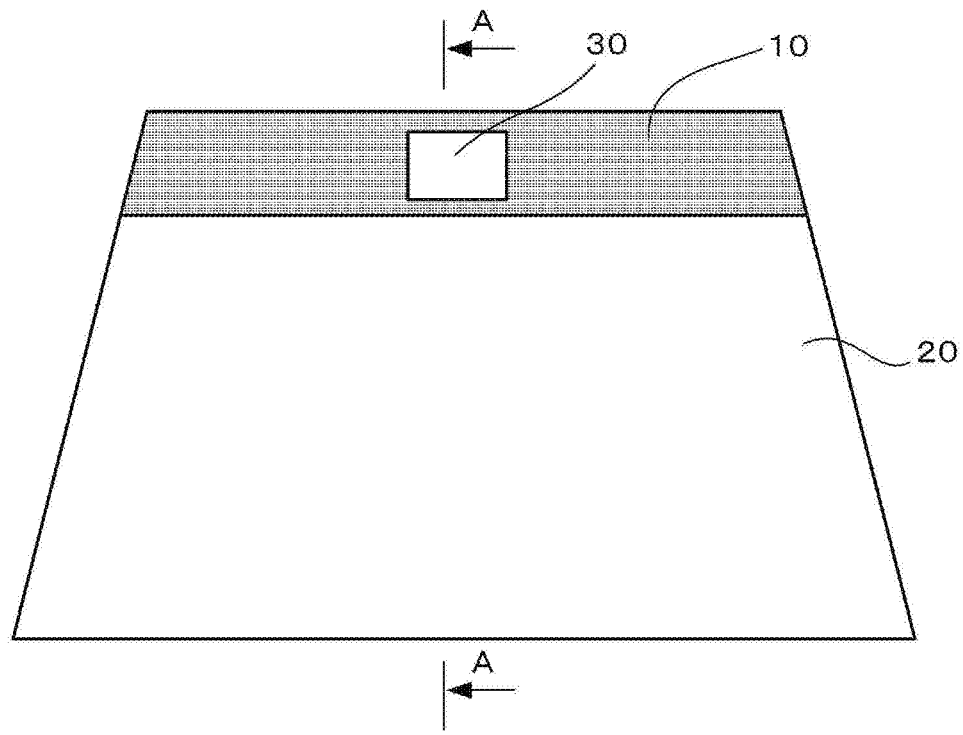
FIG. 8 is a plan view showing another example of a laminated glass according to the present invention.
Figure 9:
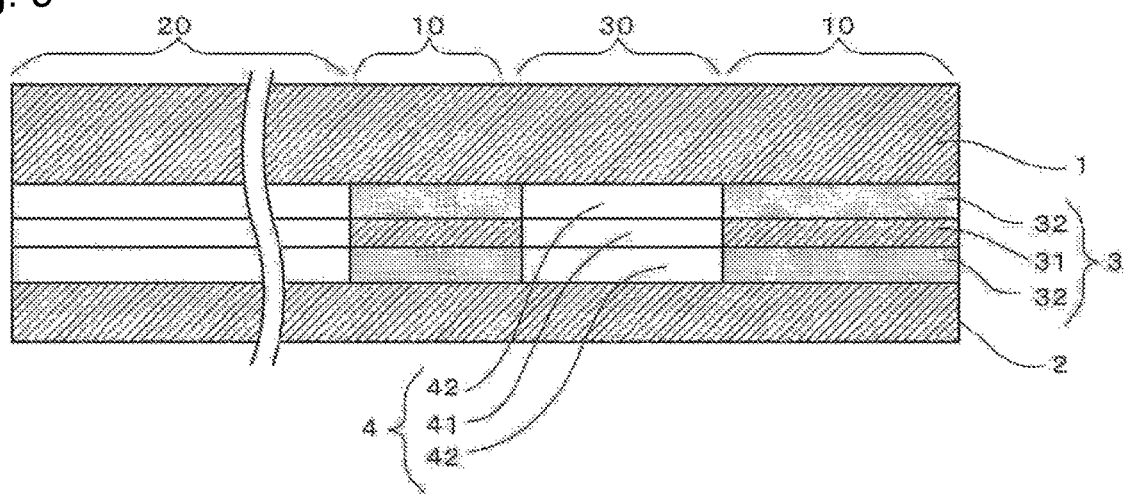
FIG. 9 is a cross-sectional view taken along line A-A in FIG. 8.

FIG. 8 is a front view of this laminated glass, and FIG. 9 is a cross-sectional view taken along line A-A in FIG. 8. As shown in FIG. 8 and FIG. 9, this laminated glass includes an outer glass sheet 1, an inner glass sheet 2, and a first interlayer 3 and a second interlayer 4 that are sandwiched between these glass sheets. The outer glass sheet 1 is a glass sheet to be arranged on a side that is likely to be subject to disturbance, and the inner glass sheet 2 is a glass sheet to be arranged on the side opposite to the outer glass sheet 1. Accordingly, the outer glass sheet constitutes the glass sheet on the exterior side of an automobile. However, depending on possible disturbance, the arrangement may be reversed.

Moreover, a shading region 10 having a high transmission loss with respect to visible light and a visual field region 20 having a low transmission loss are formed in this laminated glass. The shading region 10 is formed by coloring a region along the entire upper edge of the laminated glass, and exhibits various functions (e.g., antiglare function and heat shielding function) accompanied with light reduction. On the other hand, the visual field region 20 is used as an optical window. These two regions 10 and 20 are formed using the above-mentioned first interlayer 3.

A rectangular transmissive region 30 is formed at the center in the left-right direction of the shading region 10. This transmissive region 30 is a transparent region that is not colored, and transmits laser or infrared rays emitted by a device for a safety system, such as a laser radar or a camera. This region is formed using the above-mentioned second interlayer 4. The outer glass sheet 1 and the inner glass sheet 2 used here are the same as those shown in the above-mentioned embodiment, and therefore, the interlayers 3 and 4 will be mainly described below.

The first interlayer 3 includes a plurality of layers. For example, as shown in FIG. 9, the first interlayer 3 can be configured by three layers, namely a soft core layer 31 and outer layers 32 that are harder than the core layer 31 and between which the core layer 31 is sandwiched. However, there is no limitation to this configuration, and it is sufficient if the first interlayer 3 includes a plurality of layers including the soft core layer 31. For example, the first interlayer 3 may also include two layers including the core layer 31 (one core layer and one outer layer), or an odd number of five or more layers in which the core layer 31 is arranged in the center (one core layer and four outer layers), or an even number of layers in which the core layer 31 is included therebetween (one core layer with the other layers constituting outer layers).

A colored region for forming the above-described shading region 20 is formed in a portion of the first interlayer 3. This region is formed along the upper edge of the first interlayer 3, and obtained by coloring one or more of the core layer 31 and the outer layers 32 green, blue, or the like with a coloring agent such as a pigment or a dye. As the pigment, organic pigments such as azo pigments, phthalocyanine pigments, and quinacridone pigments, and inorganic pigments such as metal oxides and metal powders can be used, for example.

In the case where a pigment is used, the colored first interlayer 3 can be obtained by manufacturing a colored layer and clear layers with an extruding process using a resin composition in which a resin and a plasticizer are kneaded with a pigment and a resin composition (including a resin and a plasticizer) containing no pigments, respectively, sandwiching the colored layer between the clear layers, and molding them. On the other hand, in the case where a dye is used, a region in which the shading region 10 is to be formed is exposed using a mask, and a dye is applied to this region. The dye can be applied thereto by spraying or printing, for example. A mask can also be arranged in the above-mentioned transmissive region 30.

Details of the thicknesses, the compositions, or the like of the core layer 31 and the outer layers 32 of the first interlayer 3 are the same as those of the above embodiment.

Although there is no particular limitation on a method of manufacturing the first interlayer 3, examples thereof include a method in which a resin component, such as the above-described polyvinyl acetal resin, a plasticizer, and other additives, if necessary, are mixed and uniformly kneaded, and then the layers are collectively extruded, and a method in which two or more resin films that are produced using this method are laminated with a pressing process, a lamination process, or the like. In the method of laminating with the pressing process, the lamination process, or the like, each of the resin films before laminating may have a single-layer structure or may have a multilayer structure. Laminating may be performed after the shading region is formed by coloring any layer or the shading region may be formed by coloring either of the outer layers after laminating.

Next, the second interlayer 4 will be described. The second interlayer 4 includes a core layer 41 and outer layers 42 in the same manner as the first interlayer 3. The second interlayer 4 has no color and is transparent unlike the first interlayer 3, and is different in shape from the first interlayer 3. There is no limitation on the size and the shape of the second interlayer 4, and it is sufficient if the second interlayer 4 has such a size that light emitted by the above-described laser radar or camera can pass through the second interlayer 4. The second interlayer 4 can be attached to the first interlayer 3 with various methods, and is attached to the first interlayer 3 as shown in FIG. 10, for example.

Figure 10A:
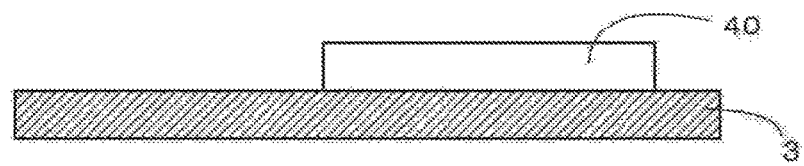
FIGS. 10A-10C are diagrams showing a method of attaching a second interlayer.
Figure 10B:
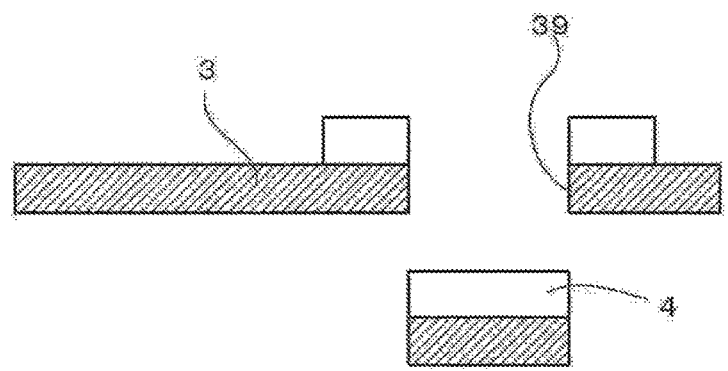
Figure 10C:

First, as shown in FIG. 10A, a film material 40 for a normal second interlayer 4 containing no coloring agent and the like is laid on the first interlayer 3 in which the shading region 10 has been formed at one end portion beforehand. At this time, the film material is arranged at a position in the shading region 10 at which the transmissive region 30 is to be formed. Next, as shown in FIG. 10B, both the first interlayer 3 and the film material 40 are punched using a mold having the shape of the transmissive region 30. Subsequently, as shown in FIG. 10C, a through hole 39 is formed by removing the punched region of the first interlayer 3, and the second interlayer 4 obtained by punching the film material 40 is fitted into this through hole 39. Lastly, the border portion around the through hole 39 is temporarily bonded by being heated at about 100 to 200° C., for example, using a soldering iron or the like, thus making it possible to reliably eliminate a gap or a step between the first interlayer 3 and the second interlayer 4. However, this method is merely an example, and another method may be used as long as the second interlayer 4 can be arranged in the through hole 39 of the first interlayer 3. It should be noted that the transmissive region 30 may be formed inside the shading region 10 or near the boundary between the shading region 10 and the visual field region 20 so as to be open toward the visual field region.

In the laminated glass configured as described above, it is possible to improve the sound insulation performance in the frequency range of 2000 to 5000 Hz as described above by setting the Young's modulus of the core layer to 1 to 20 MPa (frequency 100 Hz, temperature 20° C.), for example. It is also possible to improve the sound insulation performance in the frequency range of about 4000 Hz or higher as described above by setting the Young's modulus of each of the outer layers to 560 MPa or more (frequency 100 Hz, temperature 20° C.), for example.

The transparent transmissive region 30, which is formed using the second interlayer 4, is formed in the shading region 10 of the first interlayer 3. Accordingly, laser or infrared rays emitted by a laser radar or a camera of a safety system can be caused to pass through this transmissive region 30. Therefore, even if the shading region 10 is formed, the safety system can be operated due to the transmissive region 30. Since the transmissive region 30 is formed using the second interlayer 4 made of the same materials as those of the first interlayer 3, the same sound insulation effect as described above can be obtained.

9.2

A laminated glass used in a windshield or the like has a problem in that ice covering its surface causes poor visibility and the difference in temperature between the inside and the outside of a vehicle causes fog. Therefore, the laminated glass according to the present invention can be configured as follows.

Figure 11:
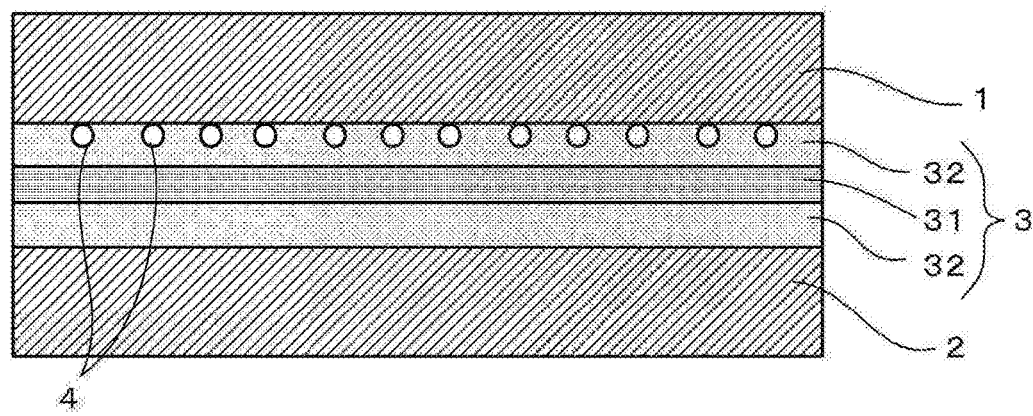
FIG. 11 is a cross-sectional view showing another example of a laminated glass according to the present invention.

A laminated glass shown in FIG. 11 includes the outer glass sheet 1, the inner glass sheet 2, and the interlayer 3 sandwiched between these glass sheets, and furthermore, a plurality of heating wires 4 are arranged between the outer glass sheet 1 and the interlayer 3. Configurations other than the heating wires are the same as the configurations described above.

Known heating wires can be used as the heating wires. That is, a plurality of heating wires are arranged at a predetermined interval between the two glass sheets 1 and 2, and a current is applied thereto. There is no particular limitation on the arrangement of the heating wires, and the heating wires may be arranged so as to extend in the longitudinal direction of the glass sheets or in the lateral direction of the glass sheets. Moreover, conductive wires for applying a current to the heating wires can be arranged along the edges of the glass sheets.

There is no particular limitation on the method of manufacturing a laminated glass in which heating wires are arranged as mentioned above, and a conventionally known method of manufacturing a laminated glass can be adopted. First, a plurality of heating wires are arranged on the surface of the interlayer, for example. This can be achieved with various methods, and can be achieved as mentioned in JP H10-6939A, for example. The interlayer on which the heating wires are arranged is then sandwiched between the outer glass sheet 1 and the inner glass sheet 2, and these are placed into a rubber bag and preliminarily bonded together at about 70 to 110° C. under vacuum suction. This method of preliminary bonding is the same as the method described above, and the same applies to the subsequent permanent bonding. Lastly, conductive wires for applying a current to the heating wires are arranged to complete the laminated glass. It should be noted that such conductive wires can also be arranged in a later step such as a step of attachment to an automobile.

In the laminated glass configured as described above, it is possible to improve the sound insulation performance in the frequency range of about 4000 Hz or higher as described above by setting the Young's modulus of each of the outer layers to 560 MPa or more (frequency 100 Hz, temperature 20° C.), for example. It is also possible to improve the sound insulation performance in the frequency range of 2000 to 5000 Hz as described above by setting the Young's modulus of the core layer to 1 to 20 MPa (frequency 100 Hz, temperature 20° C.), for example.

In addition, as described above, the heating wires 4 are arranged in the laminated glass, and therefore, heat can be generated by applying a current, thus making it possible to melt ice generated on the laminated glass and eliminate fog. Furthermore, the following effects can be obtained. This point will be described with reference to FIG. 12.

Figure 12:
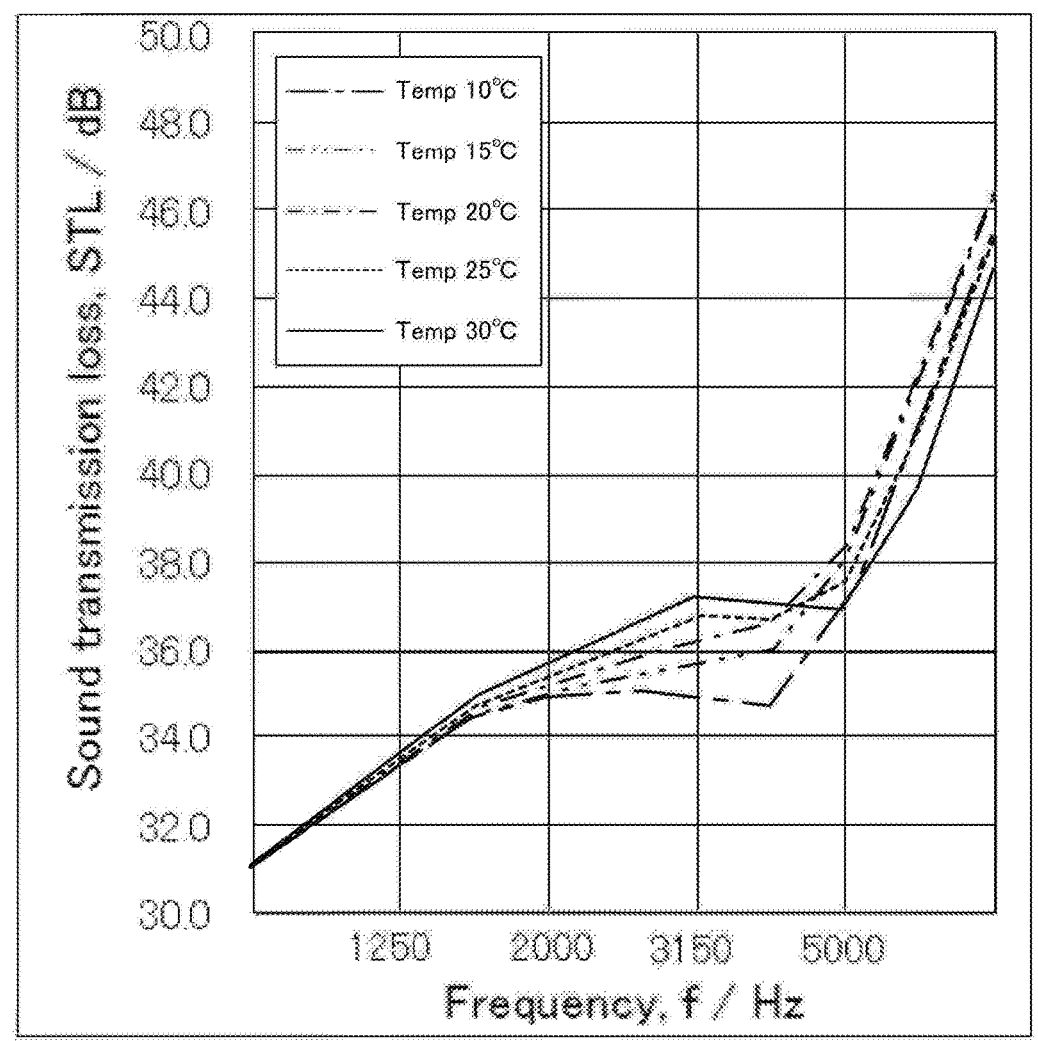
FIG. 12 is a graph showing a relationship between frequency and sound transmission loss with respect to a laminated glass.

FIG. 12 shows the results of simulations of the relationship between frequency and sound transmission loss in the interlayer for five different temperatures. In this example, a laminated glass in which an interlayer having a Young's modulus of 441 MPa and a thickness of 0.76 mm is arranged between two glass sheets each having a thickness of 2 mm is used as a target. It can be seen from this graph that there is a tendency that when the temperature of the interlayer is high, the sound transmission loss is improved in the frequency range of 5000 Hz or lower, and that the higher the temperature, the higher the sound insulation performance in this frequency range. On the other hand, it can be seen that there is a tendency that as the temperature of the interlayer is increased, the sound transmission loss generally decreases in the frequency range higher than 5000 Hz.

In contrast, when the heating wires 4 are used, the temperature of the outer layer, which is in contact with the heating wires 4, is increased due to generated heat, but at this time, as shown in FIG. 12, the increase in temperature causes a decrease in sound transmission loss in the frequency range higher than 5000 Hz. Accordingly, in this embodiment, it is possible to suppress the decrease in sound transmission loss by using the outer layer having a high Young's modulus of 560 MPa or more even when the temperature increases.

In particular, when the Young's modulus of the second outer layer 322, which is not in direct contact with the heating wires 4, is increased, it is possible to suppress the increase in temperature of the outer layer 322 and to prevent the decrease in sound insulation performance. Moreover, arranging the heating wires 4 so as to come into contact with the outer glass sheet 1 makes it possible to melt ice on the laminated glass and to effectively eliminate fog caused by the outside air.

A laminated glass in which such heating wires are arranged can also be configured as follows. For example, although the heating wires are arranged between the outer glass sheet and the interlayer in the above example, the heating wires 4 can be arranged at any position. For example, although the heating wires are arranged between the outer glass sheet 1 and the first outer layer 321 in the above example, the heating wires can also be arranged between the inner glass sheet and the second outer layer. In this case, setting the Young's modulus of the first outer layer 321, which is not in direct contact with the heating wires 4, to 560 MPa or more (20° C., 100 Hz) makes it possible to suppress the increase in temperature of the outer layer 321 and to prevent the decrease in sound insulation performance as described above. The heating wires 4 can also be arranged on the surface of the outer glass sheet 1 or the surface of the inner glass sheet 2. Furthermore, the Young's moduli of all the outer layers 321 and 322 can also be set to 560 MPa or more (20° C., 100 Hz).

A heat shielding means can be provided between the heating wires 4 and the outer layer 32. There are various forms of heat shielding means, and a known heat-ray reflecting film can be used, for example. Use of the heat-ray reflecting film makes it possible to prevent heat transfer due to infrared radiation from the outside of the vehicle. It is also possible to considerably suppress the transfer of influence of heat generated by the heating wires 4, on the outer layer 32. There are various configurations of the heat-ray reflecting film, and the heat-ray reflecting film can be formed by alternately laminating an oxide layer and a metal layer on a resin film serving as a base material, for example. In this case, the heat-ray reflecting film does not adhere to a glass sheet, and therefore, it is necessary to arrange the glass sheet, the outer layer, the heating wires, the heat-ray reflecting film, the outer layer, the core layer, and the outer layer in this order. That is, the heat-ray reflecting film is sandwiched between the outer layers, and the outer layer is adhered to the glass sheet. The glass sheet here may be the outer glass sheet or a thin side glass sheet.

It is also possible to arrange the outer layer having a high Young's modulus so as to come into contact with the heating wires. With this arrangement, the heating wires are supported by the outer layer having a high hardness, thus making it possible to prevent disordering of the arrangement of the heating wires during the manufacturing. That is, there is a risk that at manufacturing, the outer layer is softened due to heat, followed by the disordering of the arrangement of the heating wires such as a shift of the positions of the heating wires from predetermined positions, but this can be prevented by bringing the heating wires into contact with the outer layer having a high hardness as described above.

9.3

A laminated glass used in a windshield or the like also has a problem in that light incident from the outside of a vehicle into the inside of the vehicle increases the temperature of the inside of the vehicle. Moreover, light from the outside has an influence on the field of vision, and therefore, there is also a demand for the adjustment of the amount of transmitted light. To solve these problems, the windshield can be configured as follows.

Figure 13:
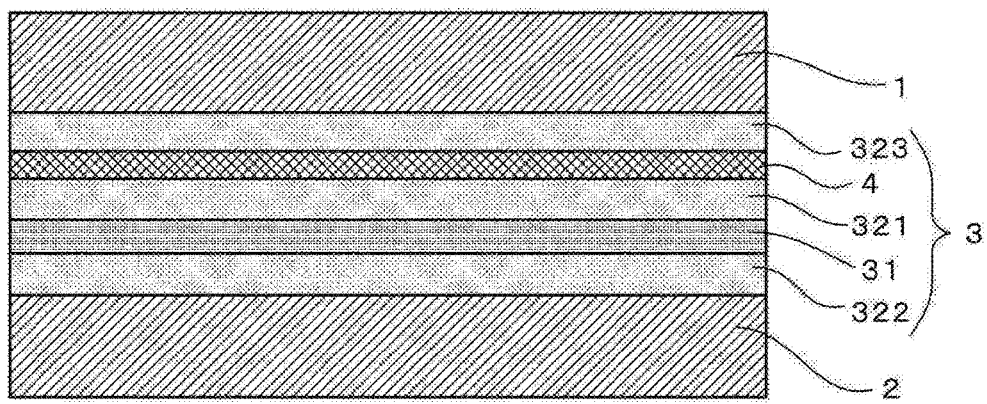
FIG. 13 is a cross-sectional view showing another example of a laminated glass according to the present invention.

A laminated glass shown in FIG. 13 includes the outer glass sheet 1, the inner glass sheet 2, and the interlayer 3 sandwiched between these glass sheets. The interlayer 3 can be configured as follows.

For example, as shown in FIG. 13, the interlayer 3 can be formed by forming a three-layer structure in which a soft core layer 31 is sandwiched between outer layers 321 and 322 that are harder than the core layer 31 and then providing a functional film 4 and an additional outer layer 323 on the outer glass sheet 1 side of the three-layer structure to form a five-layer structure. However, there is no limitation to this configuration, and the interlayer 3 in which an even number of two or more of the outer layers are arranged on each side of the core layer 31 so that the core layer 31 is arranged at the center, or the interlayer 3 in which an odd number of outer layers are arranged on one side of the core layer 31 and an even number of outer layers are arranged on the other side so that the core layer 31 is sandwiched therebetween can also be formed. Here, for the convenience of description, an outer layer arranged on the outer glass sheet 1 side is referred to as "first outer layer 321" and an outer layer arranged on the inner glass sheet 2 side is referred to as "second outer layer 322", the core layer 31 being sandwiched between the first outer layer 321 and the second outer layer 322, and an outer layer that is in contact with the outer glass sheet 1 is referred to as "third outer layer 323". The functional film 4 is sandwiched between the first outer layer 321 and the third outer layer 323.

The core layer 31 and the outer layers 32 are as described above, and therefore, the functional film 4 will be described hereinafter. As the functional film, it is possible to use various films that add a specific function to the laminated glass. A heat-ray reflecting film, a light control film, and the like can be adopted, for example.

9.3-1. Heat-Ray Reflecting Film

There is no particular limitation on the heat-ray reflecting film as long as the heat-ray reflecting film is a film that reflects heat rays. The heat-ray reflecting film can be formed by alternately laminating an oxide layer and a metal layer on a resin film serving as a base material, for example. It should be noted that a layer having another function, such as a protecting layer, may be formed on a main surface that is not in contact with the resin film.

There is no particular limitation on the resin film as long as the resin film is basically made of a transparent material. The resin film can be made of polycarbonate, polymethyl methacrylate (PMMA), polyethylene terephthalate (PET), polyethylene naphthalate, polyimide, polyether sulfone, polyarylate, nylon, cycloolefin polymer, or the like, for example.

Since polyethylene terephthalate (PET) has a relatively high hardness, a resin film made of polyethylene terephthalate (PET) is generally used from the viewpoint of suppressing damage during the manufacturing of the laminated glass. Although the thickness of the resin film is not necessarily limited, the thickness is preferably 5 µm or more and 200 µm or less, and more preferably 20 µm or more and 100 µm or less.

It is sufficient if the oxide layer included in the heat-ray reflecting film generally has a refractive index (refractive index at a wavelength of 550 nm; the same applies hereinafter) of 1.7 or more and 2.6 or less, and particularly 1.8 or more and 2.6 or less. The oxide layer is made of a metal oxide such as bismuth oxide, tin oxide, zinc oxide, tantalum oxide, niobium oxide, tungsten oxide, titanium oxide, zirconium oxide, and indium oxide, or a mixture thereof, or zinc oxide containing tin, aluminum, chromium, titanium, silicon, boron, magnesium, indium, gallium, or the like, or indium oxide containing tin.

Among these, zinc oxide or zinc oxide containing at least one element selected from tin, aluminum, chromium, titanium, silicon, boron, magnesium, indium, gallium, or the like is preferably used, and zinc oxide containing aluminum and/or titanium is particularly preferably used, because the metal layer can be stably formed while the metal layer has high crystallizability. It should be noted that each oxide layer may have a single-layer structure or a multilayer structure.

On the other hand, the metal layer contains silver as a main component, and is made of only silver or an alloy containing silver as a main component. The metal layer contains palladium, gold, copper, and the like as components other than silver, and the total content of the components other than silver is preferably 0.3 atom % or more and 10 atom % or less.

The thicknesses of the oxide layers and the metal layers vary depending on the total number of the layers and the materials of the layers. For example, each of the oxide layers has a thickness of 5 nm or more and 100 nm or less, each of the metal layers has a thickness of 5 nm or more and 20 nm or less, and the total thickness of all the oxide layers and the metal layers is 50 nm or more and 400 nm or less and preferably 150 nm or more and 300 nm or less.

It should be noted that the heat-ray reflecting film includes layers having a high refractive index and layers having a low refractive index instead of the above-mentioned oxide layers and metal layers. In general, the total number of layers having a high refractive index and layers having a low refractive index is 3 or more. Each of the layers having a high refractive index has a thickness of 70 nm or more to 150 nm or less, and each of the layers having a low refractive index has a thickness of 100 nm or more and 200 nm or less.

Each of the layers having a high refractive index has a refractive index of 1.9 or more, and preferably 1.9 or more and 2.5 or less, for example. Specifically, each of the layers having a high refractive index is made of at least one selected from materials having a high refractive index such as tantalum oxide, titanium oxide, zirconium oxide, and hafnium oxide.

Moreover, each of the layers having a low refractive index has a refractive index of 1.5 or less, and preferably 1.2 or more and 1.5 or less, for example. Specifically, each of the layers having a low refractive index is made of at least one selected from materials having a low refractive index such as silicon oxide and magnesium fluoride.

9.3-2. Light Control Film

A known light control film can be adopted as the light control film, and the light control film includes a liquid crystal layer having a light control function in which a plurality of pores are filled with liquid crystal, a pair of transparent conductive films between which the liquid crystal layer is sandwiched, and a pair of polyethylene terephthalate films (PET films) between which the transparent conductive films are sandwiched. The liquid crystal layer is made of a transparent polymer film having a large number of pores, and the pores are filled with liquid crystal to form liquid crystal capsules. Moreover, a voltage is applied to the pair of transparent conductive films.

While no voltage is applied to this light control film, liquid crystal molecules align not in a direction in which transmitted light that passes through the liquid crystal capsule moves but along the curved surface of the wall of the liquid crystal capsule, and therefore, an optical path of transmitted light is curved and incident light is scattered in the boundary layer between the liquid crystal capsule and the polymer film, resulting in a milk white liquid crystal layer. On the other hand, while a voltage is applied to the transparent conductive film, liquid crystal molecules align in a direction of a generated electric field. At this time, if the liquid crystal layer is made of materials that allow the refractive index of the polymer film and the refractive index of the liquid crystal molecules with respect to ordinary rays to be the same, a boundary layer between the liquid crystal capsule and the polymer film does not optically exist. As a result, transmitted light that is incident into the liquid crystal layer can pass through the liquid crystal layer as it is, resulting in a transparent liquid crystal layer.

As described above, the light control film has a visual field control function of blocking the visual field by scattered incident light while no voltage is applied and ensuring the visual field by transmitting the incident light as it is while a voltage is applied. Accordingly, the amount of transmitted light can be adjusted.

The above-mentioned light control film is a liquid crystal type light control film, and in addition, known light control films in various forms such as a SPD (Suspended Particle Device) type, an electrochromic type, and a thermochromic type can be used. As the base material, a heat-shrinkable film such as a PET film is used.

Although there is no particular limitation on the method of manufacturing the interlayer 3, one example thereof is a method in which a resin component, such as the above-described polyvinyl acetal resin, a plasticizer, and other additives, if necessary, are mixed and uniformly kneaded, then the first and second outer layers 321 and 322 and the core layer 31 are collectively extruded, and the third outer layer 323 and the functional film 4 are laminated thereon with a pressing process, a lamination process, or the like. Alternatively, after being molded, all of the layers can also be stacked and then laminated with a pressing process or a lamination process. It should be noted that the functional film 4 itself does not adhere to the glass sheets 1 and 2 as it is and thus needs to be sandwiched between the outer layers. The functional film 4 can also be arranged on the inner glass sheet 2 side. In this case, in the interlayer 3, the outer layer, the core layer, the outer layer, the functional film, and the outer layer are arranged in this order from the outer glass sheet 1 side.

In the laminated glass configured as described above, it is possible to improve the sound insulation performance in the frequency range higher than or equal to about 4000 Hz as described above by setting the Young's modulus of each of the outer layers to 560 MPa or more (frequency 100 Hz, temperature 20° C.), for example. It is also possible to improve the sound insulation performance in the frequency range of 2000 to 5000 Hz as described above by setting the Young's modulus of the core layer to 1 to 20 MPa (frequency 100 Hz, temperature 20° C.), for example.

Moreover, in this laminated glass, the functional film 4 is arranged in the interlayer 3, and therefore, it is possible to provide various functions to the interlayer 3. In particular, in this laminated glass, the heat-ray reflecting film, the light control film, or the like is arranged as the functional film 4, and it is possible to control light from the outside in the laminated glass.

Particularly in the case where the heat-shrinkable functional film 4 is used, sandwiching this functional film 4 between the first and third outer layers 321 and 323, which each have a high Young's modulus, makes it possible to suppress shrinkage during the manufacturing of the laminated glass, that is, during the preliminary bonding and the permanent bonding. As a result, it is possible to prevent the occurrence of orange peel. For example, in the case where the functional film is made of a heat-shrinkable film such as a polyethylene terephthalate film, orange peel is likely to occur due to heat shrinkage in the autoclave during the manufacturing of the laminated glass, but the configuration as mentioned above suppresses the occurrence of orange peel. It should be noted that the heat-ray reflecting film has a smaller thickness and a lower rigidity compared with the light control film, and orange peel tends to occur in the case of the heat-ray reflecting film.

Here, if a heat-ray reflecting film is used as the functional film 4, heat incident from the outside of a vehicle is reflected off the vehicle outer side with respect to the first outer layer 321, the core layer 31, and the second outer layer 322. This makes it possible to obtain the following effects.

First, the sound insulation performance as shown in FIG. 12 is obtained depending on the change in temperature of the interlayer. In contrast, when the heat-ray reflecting film is arranged between the first outer layer 321 and the third outer layer 323 as mentioned above, heat is reflected toward the outside of a vehicle before reaching the first outer layer 321, thus making it possible to suppress heat from reaching the first outer layer 321 and the third outer layer 323. Accordingly, it is possible to suppress an increase in the temperature of these outer layers 321 and 323, and as a result, it is possible to prevent the decrease in the sound insulation performance in the frequency range higher than 5000 Hz.

It should be noted that although the functional film 4 is arranged on the outer glass sheet 1 side in the above-mentioned example, the functional film 4 can also be arranged on the inner glass sheet 2 side. In this case, in the interlayer 3, the outer layer, the core layer, the outer layer, the functional film, and the outer layer are arranged in this order from the outer glass sheet 1 side.

9.4

A laminated glass used in a windshield or the like also has a problem in that light incident from the outside of a vehicle into the inside of the vehicle increases the temperature of the inside of the vehicle. Therefore, in the laminated glass in FIG. 1, ITO fine particles, which are one type of infrared shielding particles, can be dispersed and mixed in at least one outer layer, for example. It should be noted that for the convenience of the description below, an outer layer that is in contact with the outer glass sheet is referred to as "first outer layer 321", and an outer layer that is in contact with the inner glass sheet is referred to as "second outer layer 322".

The ITO fine particles are made of indium tin oxide, which is a complex oxide containing indium oxide and tin oxide at a weight ratio of about 9:1. The average particle diameter of the ITO fine particles used here is preferably set to 0.2 μm or less, and more preferably 0.1 μm or less. This is because fine particles having an average particle diameter of larger than 0.2 μm or aggregated coarse particles serve as a light scattering source of the molded interlayer to dim the interlayer.

The total content of the ITO fine particles in the two outer layers 321 and 323 is preferably 0.4 g/m$^2$ or more and 0.8 g/m$^2$ or less, for example. This is because there is a possibility that setting the total content of the ITP fine particles to less than 0.4 g/m$^2$ will cause a heat shielding effect as per infrared shielding to be insufficient and that setting the total content of the ITO fine particles to larger than 0.8 g/m$^2$ will cause an increase in cost.

Moreover, the content of the ITO fine particles in one of the first outer layer 321 and the second outer layer 323 is larger than the content of the ITO fine particles in the other.

That is, the content of the ITO fine particles in one outer layer is set to 51 to 100% of the entire ITO fine particles, and the content thereof in the other outer layer is set to 0 to 49%. Here, the content of the ITO fine particles in one outer layer is preferably 70 to 90%, and more preferably 100%. Although the outer layer containing the ITO fine particles in a larger amount may be the first outer layer 321 or the second outer layer 323, if the content of the ITO fine particles in the first outer layer 321, which is adjacent to the outer glass sheet 1, is set to be larger, a larger amount of infrared rays is absorbed at a position apart from the inside of a vehicle, thus contributing to preventing an increase in temperature of the inside of the vehicle.

As a method of measuring the content of the ITO fine particles in the interlayer 3, a method can be used in which the interlayer 3 is cut into a piece having a size of about 1 cm×6 cm, the piece is decomposed using an acid, and the amounts of Sn and In in the resulting solution is determined with a plasma atomic emission spectrometry.

The interlayer 3 containing the ITO fine particles can be manufactured as follows. For example, the ITO fine particles dispersed in a plasticizer are kneaded and mixed into a resin to be included in the outer layer 32 using a roll mixer. Then, as described above, the resulting resin material is melted, and is molded together with the core layer 31 using an extruder to provide the sheet-shaped interlayer 3. When a vinyl resin composition is used and molded into a sheet shape to provide the outer layer 32, for example, a heat stabilizer, an antioxidant, and the like may be mixed into the vinyl resin composition as needed, and an adhesive strength adjusting agent (e.g., metal salt) may also be mixed into the vinyl resin composition in order to improve the penetrability of the sheet.

In order to improve the dispersion state in vinyl resin, these ITO fine particles may be dispersed in a plasticizer and then added to the vinyl resin. As the plasticizer, plasticizers that are generally used for an interlayer can be used, and they may be used alone or in a combination of two or more. Specifically, triethyleneglycol-di-2-ethylhexanoate (3GO), triethyleneglycol-di-2-ethylbutyrate (3GH), dihexyl adipate (DHA), tetraethyleneglycol-di-heptanoate (4G7), tetraethyleneglycol-di-2-ethylhexanoate (4GO), triethyleneglycol-di-heptanoate (3G7), and the like are preferably used, for example. The addition amount of such plasticizers is preferably 30 to 60 parts by weight with respect to 100 parts by weight of the vinyl resin.

Other additives may be added to the vinyl resin. Examples of additives include various pigments, ultraviolet absorbers, and light stabilizers. Although there is no particular limitation on the ultraviolet absorbers, benzotriazole-based ultraviolet absorbers are preferably used, for example. A specific example is "Tinuvin P" manufactured by Ciba-Geigy. Although there is no particular limitation on the light stabilizers, hindered amine-based light stabilizers are preferably used. A specific example is "ADK STAB LA-57" manufactured by Asahi Denka Kogyo K.K.

In the laminated glass configured as described above, it is possible to improve the sound insulation performance in the frequency range higher than or equal to about 4000 Hz as described above by setting the Young's modulus of each of the outer layers to 560 MPa or more (frequency 100 Hz, temperature 20° C.), for example. It is also possible to improve the sound insulation performance in the frequency range of 2000 to 5000 Hz as described above by setting the Young's modulus of the core layer to 1 to 20 MPa (frequency 100 Hz, temperature 20° C.), for example.

Moreover, the two outer layers 321 and 323 included in the interlayer 3 of this example contain the ITO fine particles. Therefore, since infrared rays from the outside of a vehicle are absorbed by the ITO fine particles in a windshield, it is possible to suppress infrared rays from reaching the inside of the vehicle, and as a result, it is possible to prevent an increase in temperature of the inside of the vehicle. In addition, in the interlayer 3, the content of the ITO fine particles in one outer layer is larger than the content of the ITO fine particles in the other outer layer, thus making it possible to obtain the following effects.

First, the sound insulation performance as shown in FIG. 12 is obtained depending on the change in temperature of the interlayer. Accordingly, when the content of the ITO fine particles in one outer layer is reduced, the amount of absorbed infrared rays decreases, and an increase in temperature of this outer layer is suppressed, thus making it possible to prevent the decrease in the sound insulation performance in the frequency range higher than 5000 Hz. In the laminated glass as described above, the content of the ITO fine particles in one outer layer is reduced, and the decrease in the amount of the absorbed infrared rays is ensured by increasing the content of the ITO fine particles in the other outer layer. Accordingly, the sound insulation performance is improved in the other outer layer while the entire amount of absorbed infrared rays is maintained, thus preventing the decrease in the sound insulation performance with respect to a sound having a frequency higher than 5000 Hz. It should be noted that the sound insulation performance with respect to a sound having a frequency higher than 5000 Hz is achieved by the sound insulation performance of at least one of the outer layers. For these reasons, it is preferable to cause only one of the two outer layers 321 and 322 to contain the ITO fine particles.

As described above, when the outer layers contain the ITO fine particles, the sound insulation performance in the frequency range higher than 5000 Hz decreases due to the increase in temperature of the outer layers. However, in this embodiment, the sound insulation performance in the frequency range higher than or equal to 4000 Hz is improved by setting the Young's modulus of each of the outer layers 32 to 560 MPa or more at a frequency of 100 Hz and a temperature of 20° C. Accordingly, even if the temperatures of the outer layers are increased due to the ITO fine particles, it is possible to prevent the decrease in the sound insulation performance in the frequency range higher than 5000 Hz.
9.5

Figure 14:
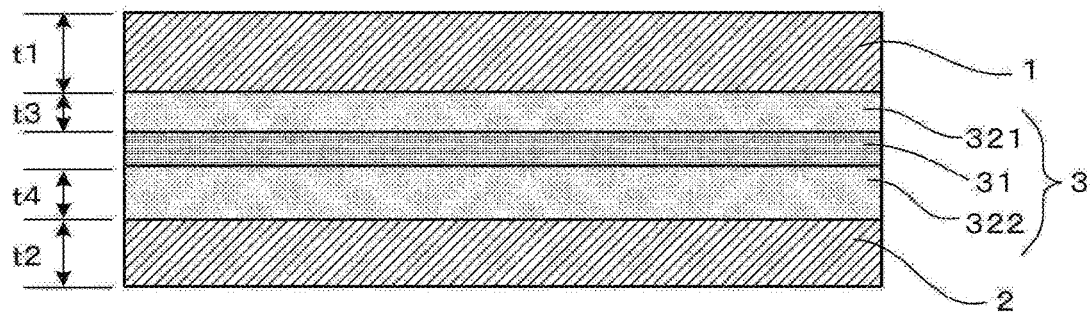
FIG. 14 is a cross-sectional view showing another example of a laminated glass according to the present invention.

A laminated glass shown in FIG. 14 includes the outer glass sheet 1, the inner glass sheet 2, and the interlayer 3 sandwiched between these glass sheets. The interlayer 3 can be configured as follows. For example, as shown in FIG. 14, the interlayer 3 can be constituted by three layers in which the soft core layer 31 is sandwiched between a pair of outer layers 321 and 322 that are harder than the core layer 31. Here, an outer layer on the outer glass sheet 1 side is referred to as "first outer layer 321", and an outer layer on the inner glass sheet 2 side is referred to as "second outer layer 322". However, there is no limitation to this configuration, and each of the outer layers 321 and 322 can also be constituted by a plurality of layers.

The Young's moduli of the core layer 31 and each of the outer layers 32 are as described above. The total thickness of the interlayer 3 is not particularly specified, but is preferably 0.3 to 6.0 mm, more preferably 0.5 to 4.0 mm, and particularly preferably 0.6 to 2.0 mm. Meanwhile, the thickness of the core layer 31 is preferably 0.1 to 2.0 mm and more preferably 0.1 to 0.6 mm. If the thickness is less than 0.1 mm, the soft core layer 31 is unlikely to have an effect, and if the thickness is more than 2.0 mm or 0.6 mm, the total thickness is increased, resulting in an increase in cost.

The thickness of each of the outer layers 321 and 322 is adjusted as follows. That is, as shown in FIG. 14, a thickness t3 of the first outer layer 321 is smaller than a thickness t4 of the second outer layer 322. In particular, it is preferable to adjust the thicknesses t3 and t4 of the outer layers 321 and 322 such that the total thickness (t1+t3) of the first outer layer 321 and the outer glass sheet 1 is the same as the total thickness (t2+t4) of the second outer layer 322 and the inner glass sheet 2. Although there is no particular limitation on specific thicknesses of the outer layers 321 and 322 as long as the thicknesses t3 and t4 of the outer layers 321 and 322 are adjusted in this manner, the thicknesses t3 and t4 are preferably 0.1 to 2.0 mm and more preferably 0.1 to 1.0 mm, for example.

In the above laminated glass, the Young's modulus of the core layer 31, which forms a portion of the interlayer 3, can be set to be smaller than the Young's modulus of each of the outer layers 321 and 322. For this reason, the performance of the laminated glass is a combined performance of the outer glass sheet 1 and the inner glass sheet 2 (this is as described above). As a result, it is possible to prevent the decrease in the sound insulation performance at frequencies that humans can easily hear. For example, even if the thickness of the inner glass sheet 2 is set to be smaller than the thickness of the outer glass sheet 1, the coincidence frequency is shifted toward the high-frequency side, and therefore, the STL that has decreased in the frequency range of 2000 to 5000 Hz can be increased. Consequently, it is possible to reduce the weight of the laminated glass and also improve the sound insulation performance in the frequency range of 2000 to 5000 Hz, which humans can easily hear. In particular, the above-described effects are significantly exhibited by setting the Young's modulus of the core layer 31 to be as small as 50 MPa or less at a frequency of 100 Hz and a temperature of 20° C.

When the interlayer as mentioned above is used, the following effects are obtained.

That is, in this example, the thickness t3 of the first outer layer 321 on the thick outer glass sheet 1 side is reduced, and the thickness t4 of the second outer layer 322 on the thin inner glass sheet 2 side is increased. Therefore, although the thicknesses t1 and t2 of the glass sheets 1 and 2 differ from each other, the difference in thickness between members that are arranged on both sides of the core layer 31 such that the core layer is sandwiched between the members (difference in total thickness of the glass sheet and the outer layer) is small. Here, it is thought that since the outer layers 321 and 322 have a higher Young's modulus than that of the core layer 31, the outer layer 321 exhibits the sound insulation performance as if it is a member that is approximately integral with the glass sheets 1 and 2. Accordingly, the difference in thickness between members that are arranged on both sides of the core layer 31 such that the core layer is sandwiched between the members is small, thus making it possible to prevent the decrease in the sound insulation performance due to the thicknesses of the glass sheets 1 and 2 being different. As a result, it is possible to achieve both weight reduction and sound insulation.

In particular, when the total thickness (t1+t3) of the outer glass sheet 1 and the first outer layer 321 is set to be the same as the total thickness (t2+t4) of the inner glass sheet 2 and the second outer layer 322, the members arranged on both sides of the core layer 31 such that the core layer is sandwiched between the members have the same thickness, and therefore, it is thought that the laminated glass exhibits approximately the same sound insulation performance as that of a laminated glass including glass sheets having the same thickness. Accordingly, it is possible to significantly improve the sound insulation performance.

Moreover, in the laminated glass configured as described above, it is possible to improve the sound insulation performance in the frequency range higher than or equal to about 4000 Hz as described above by setting the Young's modulus of each of the outer layers to 560 MPa or more (frequency 100 Hz, temperature 20° C.), for example. It is also possible to improve the sound insulation performance in the frequency range of 2000 to 5000 Hz as described above by setting the Young's modulus of the core layer to 1 to 20 MPa (frequency 100 Hz, temperature 20° C.), for example.

9.6

Figure 15:
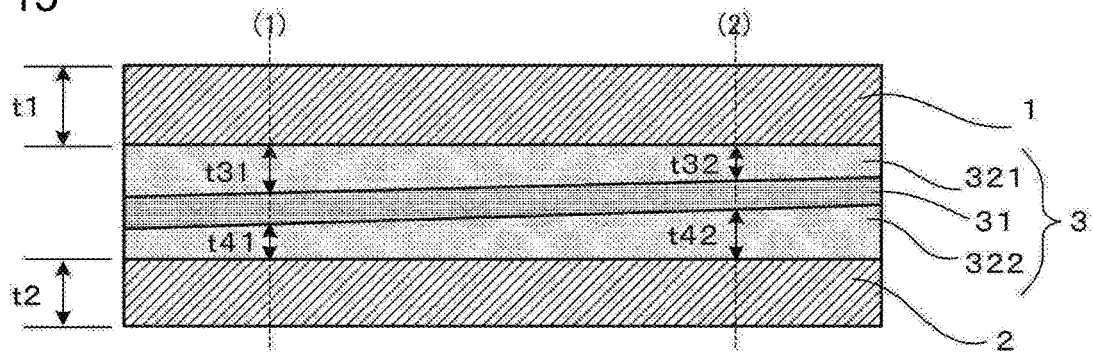
FIG. 15 is a cross-sectional view showing another example of a laminated glass according to the present invention.

A laminated glass shown in FIG. 15 includes the outer glass sheet 1, the inner glass sheet 2, and the interlayer 3 sandwiched between these glass sheets. The interlayer 3 can be configured as follows. For example, as shown in FIG. 15, the interlayer 3 can be constituted by three layers in which the soft core layer 31 is sandwiched between the pair of outer layers 321 and 322 that are harder than the core layer 31. Here, an outer layer on the outer glass sheet 1 side is referred to as "first outer layer 321", and an outer layer on the inner glass sheet 2 side is referred to as "second outer layer 322". However, there is no limitation to this configuration, and each of the outer layers 321 and 322 can also be constituted by a plurality of layers.

Although the thickness of the interlayer, and the like are as described above, the thicknesses of the outer layers can be adjusted as shown in FIG. 15, for example. That is, the first outer layer 321 is formed such that the thickness t3 gradually decreases from one end portion in a surface direction of the interlayer 3 (left side in FIG. 15) toward the other end portion (right side in FIG. 15). Specifically, the first outer layer 321 is formed such that a surface that is in contact with the core layer 31 is inclined from one end portion toward the other end portion, and the cross section has a trapezoidal shape. Hereinafter, such a direction in which the thickness changes from the one end portion toward the other end portion is referred to as "inclination direction". On the other hand, the second outer layer 322 is formed such that its thickness gradually decreases from the other end portion in a surface direction of the interlayer 3 (right side in FIG. 15) toward the one end portion (left side in FIG. 15). Specifically, the second outer layer 322 is formed such that a surface that is in contact with the core layer 31 is inclined from the other end portion toward the one end portion, and the cross section has a trapezoidal shape.

At this time, the total thickness of the first outer layer 321 and the second outer layer 322 can be made constant at any position between the one end portion and the other end portion in the surface direction of the interlayer 3. For example, as shown in FIG. 15, the total (t31+t41) of a thickness t31 of the first outer layer 321 and a thickness t41 of the second outer layer 322 at position (1) in the inclination direction is set to be the same as the total (t32+t42) of the thickness t32 of the first outer layer 321 and the thickness t42 of the second outer layer 322 at position (2) in the inclination direction. However, they are not necessarily the same.

Figure 16:
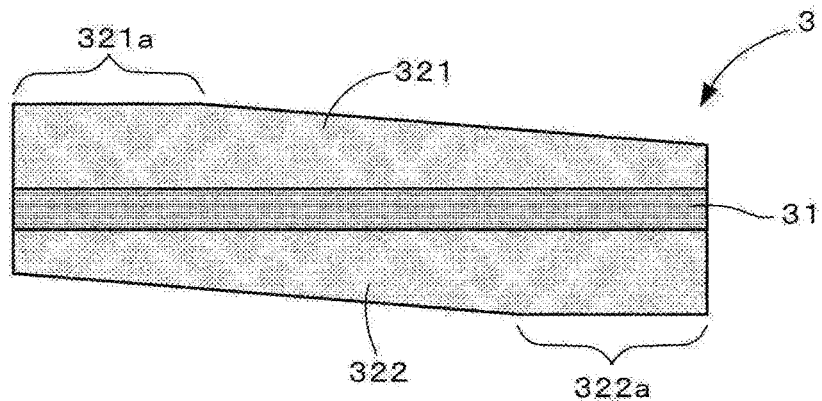
FIG. 16 is a cross-sectional view showing another example of the interlayer shown in FIG. 15.

The thickness of each of the outer layers need not be changed in the entire region between the one end portion and the other end portion in the surface direction, and may be changed in a portion of that region. For example, as shown in FIG. 16, the first outer layer 321 is formed such that a region 321a having a constant thickness is provided at one end portion in the inclination direction, and the thickness decreases from the region 321a toward the other end portion. On the other hand, the second outer layer 322 is formed such that a region 322a having a constant thickness is provided at the other end portion in the inclination direction, and the thickness decreases from the region 322a toward the one end portion. Such an interlayer 3 can be used.

It should be noted that the inclination direction can be variously set. For example, the inclination direction may be a direction extending from the upper end portion of the laminated glass toward the lower end portion, and can also be a direction extending from the left end portion toward the right end portion, or a direction extending from the right end portion toward the left end portion, or a direction extending obliquely.

Moreover, in order to change the thickness of each of the outer layers as mentioned above, it is sufficient if a metal mold having a desired shape is prepared in advance, and the outer layers are produced by extruding.

In the above laminated glass, the Young's modulus of the core layer 31, which forms a portion of the interlayer 3, can be set to be smaller than the Young's modulus of each of the outer layers 321 and 322. For this reason, the performance of the laminated glass is a combined performance of the outer glass sheet 1 and the inner glass sheet 2 (this is as described above). As a result, it is possible to prevent the decrease in the sound insulation performance at frequencies that humans can easily hear. For example, even if the thickness of the inner glass sheet 2 is set to be smaller than the thickness of the outer glass sheet 1, the coincidence frequency is shifted toward the high-frequency side, and therefore, the STL that has decreased in the frequency range of 2000 to 5000 Hz can be increased. Consequently, it is possible to reduce the weight of the laminated glass and also improve the sound insulation performance in the frequency range of 2000 to 5000 Hz, which humans can easily hear. In particular, the above-described effects are significantly exhibited by setting the Young's modulus of the core layer 31 to be as small as 50 MPa or less at a frequency of 100 Hz and a temperature of 20° C.

When the interlayer is configured as described above, the following effects are obtained. In the above example, the first outer layer 321 is formed such that the thickness t3 gradually decreases toward one end in the inclination direction. On the other hand, the second outer layer 322 is formed such that its thickness gradually decreases toward the other end in the inclination direction. The total thickness of the first outer layer 321 and the second outer layer 322 is constant at any position between the one end portion and the other end portion in the surface direction of the interlayer 3. Here, it is thought that since the outer layers 321 and 322 have a higher Young's modulus than that of the core layer 31, the outer layer 321 exhibits sound insulation performance as if it is a member that is approximately integral with the glass sheets 1 and 2.

Therefore, as mentioned above, in the case where the thickness of each of the outer layers 321 and 322 changes, in the same manner as in the case where the thickness of each of the glass sheets 1 and 2 changes, the coincidence frequency is dispersed toward the high-frequency side and the low-frequency side compared with the case where each of the glass sheets has a constant thickness. As a result, a range in which the STL decreases is extended, but a significant decrease in the STL near the coincidence frequency is suppressed, thus making it possible to improve the STL as a whole compared with the case where each of the glass sheets has a constant thickness.

Moreover, as shown in the above-mentioned Formula 1, generally, when a glass sheet has a large thickness, the coincidence frequency is shifted toward a low-frequency side, and when a glass sheet has a small thickness, the coincidence frequency is shifted toward a high-frequency side. Accordingly, in this laminated glass, a portion having a high coincidence frequency and a portion having a low coincidence frequency complement each other at any position in the inclination direction of the interlayer 3. For example, at position (1) in FIG. 15, the coincidence frequency of the first outer layer 321 decreases due to the thickness t31 being large, whereas the coincidence frequency of the second outer layer 322 increases due to the thickness t41 being small. As a result, at position (1), the coincidence frequencies and the STLs are complemented, and as described above, a range in which the STL decreases is extended, but a significant decrease in the STL near the coincidence frequency is suppressed. Such complementation is performed in the entire interlayer 3 in the inclination direction, thus making it possible to prevent the decrease in the STL.

Furthermore, when the total thickness of the first outer layer 321 and the second outer layer 322 is constant at any position in the inclination direction of the interlayer 3, the total thickness of the laminated glass does not change. Accordingly, it is possible to prevent the increase in thickness of the entire laminated glass.

There is a problem in that it is difficult to perform processing for directly changing the thickness of a glass sheet, but in this embodiment, the thickness of each of the outer layers 321 and 322, which are easily processed, is changed, thus making it possible to approximately change the thickness of a glass sheet. As a result, it is easy to improve the STL as mentioned above. However, if the thickness of each of the glass sheets 1 and 2 can be changed, an interlayer in which each of the outer layers 321 and 322 has a constant thickness can be used.

In order to cause the outer layers 321 and 322 to act as members that are approximately integral with the glass sheets as mentioned above, it is preferable that each of the outer layers has a high Young's modulus, and the Young's modulus is preferably 560 MPa or more, for example. In addition, the inventors of the invention found that an increase in the Young's modulus of each of the outer layers 321 and 322 of the interlayer 3 improved the sound insulation performance in a frequency range higher than or equal to about 4000 Hz.

9.7

Figure 17:
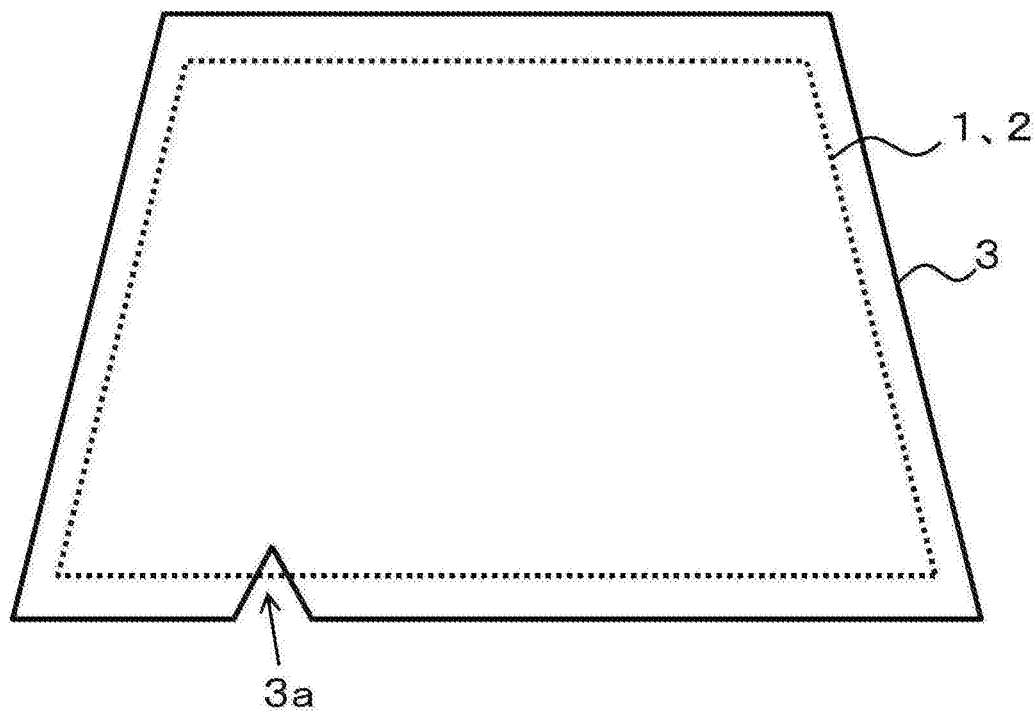
FIG. 17 shows an example of the shape of an interlayer.
Figure 18:
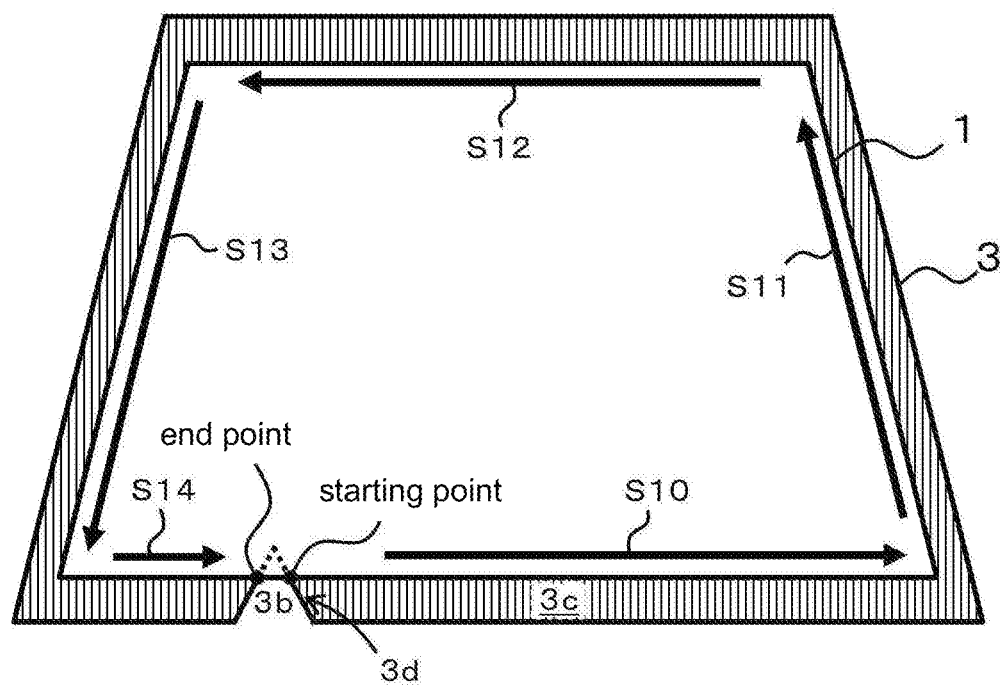
FIG. 18 shows an example of an edge cutting step.

A laminated glass can be manufactured as shown in FIG. 17 to FIG. 21, for example. However, the manufacturing of the laminated glass need not be limited to the example described below, and steps may be omitted, substituted, or added as appropriate. It should be noted that for the convenience of description, the vertical direction in FIG. 17 and FIG. 18 is taken as a "vertical direction", and the left-right direction in FIG. 17 and FIG. 18 is taken as a "left-right direction".

First, the outer glass sheet 1, and the inner glass sheet 2 capable of being arranged opposite to the outer glass sheet 1 are prepared. The outer glass sheet 1 and the inner glass sheet 2 each may be manufactured as appropriate so as to have a configuration as described above.

Next, as shown by the example in FIG. 17, the interlayer 3 having a shape larger than the shapes of the outer glass sheet 1 and the inner glass sheet 2 is prepared. FIG. 17 is a schematic plan view showing an example of the interlayer 3 formed in this step. The interlayer 3 to be used in the laminated glass according to this embodiment is formed by cutting the interlayer 3 into a larger size than the sizes of the outer glass sheet 1 and the inner glass sheet 2 from a roll of the interlayer 3. It should be noted that in this step, the interlayer 3 is formed in a curved shape so as to correspond to the shapes of the outer glass sheet 1 and the inner glass sheet 2.

A recessed notch portion 3a is formed in at least a portion of the peripheral edge portion of the interlayer 3 by cutting out a portion of any of the sides constituting the outer peripheral edge of the interlayer 3. In this embodiment, as shown by the example in FIG. 17, the triangular notch portion 3a is formed at the lower side of the interlayer 3. A method of forming the notch portion 3a may be selected as appropriate depending on an embodiment. The notch portion 3a may be formed by automatically or manually cutting out a portion of the lower side (outer peripheral edge) of the interlayer 3 using scissors corresponding to the shape of the notch portion 3a, for example.

Here, a dotted line in FIG. 17 indicates a position of each of the glass sheets (1, 2) after a permanent bonding, which will be described later, is performed. In this step of processing the interlayer 3, as shown by the example in FIG. 17, the notch portion 3a extending from the outer peripheral edge (lower side) toward the inside is formed by cutting out a portion of the lower side of the interlayer 3 such that the notch portion 3a crosses the line indicating the outer peripheral edge of each of the glass sheets (1, 2). This makes it easy to produce a cutout portion 3b, which will be described later.

Next, the interlayer 3 in which the notch portion 3a has been formed is sandwiched between the outer glass sheet 1 and the inner glass sheet 2 to form a stack of the glass sheets (laminated glass). This laminated glass is placed into a rubber bag and preliminarily bonded together by being heated at about 70 to 110° C. under vacuum suction. Preliminary bonding can be performed using a method other than this method. For example, the laminated glass in which the interlayer 3 is sandwiched between the outer glass sheet 1 and the inner glass sheet 2 is heated at 45 to 65° C. in an oven. Subsequently, this laminated glass is pressed by a roller at 0.45 to 0.55 MPa. Then, this laminated glass is again heated at 80 to 105° C. in an oven and thereafter again pressed by a roller at 0.45 to 0.55 MPa. Thus, preliminary bonding of the laminated glass is finished.

It should be noted that a step of preliminarily cutting out the outer peripheral edge of the interlayer 3 may be performed before this preliminary bonding step is performed. For example, after the interlayer 3 is sandwiched between the outer glass sheet 1 and the inner glass sheet 2, a protruding portion of the interlayer 3 that protrudes from the outer glass sheet 1 and the inner glass sheet 2 may be cut out along the outer peripheral edge of each of the glass sheets (1, 2). Thereafter, preliminary bonding of the laminated glass may be performed by placing the laminated glass in which the protruding portion of the interlayer 3 has been cut out, into a rubber bag and heating this at about 70 to 110° C. under vacuum suction.

Next, permanent bonding of the laminated glass is performed. The preliminarily bonded laminated glass is permanently bonded using an autoclave at a pressure of 8 to 15 atmospheres and at 100 to 150° C. Specifically, permanent bonding can be performed under the conditions of a pressure of 14 atmospheres and 145° C. Thus, the interlayer 3 is bonded by thermocompression between the outer glass sheet 1 and the inner glass sheet 2. That is, this permanent bonding step corresponds to the "step of performing thermocompression bonding on an interlayer" according to the present invention. It should be noted that before this permanent bonding, a portion of the interlayer 3 protruding from the outer peripheral edge of each of the glass sheets (1, 2) may be preliminarily cut out (preliminary edge cutting step) automatically or manually.

Lastly, as shown by the example shown in FIG. 18, to finish the manufacturing of the laminated glass, an edge cutting step is performed in which a portion of the interlayer 3 that protrudes from the outer peripheral edge of each of the glass sheets (1, 2) is cut out. As described above, the interlayer 3 according to this embodiment is formed so as to correspond to the shape of each of the glass sheets (1, 2) and have a larger size than the sizes of the glass sheets (1, 2). Meanwhile, the notch portion 3a is provided in this interlayer 3 by cutting out a portion of the interlayer 3 such that the notch portion 3a extends from the lower side toward the inside (toward the upper side in the diagram) and crosses the line indicating the outer peripheral edge of each of the glass sheets (1, 2).

Therefore, in the peripheral edge portion of the interlayer 3, a portion provided with the notch portion 3a does not protrude from the outer peripheral edge of each of the glass sheets (1, 2) toward the outside, and constitutes the cutout portion 3b, which is aligned with the outer peripheral edge of each of the glass sheets (1, 2) or enters the inside with respect to the outer peripheral edge. On the other hand, in the peripheral edge portion of the interlayer 3, a portion in which the notch portion 3a is not provided constitutes a protruding portion 3c that protrudes from the outer peripheral edge of each of the glass sheets (1, 2) toward the outside.

Figure 19:
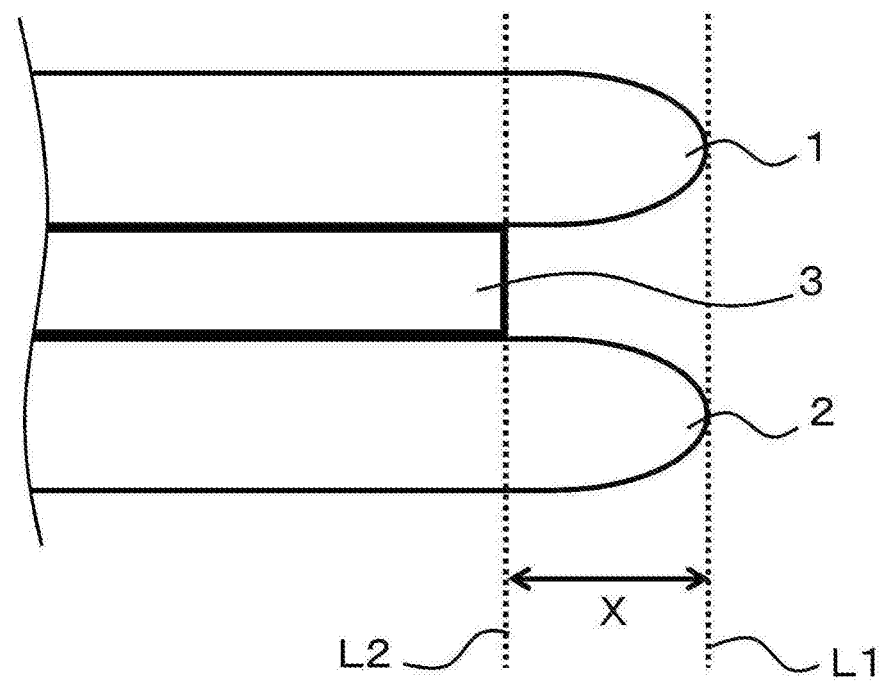
FIG. 19 shows an example of states of a glass sheet and an interlayer in a cutout portion.
Figure 20:
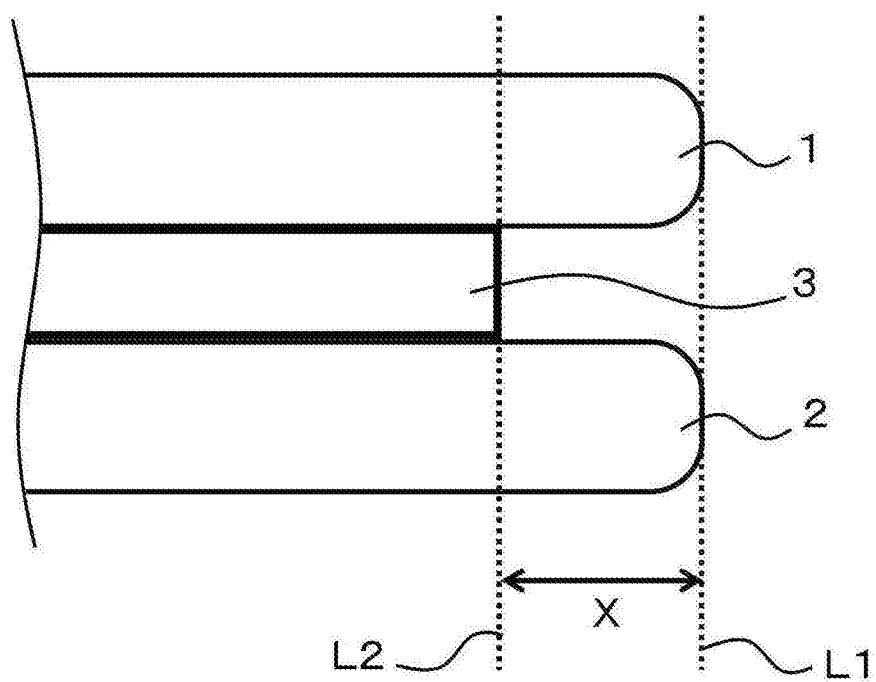
FIG. 20 shows an example of states of a glass sheet and an interlayer in a cutout portion.

Here, a state of the cutout portion 3b will be described in detail with reference to FIG. 19 and FIG. 20. FIG. 19 and FIG. 20 are schematic cross-sectional views showing an example of states of the glass sheets (1, 2) and the interlayer 3 in the cutout portion 3b. As shown by the example of this embodiment, the edge surface at the outer peripheral edge of each of the glass sheets (1, 2) is polished into a curved shape. In this case, the position of the outer peripheral edge of each of the outer glass sheet 1 and the inner glass sheet 2 is indicated by line L1. The position of the outer peripheral edge of the interlayer 3 is indicated by line L2. It should be noted that the shape of the outer peripheral edge of each of the glass sheets (1, 2) may be selected as appropriate depending on an embodiment. The outer peripheral edge of each of the glass sheets (1, 2) may be polished into an elliptic shape as shown by the example in FIG. 19 or a beveled shape as shown by the example in FIG. 20.

When the protruding portion 3c of the interlayer 3 is cut out along the outer peripheral edge of each of the outer glass sheet 1 and the inner glass sheet 2, a cutter blade for cutting out the protruding portion 3c is arranged along line L1 so as to come into contact with the outer peripheral edge of each of the outer glass sheet 1 and the inner glass sheet 2. Therefore, in this embodiment, in order to facilitate the cutting of the edge, the cutout portion 3b is configured such that line L2, which indicates the outer peripheral edge of the interlayer 3, is superposed on line L1 or located on the inside with respect to line L1 (on the left side of the diagram).

However, if the interlayer 3 excessively enters the inside with respect to the outer peripheral edge of each of the glass sheets (1, 2), a recess in the side wall of the laminated glass becomes conspicuous, and thus the external appearance of the laminated glass deteriorates. Moreover, the laminated glass may be adversely affected by rainwater or the like entering this recessed portion. In order to avoid such an adverse effect, distance X between the outer peripheral edge of each of the glass sheets (1, 2) and the outer peripheral edge of the interlayer 3 in the cutout portion 3b is set to be in a range of 0 mm to 3.0 mm, for example.

It should be noted that a state in which distance X is 0 mm corresponds to a state in which the outer peripheral edge of the interlayer 3 is aligned with the outer peripheral edge of each of the glass sheets (1, 2) in the cutout portion 3b. In this embodiment, the notch portion 3a is formed such that the outer peripheral edge of the interlayer 3 in the cutout portion 3b enters the inside with respect to the outer peripheral edge of each of the glass sheets (1, 2) in at least a partial region of the cutout portion 3b. However, the configuration of the notch portion 3a need not be necessarily limited to this example, and the notch portion 3a may be formed such that the outer peripheral edge of the interlayer 3 in the cutout portion 3b is aligned with the outer peripheral edge of each of the glass sheets (1, 2) in the entire region of the cutout portion 3b.

As described above, in this example, the cutout portion 3b, which does not protrude from the outer peripheral edge of each of the glass sheets (1, 2) toward the outside, and the protruding portion 3c, which protrudes from the outer peripheral edge of each of the glass sheets (1, 2) toward the outside, are formed at the peripheral edge portion of the interlayer 3. Therefore, in the above-mentioned edge cutting step, the protruding portion 3c is cut out along the outer peripheral edge of each of the glass sheets (1, 2) using this cutout portion 3b as a starting point. Specifically, as shown by the example in FIG. 18, the cutting is started from the boundary between the cutout portion 3b and the protruding portion 3c on the right side, namely an end portion 3d of the protruding portion 3c. A cutter blade is brought into contact with this starting point and automatically or manually moved (S10 to S14 in the diagram) in a state in which the cutter blade is in contact with the outer peripheral edge of each of the glass sheets (1, 2). Thus, the protruding portion 3c is cut out along the outer peripheral edge of each of the glass sheets (1, 2).

When the cutter blade is moved along the outer peripheral edge of each of the glass sheets (1, 2) for approximately one cycle and reaches the end point, cutting out the protruding portion 3c is completed, and this edge cutting step is finished. It should be noted that it is sufficient if the cutout portion 3b is formed so as to have a size with which the cutter blade can enter the cutout portion 3b, and in this example, the cutout portion 3b is provided in a partial region of the lower side, which is one of the sides constituting the outer peripheral edge of the interlayer 3. In response to this, the size of the notch portion 3a may be adjusted corresponding to the size of this cutout portion 3b. Moreover, the starting point and the end point of the cutting may be exchanged. Furthermore, the order to cut out the protruding portion 3c need not be particularly limited, and the order may be selected as appropriate depending on an embodiment. Thus, the laminated glass is manufactured.

Figure 21:
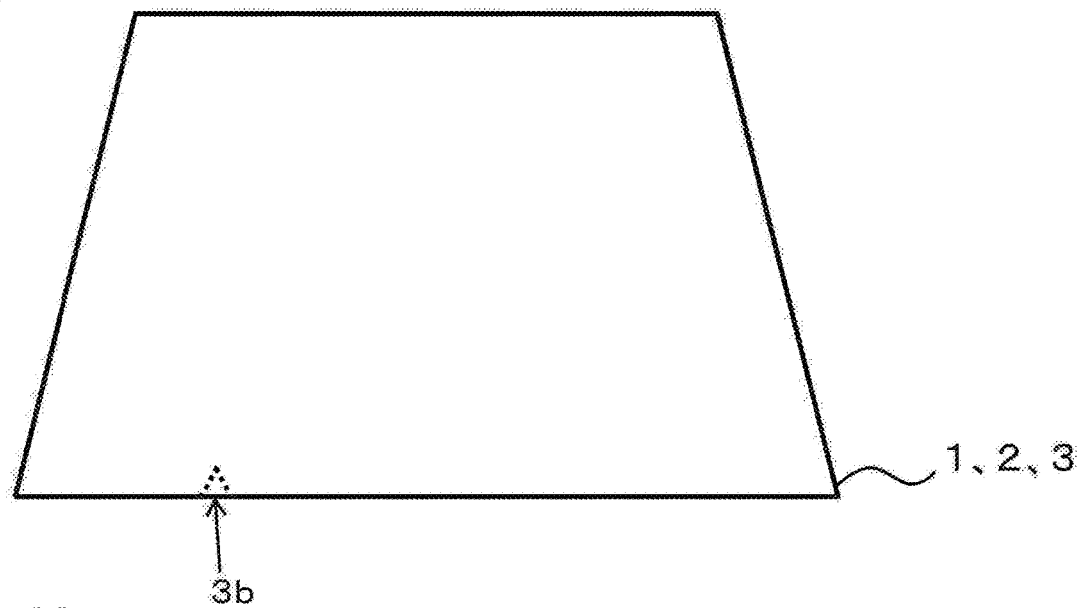
FIG. 21 shows an example of a laminated glass after an edge cutting step.

FIG. 21 is a schematic plan view showing an example of the laminated glass. In the laminated glass manufactured in this manner, as shown by the example in FIG. 21, the outer peripheral edge of the interlayer 3 in the region in which the protruding portion 3c was present is aligned with the outer peripheral edge of each of the glass sheets (1, 2). On the other hand, the outer peripheral edge of the interlayer 3 in the region of the cutout portion 3b is in the same state as that before the protruding portion 3c is cut out. That is, the outer peripheral edge of the interlayer 3 in the region of the cutout portion 3b enters the inside with respect to the outer peripheral edge of each of the glass sheets (1, 2).

In the above-mentioned method of manufacturing a laminated glass, a portion (also referred to as "recessed region" hereinafter) that enters the inside with respect to the outer peripheral edge of each of the outer glass sheet 1 and the inner glass sheet 2 is locally formed in the peripheral edge portion of the interlayer 3. Here, the term "locally" means a state in which this recessed region is not formed over the entire region of any of the sides constituting the outer peripheral edge of the laminated glass, but is provided at a portion of any of the sides.

It should be noted that cutting out the protruding portion 3c along the outer peripheral edge of each of the glass sheets (1, 2) may be performed at a position that is shifted to an extent that the performance of the laminated glass is not affected. In this case, the outer peripheral edge of the interlayer 3 in the region in which the protruding portion 3c was present after the above-mentioned edge cutting step may protrude from the outer peripheral edge of each of the glass sheets (1, 2) toward the outside as long as the protruding amount is about 1.0 mm or less. Moreover, the outer peripheral edge of the interlayer 3 in the region in which the protruding portion 3c was present after the above-mentioned edge cutting step may enters the inside with respect to the outer peripheral edge of each of the glass sheets (1, 2) as long as the recess amount is about 3.0 mm or less.

Edge Cutting Step

With the above example, the cutout portion 3b, which does not protrude from the outer peripheral edge of each of the glass sheets (1, 2) toward the outside, is provided in the interlayer 3. Therefore, the operation of forming a notch in the protruding portion of the interlayer, which is performed in a conventional edge cutting step, becomes unnecessary, and cutting out the protruding portion 3c of the interlayer 3 can be started from a state in which a cutter blade is in contact with the outer peripheral edge of each of the glass sheets (1, 2). That is, in the edge cutting step performed on the interlayer 3, it is possible to eliminate the step in which the protruding portion 3c is cut off in an unstable state without a cutting guide. This facilitates the cutting of the interlayer 3 in the edge cutting step in this example.

Moreover, in this example, the total thickness of the interlayer 3 is not particularly specified, but may be set to be a relatively small thickness such as 0.6 to 2.0 mm. In this case, it is difficult to form a notch in the interlayer 3 using a cutter blade in a state in which a cutting guide is not present, and it can be more difficult to cut off the interlayer 3 in the edge cutting step. Accordingly, the present technique that facilitates the cutting of the interlayer 3 in the edge cutting step by providing a portion in which the interlayer 3 does not protrude from the outer peripheral edge of each of the glass sheets (1, 2) is particularly important when such an interlayer 3 having a relatively small thickness is used.

Furthermore, in this example, the interlayer 3 includes the relatively hard outer layers 32 in order to improve the sound insulation performance, which will be described later. Moreover, the interlayer 3 is constituted by a plurality of layers including the relatively soft core layer 31. In such cases where the interlayer 3 includes a relatively hard layer and a partial region of the interlayer 3 is soft, a cutter blade is unlikely to enter the interlayer 3. Therefore, in these cases, when a notch is formed in the protruding portion in a conventional manner, the interlayer is likely to escape from the cutter blade, and it can be more difficult to cut off the interlayer 3 in the edge cutting step. Accordingly, the present technique that facilitates the cutting of the interlayer 3 in the edge cutting step by providing a portion in which the interlayer 3 does not protrude from the outer peripheral edge of each of the glass sheets (1, 2) is particularly important when such an interlayer 3 for improving the sound insulation performance is used.

Although an example of the present invention has been described above, all of the above descriptions merely show illustrative examples of the present invention. It should be appreciated that many variations and modifications can be carried out without departing from the scope of the present invention. For example, instead of one notch portion 3a, a plurality of notch portions 3a may be provided in the outer peripheral edge of the interlayer 3. Similarly, instead of one cutout portion 3b, a plurality of cutout portions 3b may be provided.

Shape of Notch Portion

For example, in the above-mentioned example, the triangular notch portion 3a is provided at the outer peripheral edge of the interlayer 3. However, the shape of the notch portion 3a need not be necessarily limited to such a triangular shape, and may be selected as appropriate depending on an embodiment. The notch portion 3a may formed in an arc shape, an elliptic shape, a rectangular shape, or the like, for example. As shown by the example in FIG. 22, the notch portion 3a may also be formed so as to form an acute angle with respect to the outer peripheral edge of each of the outer glass sheet 1 and the inner glass sheet 2.

Figure 22:
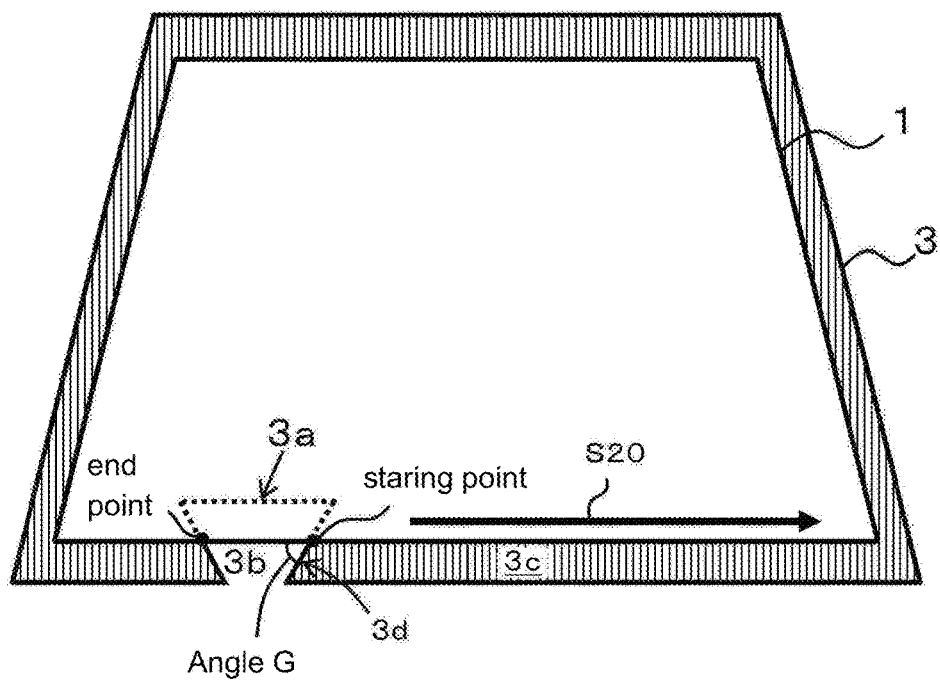
FIG. 22 shows an example of the shape of a notch portion according to a modified example.

FIG. 22 shows an example of the shape of the notch portion 3a according to a modified example. The notch portion 3a shown by the example in FIG. 22 is formed in a trapezoidal shape, and an angle G formed by the notch portion 3a with respect to the outer peripheral edge of each of the outer glass sheet 1 and the inner glass sheet 2 is an acute angle. Thus, an end portion 3d of the protruding portion 3c that serves as a starting point of the cutting of the protruding portion 3c extends in a direction opposite to the cutting direction (arrow S20 in the diagram). Therefore, when the protruding portion 3c is cut off using a cutter blade, the protruding portion 3c is unlikely to escape from the cutter blade, and the cutter blade easily enters the end portion 3d of the protruding portion 3c. This makes it easier to cut off the interlayer in the edge cutting step.

Position of Notch Portion

In the above-mentioned example, the notch portion 3a is provided in the lower side of the interlayer 3. However, the position at which the notch portion 3a is provided need not be necessarily limited to the lower side of the interlayer 3, and may be any of the upper side, the left side, or the right side of the interlayer 3. However, in the case where this notch portion 3a forms a portion that enters the inside with respect to the outer peripheral edge of each of the glass sheets (1, 2) from the outer peripheral edge of the interlayer 3, the external appearance of the side wall of the laminated glass may deteriorate. Therefore, it is preferable to provide the notch portion 3a at a position at which the notch portion 3a is unlikely to be visible to a user. Moreover, as described above, the laminated glass may be adversely affected by forming a portion that enters the inside with respect to the outer peripheral edge of each of the glass sheets (1, 2) from the outer peripheral edge of the interlayer 3. Therefore, it is preferable to provide the notch portion 3a at a position at which the notch portion 3a does not have an adverse effect. From these viewpoints, it is preferable to provide the notch portion 3a in the lower side of the interlayer 3.

When the laminated glass according to the above-mentioned example is used as glass for a vehicle, the laminated glass is attached so that its lower side is hidden inside the vehicle body. Therefore, when the notch portion 3a is provided in the lower side of the interlayer 3, it is possible to hide this notch portion 3a inside the vehicle body. Accordingly, in the case where the above-mentioned laminated glass is used as glass for a vehicle, it is preferable to provide the notch portion 3a in the lower side of the interlayer 3.

Configuration of Cutout Portion

In the above-mentioned example, the cutout portion 3b in which the interlayer 3 does not protrude from each of the glass sheets (1, 2) is configured by providing the notch portion 3a at the outer peripheral edge of the interlayer 3. However, the method of configuring the cutout portion 3b is not limited to this example, and may be selected as appropriate depending on an embodiment. The cutout portion 3b may be configured by adjusting the position and/or the orientation of the interlayer 3 such that a portion in which the interlayer 3 does not protrude from each of the glass sheets (1, 2) is formed when the interlayer 3 is sandwiched between the glass sheets (1, 2), for example.

Figure 23:
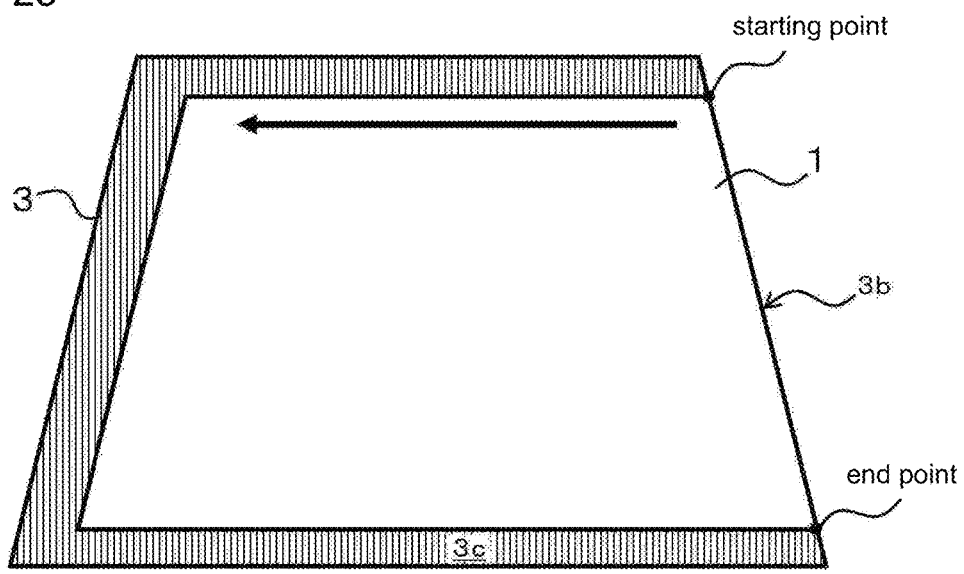
FIG. 23 shows an example of a configuration of a cutout portion and a protruding portion according to a modified example.
Figure 24:
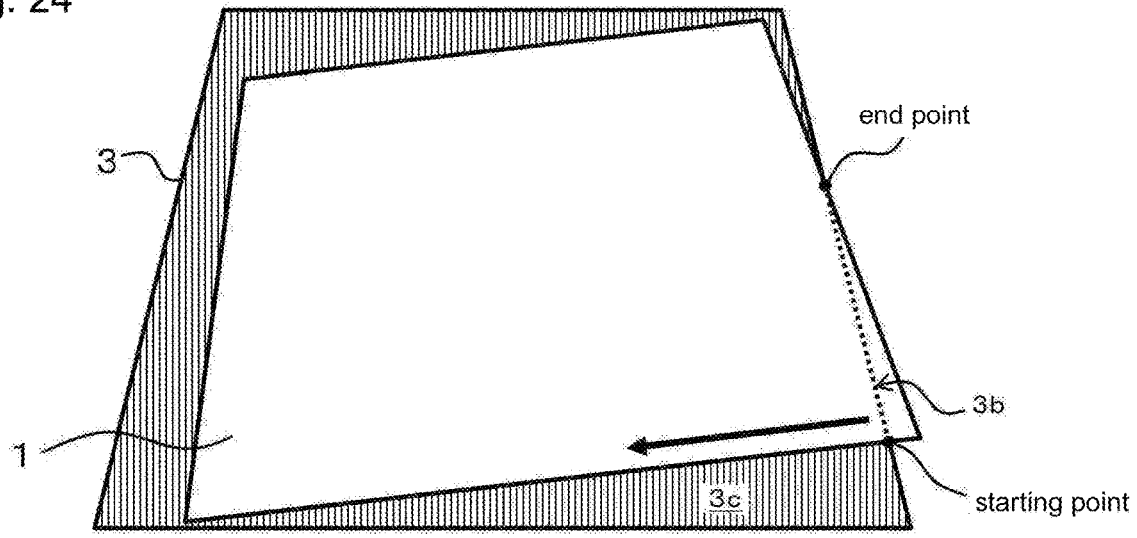
FIG. 24 shows an example of a configuration of a cutout portion and a protruding portion according to a modified example.

FIG. 23 and FIG. 24 show examples of the configurations of the cutout portion 3b and the protruding portion 3c according to modified examples. In FIG. 23, the cutout portion 3b is formed by shifting the interlayer 3 toward the left side with respect to the glass sheets (1, 2). In this manner, the cutout portion 3b may be formed by adjusting the position at which the interlayer 3 is arranged when the interlayer 3 is sandwiched between the glass sheets (1, 2). In FIG. 24, the cutout portion 3b is formed by turning the interlayer 3 clockwise with respect to the glass sheets (1, 2). In this manner, the cutout portion 36 may be formed by adjusting the orientation in which the interlayer 3 is arranged when the interlayer 3 is sandwiched between the glass sheets (1, 2).

EXAMPLES

Hereinafter, examples of the present invention will be described. It should be noted that the present invention is not limited to the examples below. Glass sheets and an interlayer used in the above-described laminated glass will be evaluated hereinafter.

1. Evaluation of Thickness of Outer Glass Sheet

First, the thicknesses of outer glass sheets were evaluated. Here, seven laminated glasses listed below were prepared. The laminated glasses are each constituted by an outer glass sheet, an inner glass sheet, and an interlayer that is sandwiched between these glass sheets. The core layer and each outer layer of the interlayer had respective thicknesses of 0.1 mm and 0.33 mm and respective Young's moduli of 10 MPa and 441 MPa (20° C., 100 Hz).

TABLE 3

|  | Outer glass sheet | Inner glass position |
| --- | --- | --- |
| Laminated glass 1 | 2.1 mm | 2.1 mm |
| Laminated glass 2 | 2.1 mm | 1.6 mm |
| Laminated glass 3 | 2.1 mm | 1.3 mm |
| Laminated glass 4 | 2.1 mm | 1.0 mm |
| Laminated glass 5 | 1.8 mm | 1.3 mm |
| Laminated glass 6 | 1.6 mm | 1.6 mm |
| Laminated glass 7 | 2.0 mm | 1.3 mm |

Figure 25:
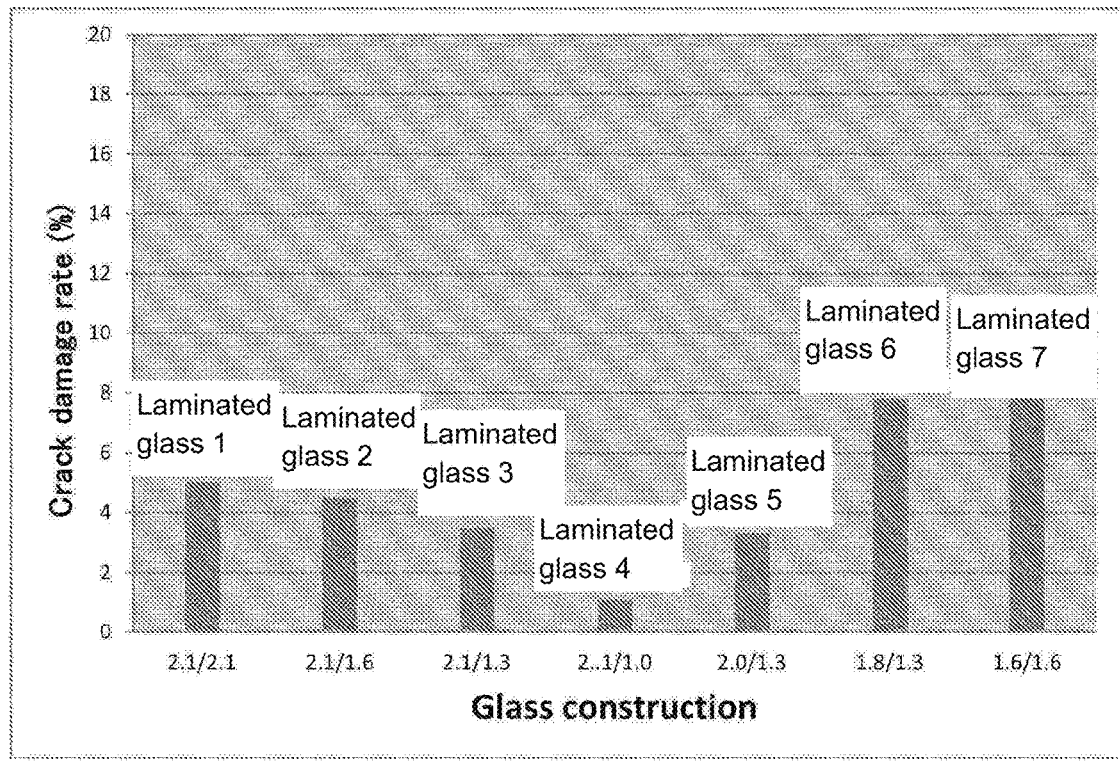
FIG. 25 is a graph showing the results of evaluation of outer glass sheets.

Each of the above-described laminated glasses was arranged at an angle of 60 degrees to the vertical, and granite having an average particle size of about 5 to 20 mm was caused to collide with the laminated glass at a speed of 64 km per hour. Thirty pieces of granite were caused to collide with each laminated glass, and the rate of occurrence of cracking was calculated. The results are as shown in FIG. 25. As shown in this graph, the rate of occurrence of cracking of the laminated glasses 1 to 4 whose outer glass sheets had a thickness of 2.0 mm was 5% or less regardless of the thickness of the inner glass sheet. On the other hand, the rate of occurrence of cracking of the laminated glasses 6 and 7 whose outer glass sheets had a thickness of 1.8 mm or less was 8% regardless of the thickness of the inner glass. Accordingly, from the viewpoint of impact resistance with respect to flying objects, the thickness of the outer glass sheet is preferably 1.8 mm or more as described above, and more preferably 2.0 mm or more.

2. Evaluation with Regard to Young's Modulus of Core Layer

Laminated glasses of examples and comparative examples were prepared as listed below.

TABLE 4

|  | Thickness of outer glass sheet | Thickness of inner glass sheet | Young's modulus of core layer |
|---|---|---|---|
| Ex. 1 | 2.0 mm | 1.0 mm | 20 MPa |
| Ex. 2 | 2.0 mm | 1.0 mm | 16 MPa |
| Ex. 3 | 2.0 mm | 1.0 mm | 10 MPa |
| Ex. 4 | 2.0 mm | 1.0 mm | 5 MPa |
| Comp. Ex. 1 | 1.5 mm | 1.5 mm | 40 MPa |
| Comp. Ex. 2 | 2.0 mm | 1.0 mm | 40 MPa |

Each glass sheet was made of the clear glass described above. The interlayer included a core layer and a pair of outer layers between which the core layer was sandwiched. The interlayer had a thickness of 0.76 mm, with the core layer having a thickness of 0.1 mm and each of the two outer layers having a thickness of 0.33 mm. The Young's modulus of each of the two outer layers was adjusted to 441 MPa (20° C., 100 Hz).

With respect to the examples and the comparative examples, the sound transmission loss was evaluated by simulation. The simulation conditions are as described below.

First, the simulation was performed using a piece of acoustic analysis software (ACTRAN manufactured by Free Field Technologies). This software is capable of calculating the sound transmission loss (transmitted sound pressure level/incident sound pressure level) of a laminated glass by solving the following wave equation using the finite element method.

General wave equation $$\frac{\partial^2 \vec{u}}{\partial t^2} = \frac{K}{\rho} \frac{\partial^2 \vec{u}}{\partial x^2} \quad \text{Formula 2}$$

$$c = \sqrt{\frac{K}{\rho}}$$

K: bulk modulus
ρ: density
c: phase velocity
Next, the calculation conditions will be described.

1. Setting of Model

Figure 26:
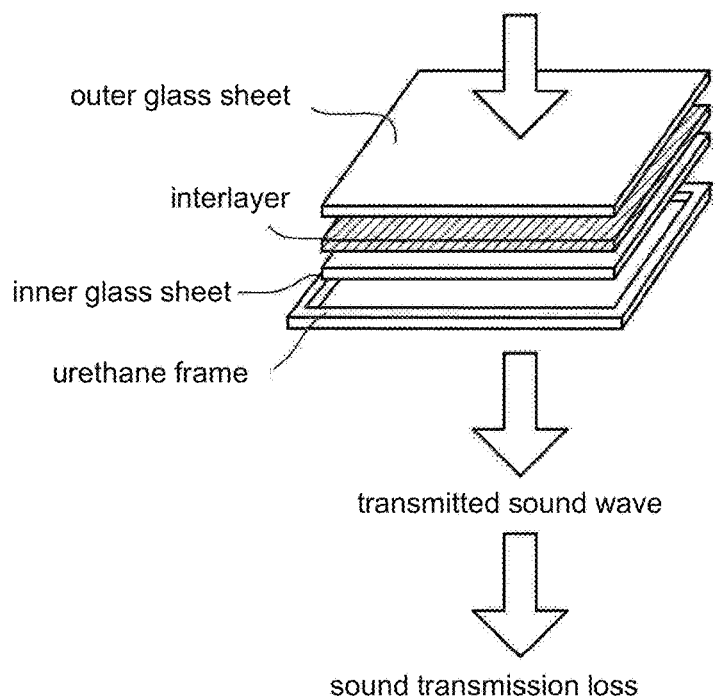
FIG. 26 is a model diagram of a simulation for outputting sound transmission loss.

FIG. 26 shows a model of the laminated glasses that were used in this simulation. This model defines a laminated glass in which an outer glass sheet, an interlayer, an inner glass sheet, and a urethane frame are stacked in this order from the sound source side. Here, the urethane frame was added to the model because the point that the presence or absence of a urethane frame is considered to have an influence in no small way on the results of calculation of the sound transmission loss and the point that a laminated glass is generally bonded with a urethane frame interposed between the laminated glass and a windshield of a vehicle were taken into account.

2. Input Conditions 1 (Dimensions Etc.)

TABLE 5

| | |
|---|---|
| Dimensions of both glass sheets | 800 × 500 mm |
| Thicknesses of both glass sheets | As described above |
| Configuration of interlayer | Three-layer structure of outer layer/core layer/outer layer |
| Thickness of interlayer | As described above |
| Constraint condition | Lower surface of urethane frame is fixed and constrained. |
| Incidence condition of sound | Randomly diffused sound wave |

It should be noted that the dimensions 800×500 mm of the glass sheets are smaller than the sizes that are used in actual vehicles. The larger the glass size, the poorer the STL value tends to be. The reason for this is that the constrained area increases with the size, and accordingly the resonance mode increases. However, even if the glass size varies, the tendency of relative values with respect to the frequency, that is, the tendency of a laminated glass made of glass sheets having different thicknesses to be inferior to a laminated glass made of glass sheets having the same thickness in a predetermined frequency band is unchanged.

The randomly diffused sound wave in Table 3 above refers to such a sound wave that a sound wave having a predetermined frequency propagates with incident angles in every direction toward the outer glass sheet, and assumes a sound source in a reverberation chamber in which the sound transmission loss is measured.

3. Input Conditions 2 (Property Values)

TABLE 6

| | Young's modulus [MPa] | Loss factor (tanδ) | Poisson's ratio | Density [Kg/m$^3$] |
|---|---|---|---|---|
| Both glass sheets | 7160 | 0.01 to 0.02 | 0.23 | 2500 |
| Both outer layers | Shown in table below | Shown in table below | 0.49 | 1060 |
| Core layer | Shown in table below | Shown in table below | 0.49 | 1060 |
| Urethane frame | 10 | 0.01 | 0.45 | 2000 |

Regarding Young's Modulus and Loss Factor of Core Layer and Two Outer Layers

Different values were used for different main frequencies. The reason for this is that the core layer and the two outer layers are viscoelastic bodies, and therefore, the Young's moduli thereof exhibit strong frequency dependence due to the viscous effect. It should be noted that although the temperature dependence is also significant, the property values that assume a constant temperature (20° C.) were used in this simulation.

TABLE 7

| f [Hz] | 20° C. | |
|---|---|---|
| | E [MPa] | tanδ |
| Core layer | | |
| 100 | 19 | 1.00 |
| 125 | 20 | 1.00 |
| 160 | 21 | 1.00 |
| 200 | 22 | 1.00 |
| 250 | 23 | 1.00 |
| 315 | 24 | 1.00 |
| 400 | 25 | 1.00 |
| 500 | 26 | 1.00 |
| 630 | 27 | 1.00 |
| 800 | 28 | 1.00 |
| 1000 | 29 | 1.00 |
| 1250 | 30 | 1.00 |
| 1600 | 32 | 1.00 |
| 2000 | 33 | 1.00 |
| 2500 | 35 | 1.00 |
| 3150 | 36 | 1.00 |
| 4000 | 38 | 1.00 |
| 5000 | 40 | 1.00 |
| 6300 | 41 | 1.00 |
| 8000 | 43 | 1.00 |
| 10000 | 45 | 1.00 |
| Two outer layers | | |
| 100 | 441 | 0.26 |
| 125 | 453 | 0.25 |
| 160 | 467 | 0.24 |
| 200 | 480 | 0.23 |
| 250 | 493 | 0.23 |
| 315 | 507 | 0.22 |
| 400 | 522 | 0.22 |
| 500 | 537 | 0.21 |
| 630 | 552 | 0.21 |
| 800 | 569 | 0.21 |
| 1000 | 585 | 0.20 |
| 1250 | 601 | 0.20 |
| 1600 | 619 | 0.20 |
| 2000 | 636 | 0.20 |
| 2500 | 654 | 0.20 |
| 3150 | 673 | 0.20 |
| 4000 | 693 | 0.19 |
| 5000 | 712 | 0.19 |
| 6300 | 733 | 0.19 |
| 8000 | 754 | 0.19 |
| 10000 | 775 | 0.19 |

It should be noted that the same simulation method as that described above is used in the sections 3, 4, 5, 7, and 8 below.

Figure 27:
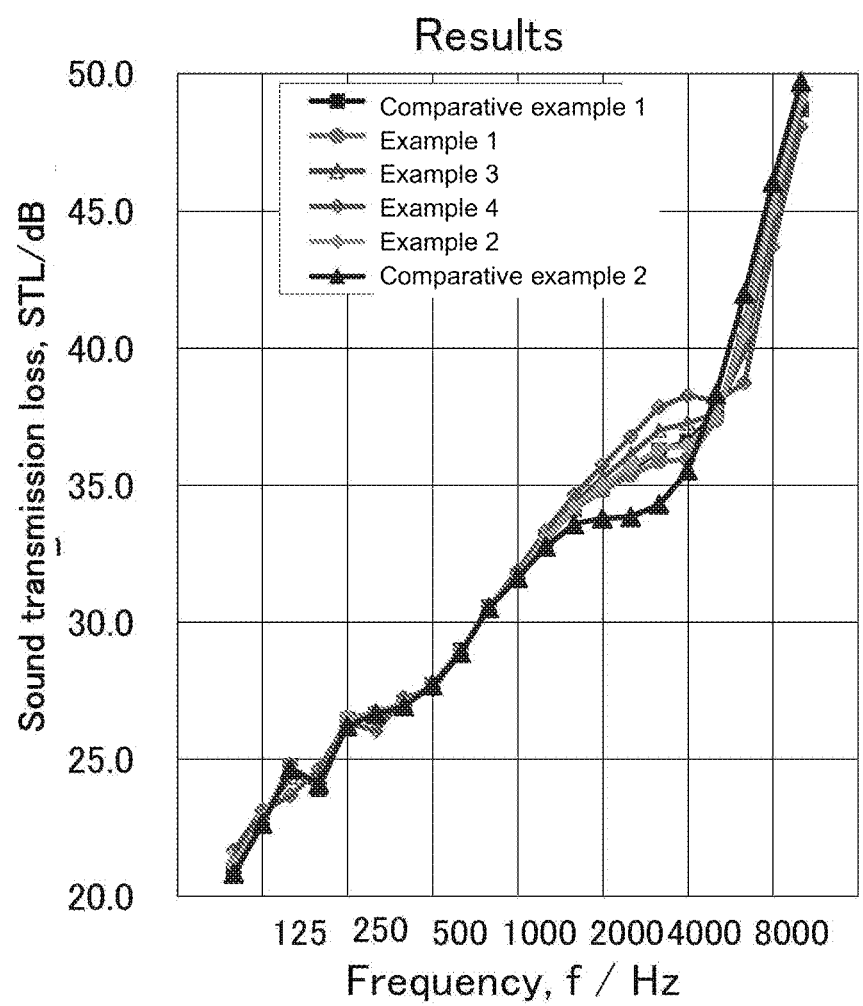
FIG. 27 is a graph showing the results of evaluation regarding Young's moduli of core layers.

The results are as shown in the graph of FIG. 27. The results show that as in Examples 1 to 4, the STL values due to the difference in thickness can be suppressed by setting the Young's modulus of the core layer to 20 MPa (20° C., 100 Hz) or less. Moreover, as in Examples 2 to 4, when the Young's modulus of the core layer is set to 16 MPa (20° C., 100 Hz) or less, the sound transmission loss in the frequency range of 2000 to 5000 Hz is higher than that of Comparative Example 1, in which the two glass plates have the same thickness. Furthermore, as in Examples 3 and 4, when the Young's modulus of the core layer is set to 10 MPa (20° C., 100 Hz) or less, the sound transmission loss in the frequency range of 2000 to 5000 Hz is clearly higher than that of Comparative Example 1, in which the two glass plates have the same thickness. Accordingly, it was found that the sound insulation performance in the frequency range of 2000 to 5000 Hz, which humans can easily hear, was increased by setting the inner glass sheet to be thinner than the outer glass sheet and setting the Young's modulus of the core layer to 20 MPa or less.

3. Evaluation with Regard to Thickness of Core Layer

Laminated glasses of examples and comparative examples were prepared as listed below. Here, the sound transmission loss was calculated using the above-described simulation method with varying thicknesses of the core layers. The interlayer included three layers, and only the thicknesses of the core layer and each of the outer layers were varied without changing the total thickness. The Young's modulus of the core layer was set to 10 MPa (20° C., 100 Hz), and the Young's modulus of each of the outer layers was set to 441 MPa (20° C., 100 Hz). Moreover, the thicknesses of the outer glass sheet and the inner glass sheet were set to 2.0 mm and 1.0 mm, respectively.

TABLE 8

| | Core layer | Outer layer | Interlayer |
|---|---|---|---|
| Ex. 5 | 0.1 mm | 0.325 mm | 0.76 mm |
| Ex. 6 | 0.2 mm | 0.28 mm | 0.76 mm |
| Ex. 7 | 0.4 mm | 0.18 mm | 0.76 mm |
| Ex. 8 | 0.6 mm | 0.08 mm | 0.76 mm |
| Comp. Ex. 3 | 0.05 mm | 0.305 mm | 0.76 mm |
| Comp. Ex. 4 | 0.01 mm | 0.375 mm | 0.76 mm |

Figure 28:
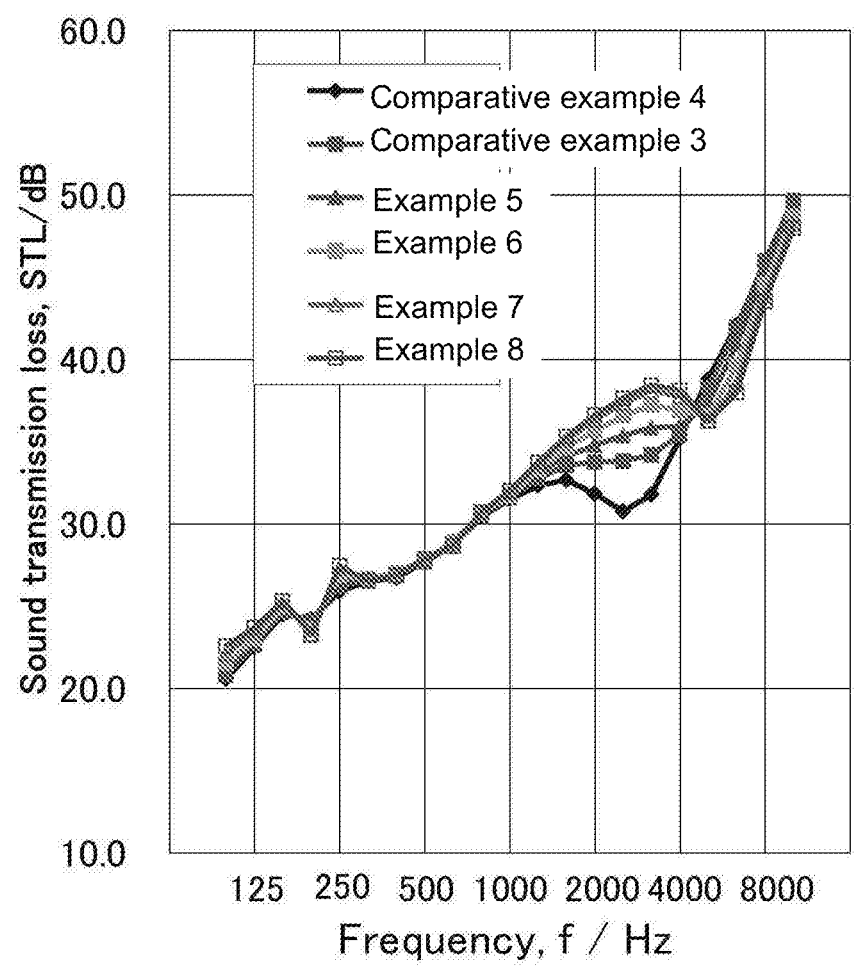
FIG. 28 is a graph showing the results of evaluation regarding thicknesses of core layers.

With respect to the above-described examples and comparative examples, the sound transmission loss was evaluated by simulation. The results are as shown in FIG. 28. This graph shows that if the core layer has a thickness of less than 0.1 mm, the sound transmission loss in the frequency range of 2000 to 5000 Hz decreases. Accordingly, in order to increase the sound insulation performance in the frequency range of 2000 to 5000 Hz, which humans can easily hear, it is preferable to set the thickness of the core layer to 0.1 mm or more.

4. Evaluation with Regard to Attachment Angle of Laminated Glass

Then, the attachment angle of a laminated glass was evaluated by simulation with varying sound incident angles. Here, the sound transmission loss was calculated while varying the angle to the vertical from 0 to 75 degrees. Each of the glass sheets was made of the clear glass described above. The interlayer included a core layer and a pair of outer layers between which the core layer was sandwiched. The thickness of the interlayer was set to 0.76 mm, with the thickness of the core layer being set to 0.1 mm and the thickness of each of the two outer layers being set to 0.33 mm. The Young's modulus of the core layer was set to 10 MPa (20° C., 100 Hz), and the Young's modulus of each of the two outer layers was set to 441 MPa (20° C., 100 Hz). The thicknesses of the glass sheets were set to 2.0 mm and 1.0 mm, respectively.

TABLE 9

|  | Attachment angle |
| --- | --- |
| Ex. 9 | 0 degrees |
| Ex. 10 | 15 degrees |
| Ex. 11 | 30 degrees |
| Ex. 12 | 45 degrees |
| Comp. Ex. 5 | 60 degrees |
| Comp. Ex. 6 | 75 degrees |

Figure 29:
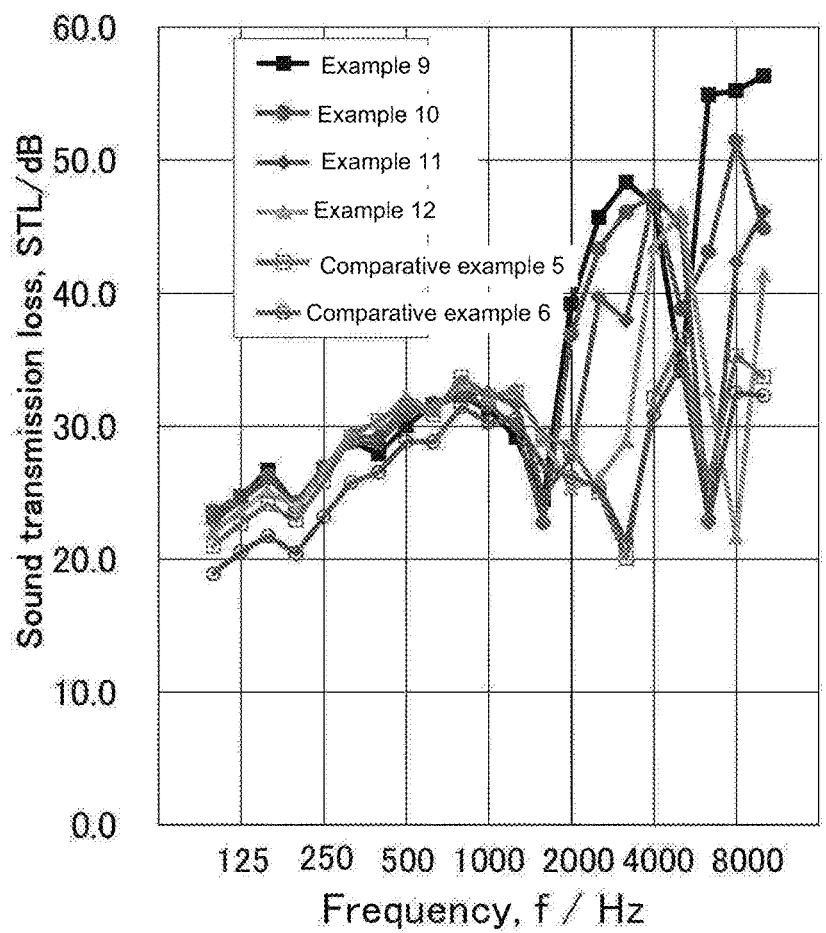
FIG. 29 is a graph showing the results of evaluation regarding attachment angles of laminated glasses.

With respect to the above-described examples and comparative examples, the sound transmission loss was evaluated using the above-described simulation method. However, the simulation was performed with the laminated glass attachment angle being added to the input conditions. The results are as shown in FIG. 29. This graph shows that at an attachment angle exceeding 60 degrees, the sound transmission loss sharply drops at a frequency around 3000 Hz. Accordingly, it was found that in order to increase the sound insulation performance in the frequency range of 2000 to 5000 Hz, which humans can easily hear, it was preferable to set the laminated glass attachment angle with respect to the vertical to 45 degrees or less. The sound insulation performance can be increased as long as the attachment angle does not exceed 60 degrees, and in some cases, it is possible to increase the sound insulation performance by setting the attachment angle at 75 degrees or less.

5. Evaluation with Regard to Young's Modulus of Outer Layer

In order to evaluate the Young's moduli of the outer layers, laminated glasses of examples and comparative examples were prepared as listed below. Here, the thicknesses of the outer glass and the inner glass were fixed, and the sound transmission loss was calculated using the above-described simulation method with varying Young's moduli of the outer layers and the core layer of the interlayer. Each of the glass sheets was made of the clear glass described above, and the interlayer included a core layer and a pair of outer layers between which the core layer was sandwiched. The thickness of the interlayer was set to 0.76 mm, with the thickness of the core layer being set to 0.1 mm and the thickness of each of the two outer layers being set to 0.33 mm.

TABLE 10

|  | Thickness of outer glass sheet | Thickness of inner glass sheet | Young's modulus of core layer | Young's modulus of outer layer |
| --- | --- | --- | --- | --- |
| Ex. 13 | 2.0 mm | 1.3 mm | 19 MPa | 441 MPa |
| Ex. 14 | 2.0 mm | 1.3 mm | 19 MPa | 882 MPa |
| Ex. 15 | 2.0 mm | 1.3 mm | 9.5 MPa | 441 MPa |
| Ex. 16 | 2.0 mm | 1.3 mm | 9.5 MPa | 882 MPa |
| Ex. 17 | 2.0 mm | 1.3 mm | 9.5 MPa | 1764 MPa |
| Ex. 18 | 2.0 mm | 1.3 mm | 9.5 MPa | 3528 MPa |

Figure 30:
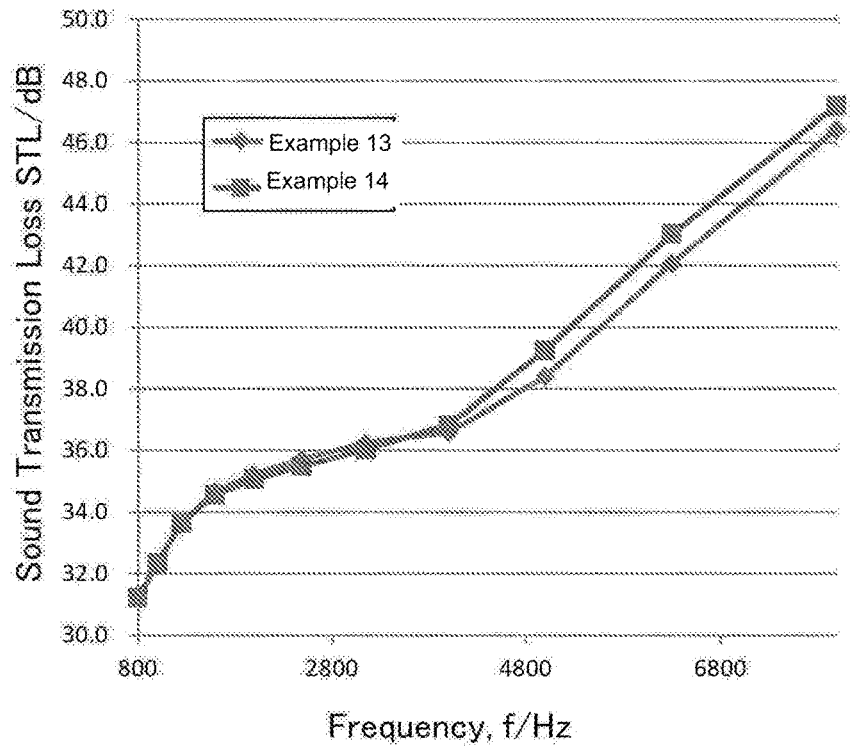
FIG. 30 is a graph showing the results of evaluation regarding Young's moduli of outer layers.

The results are as described below. First, FIG. 30 shows the results of Examples 13 and 14. According to the above-described evaluation with regard to the Young's modulus of the core layer, it was found that if the Young's modulus was set at 20 MPa or less, the sound transmission loss in the frequency range of 2000 to 5000 Hz, which humans can easily hear, was high. In contrast, in Examples 13 and 14, the Young's modulus of the core layer was fixed, and the Young's modulus of the outer layers was varied. As a result, as shown in FIG. 30, it was found that in Example 14 in which the outer layers had a high Young's modulus, the sound transmission loss was increased in a high frequency range of 5000 Hz or more.

Figure 31:
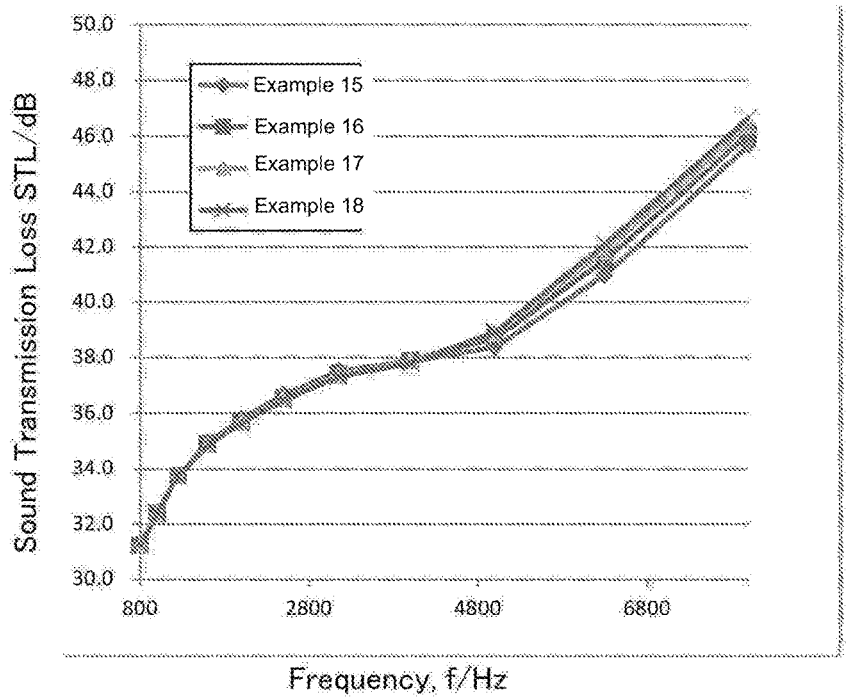
FIG. 31 is a graph showing the results of evaluation regarding Young's moduli of outer layers.

Moreover, in Examples 15 to 18, the Young's modulus of the core layer is lowered even further, and the Young's moduli of the outer layers are increased. As shown in FIG. 31, in these examples, the sound transmission loss in the frequency range of 2000 to 5000 Hz is higher than that of Examples 13 and 14, but the sound transmission loss in the high frequency range of 5000 Hz or higher is not as high as that of Examples 13 and 14. In particular, when the Young's modulus of the outer layers exceeds 1764 MPa, the sound transmission loss in the high frequency range of 5000 Hz or higher is little increased.

6. Evaluation with Regard to Light Transmittance of Laminated Glass

Lastly, light transmittance of a laminated glass was evaluated. Here, research on light transmittances of two types of Examples 19 to 22 and Comparative Example 22 was conducted. In each of Examples 19 to 22, the outer glass sheet had a thickness of 2.0 mm, and the inner glass sheet had a thickness of 1.8 mm. On the other hand, in Comparative Example 7, the outer glass sheet had a thickness of 2.3 mm, and the inner glass sheet had a thickness of 2.3 mm. Moreover, the compositions and the like of the outer glass sheet and the inner glass sheet, and the type of the interlayer according to the examples and comparative example are as listed below.

TABLE 11

|  | Ex. 19 | Ex. 20 | Ex. 21 | Ex. 22 | Comp. Ex. 7 |
| --- | --- | --- | --- | --- | --- |
| Outer glass sheet | Green glass (2 mm) | Green glass (2 mm) | Green glass (2 mm) | Heat-ray absorbing glass (2 mm) | Heat-ray absorbing glass (2.3 mm) |
| Inner glass sheet | Clear glass (1.8 mm) | Green glass (1.8 mm) | Green glass (1.8 mm) | Heat-ray absorbing glass (1.8 mm) | Heat-ray absorbing glass (2.3 mm) |
| Interlayer | IR cutting film | Normal film | IR cutting film | Normal film | Normal film |

TABLE 12

|  | Green glass (2 mm) | Green glass (1.8 mm) | Clear glass (1.8 mm) | Heat-ray absorbing glass (2.3 mm) | Heat-ray absorbing glass (2 mm) | Heat-ray absorbing glass (1.8 mm) |
| --- | --- | --- | --- | --- | --- | --- |
| $SiO_2$ | 73.0 | 72.7 | 71.7 | 70.2 | 70.1 | 70.1 |
| $AlO_3$ | 0.1 | 0.1 | 1.8 | 1.6 | 1.6 | 1.6 |
| CaO | 8.8 | 8.8 | 8.2 | 8.5 | 8.5 | 8.5 |

TABLE 12-continued

|   | Green glass (2 mm) | Green glass (1.8 mm) | Clear glass (1.8 mm) | Heat-ray absorbing glass (2.3 mm) | Heat-ray absorbing glass (2 mm) | Heat-ray absorbing glass (1.8 mm) |
|---|---|---|---|---|---|---|
| MgO | 3.9 | 3.9 | 4.1 | 3.3 | 3.3 | 3.3 |
| $R_2O$ $(Na_2O + K_2O)$ | 13.7 | 13.7 | 13.9 | 14.7 | 14.7 | 14.7 |
| $Fe_2O_3$ | 0.5 | 0.6 | 0.1 | 0.7 | 0.8 | 0.8 |
| CeO | 0.0 | 0.0 | 0.0 | 0.5 | 0.5 | 0.5 |
| TiO | 0.0 | 0.0 | 0.0 | 0.3 | 0.3 | 0.2 |
| $SO_3$ | 0.0 | 0.2 | 0.2 | 0.2 | 0.2 | 0.2 |

As described above, in Examples 19 to 22 and Comparative Example 7, two types of interlayers, namely a normal film and an IR cutting film, were used. In both the interlayers, the core layer and each outer layer had respective thicknesses of 0.1 mm and 0.33 mm and respective Young's moduli of 10 MPa and 650 MPa (20° C., 100 Hz). It should be noted that the IR cutting film and the normal film were produced based on S-LEC Film manufactured by Sekisui Chemical Co., Ltd. The difference between two types of interlayers is that the IR cutting film contains ITO fine particles and the normal film contains no ITO films. The ITO fine particles used in these examples mainly have the ability to cut wavelengths in a range of 1500 to 2500 nm.

Figure 32:
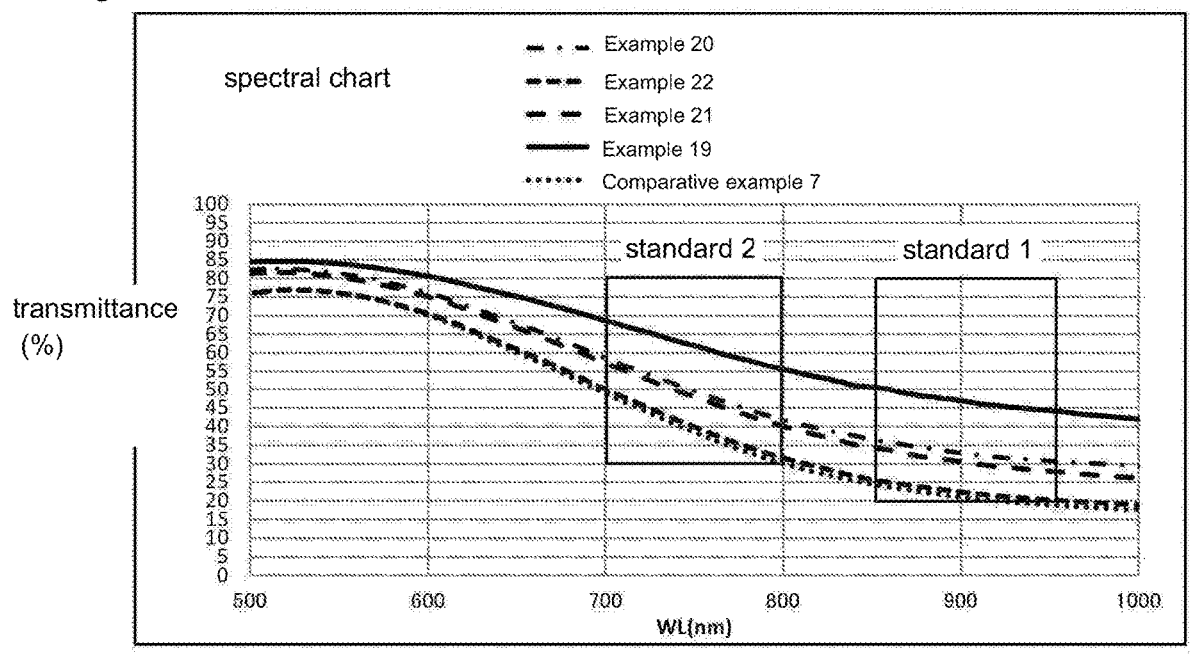
FIG. 32 is a graph showing the results of evaluation regarding light transmittances of laminated glasses.

With respect to the above-described examples and comparative example, a spectral chart was made in accordance with JIS R3106 using a UV3100 (manufactured by Shimadzu Corporation) as a measurement apparatus. The results are as shown in FIG. 32. This graph shows that with respect to light in a wavelength range of 850 to 950 nm required in the above-described safety system, the transmittances are 20 to 80% in Examples 19 to 22 (standard 1). Moreover, it was found that, with respect to light having a wavelength of 700 to 800 nm required in a system using an infrared camera, the transmittances are 30% or more and 80% or less in Examples 19 to 22 (standard 2). On the other hand, in Comparative Example 7, the above standard 1 is not satisfied, and it is thought that one of reasons for this is that the laminated glass of Comparative Example 7 has a larger thickness than those of Examples 19 to 22.

Moreover, in Examples 20 to 22, the transmittances with respect to a wavelength range of 850 to 950 nm are near the lower limit, 20%. Therefore, the application to the safety system is possible, and in addition, the amount of infrared rays incident into the inside of a vehicle from the outside can be reduced because the infrared transmittance is relatively small. For this reason, it is also possible to suppress an increase in the temperature inside the vehicle due to heat.

It is thought from the examination of the above-described evaluation results according to Examples 19 to 22 and Comparative Example 7 that the transmittance is affected by the type of glass, the type of interlayer, and the thickness of the glass plate. Out of these three factors, the thickness of the glass plate has an influence on the transmittance as well as the sound insulation performance as described above. In contrast, it is found that in the above-described Examples 19 to 22, although the type of glass and the type of interlayer have an influence, the transmittance with respect to light having a wavelength of 850 nm to 950 nm can be set to 20 to 80% and the sound insulation performance can be ensured, particularly by setting the thickness of a glass plate to be in a predetermined range.

7. Evaluation with Regard to Young's Modulus of Outer Layer 1

Laminated glasses according to Example 2-1 and Comparative Example 2-1 were prepared as described below. Example 2-1 and Comparative Example 2-1 differ in only the Young's moduli of the outer layers.

First, the outer glass sheet and the inner glass sheet were made of the clear glass described above. The thickness of the outer glass sheet was set to 2.0 mm, and the thickness of the inner glass sheet was set to 1.3 mm. The interlayer included a core layer and a pair of outer layers between which the core layer was sandwiched. The thickness of the interlayer was set to 0.76 mm, with the thickness of the core layer being set to 0.1 mm and the thickness of each of the two outer layers being set to 0.33 mm. The Young's modulus of the core layer was adjusted to 19 MPa (20° C., 100 Hz). The Young's modulus of each of the outer layers of Example 1 was set to 882 MPa (20° C., 100 Hz), and the Young's modulus of each of the outer layers of Comparative Example 1 was set to 441 MPa (20° C., 100 Hz).

With respect to the above-described Example 2-1 and Comparative Example 2-1, the sound transmission loss was evaluated by simulation. The simulation conditions are the same as those used in the evaluation of the Young's modulus of the core layer as shown in Table 5 to Table 8.

Figure 33:
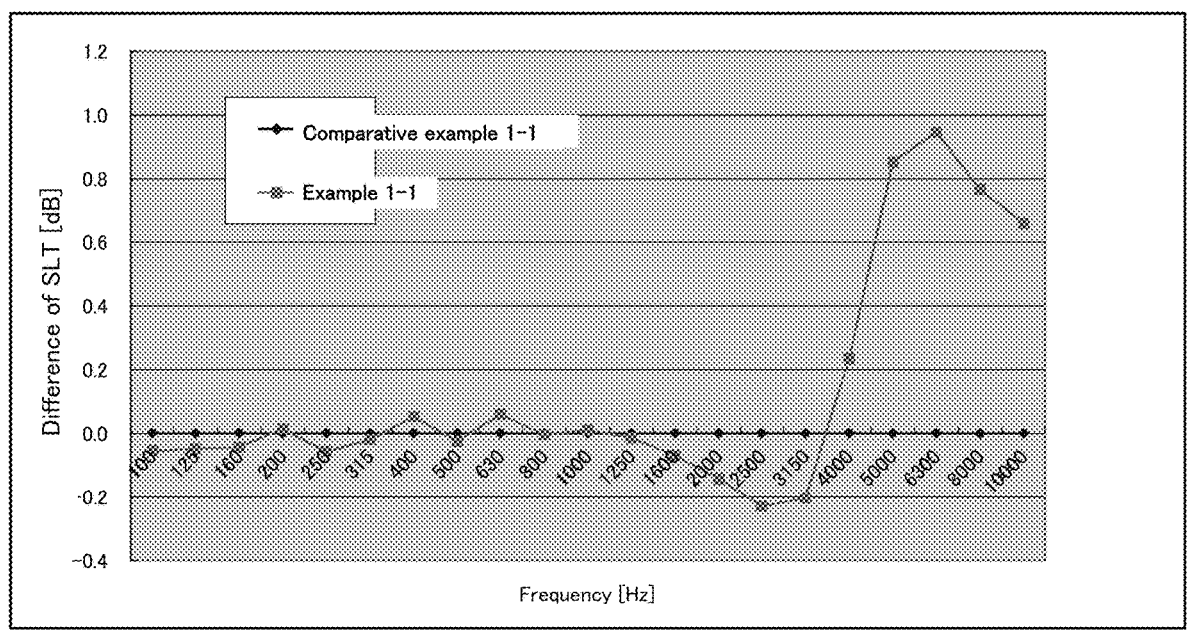
FIG. 33 is a graph showing the results of evaluation regarding Young's moduli of interlayers.

The results are as shown in the graph of FIG. 33. In this graph, the horizontal axis indicates the frequency (Hz), and the vertical axis indicates the difference in STL (dB) between Example 2-1 and Comparative Example 2-1 at each frequency. The results show that increasing the Young's modulus of each of the outer layers as in Example 1 makes it possible to improve the STL in the frequency range of about 4000 Hz or higher compared with Comparative Example 2-1. That is, the sound insulation performance can be improved. For example, it was found that in about 5000 to 10000 Hz, the difference in STL between Example 2-1 and Comparative Example 2-1 is 0.6 dB or more, and the sound insulation performance of Example 2-1 is significantly improved. Accordingly, when such a laminated glass is used in an automobile, it is possible to effectively block a high-frequency sound such as a braking sound or wind noise from entering the inside of the vehicle. On the other hand, in Example 2-1, the STL decreases by about 0 to 0.2 dB in the frequency range of 1000 to 3500 Hz compared with Comparative Example 2-1. However, generally, if a change in sound is about 0.3 dB, humans can recognize a difference in sound, and therefore, there is a high possibility that humans cannot recognize a difference in STL of about 0.2 dB. Accordingly, it was found that when the Young's modulus of each of the outer layers was increased, the STL decreased at a low frequency of about 3500 Hz or lower, but the degree of the decrease in STL was negligible, whereas effective sound insulation with respect to a sound in the frequency range of about 3500 Hz or higher, particularly 5000 Hz or higher, could be achieved.

8. Evaluation with Regard to Young's Modulus of Outer Layer 2

Laminated glasses according to Examples 2-2 to 2-4 and Comparative Example 2-2 were prepared as described below. Examples 2-2 to 2-4 and Comparative Example 2-2 differ in only the Young's moduli of the outer layers.

The outer glass sheet and the inner glass sheet were made of the clear glass described above. The thickness of the outer glass sheet was set to 2.0 mm, and the thickness of the inner glass sheet was set to 1.3 mm. The interlayer included a core layer and a pair of outer layers between which the core layer was sandwiched. The thickness of the interlayer was set to 0.76 mm, with the thickness of the core layer being set to 0.1 mm and the thickness of each of the two outer layers being set to 0.33 mm. The Young's modulus of the core layer was adjusted to 9.5 MPa (20° C., 100 Hz). The Young's moduli of the outer layers of Examples 2-2 to 2-4 were set to 882 MPa, 1764 MPa, and 3528 MPa (20° C., 100 Hz), respectively, and the Young's modulus of each of the outer layers of Comparative Example 2-2 was set to 441 MPa (20° C., 100 Hz). The other test conditions are the same as those used in "Evaluation with regard to Young's modulus of outer layer 1 (referred to as "Evaluation 1" hereinafter)".

Figure 34:
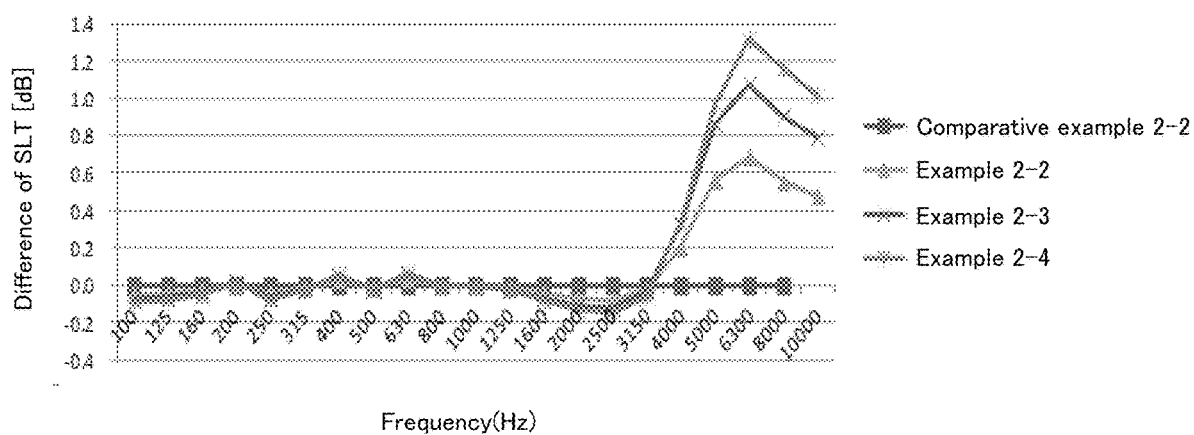
FIG. 34 is a graph showing the results of evaluation regarding Young's moduli of interlayers.
Figure 35:
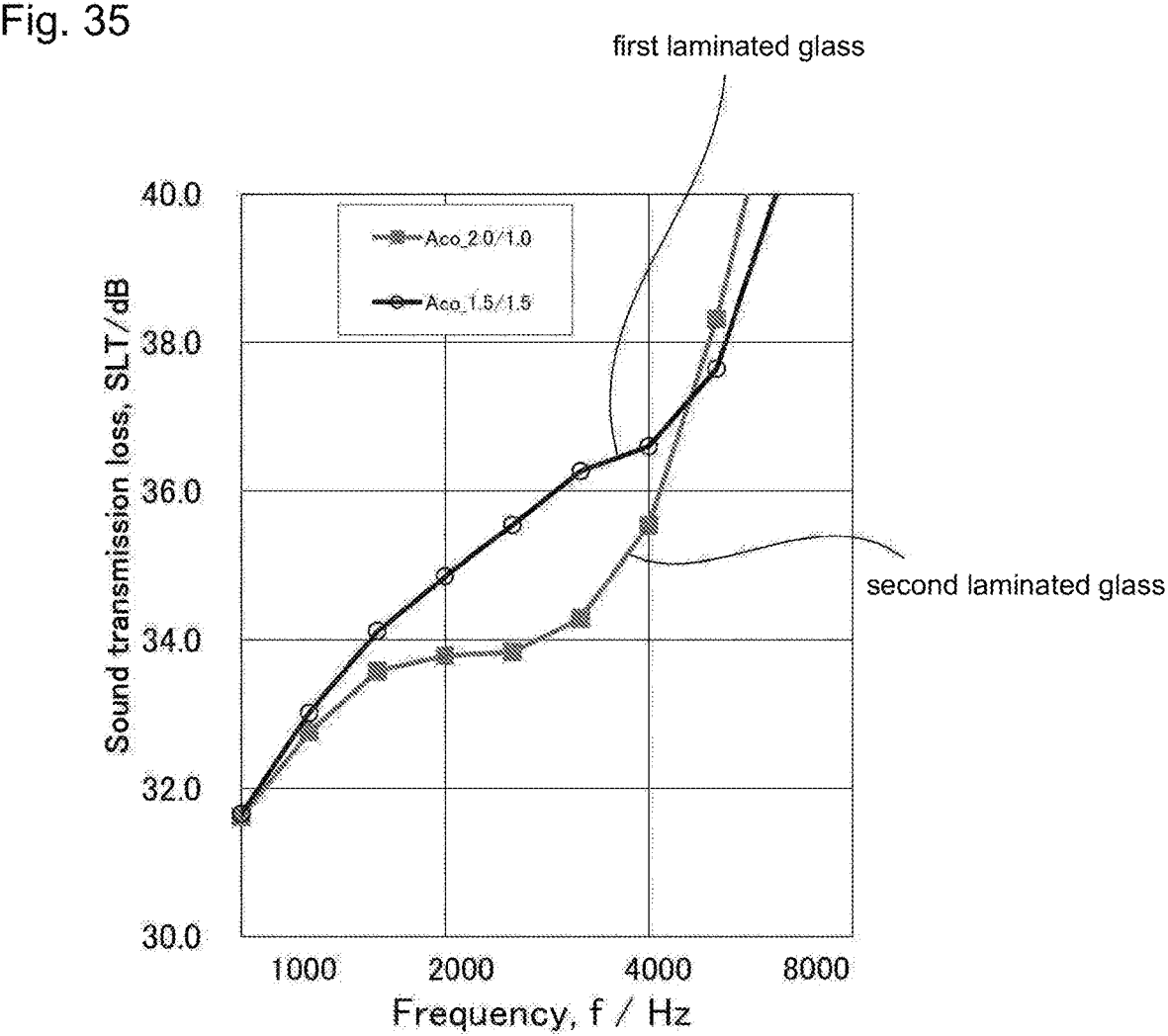
FIG. 35 is a graph showing a relationship between frequency and sound transmission loss with respect to a conventional laminated glass.
Figure 36:
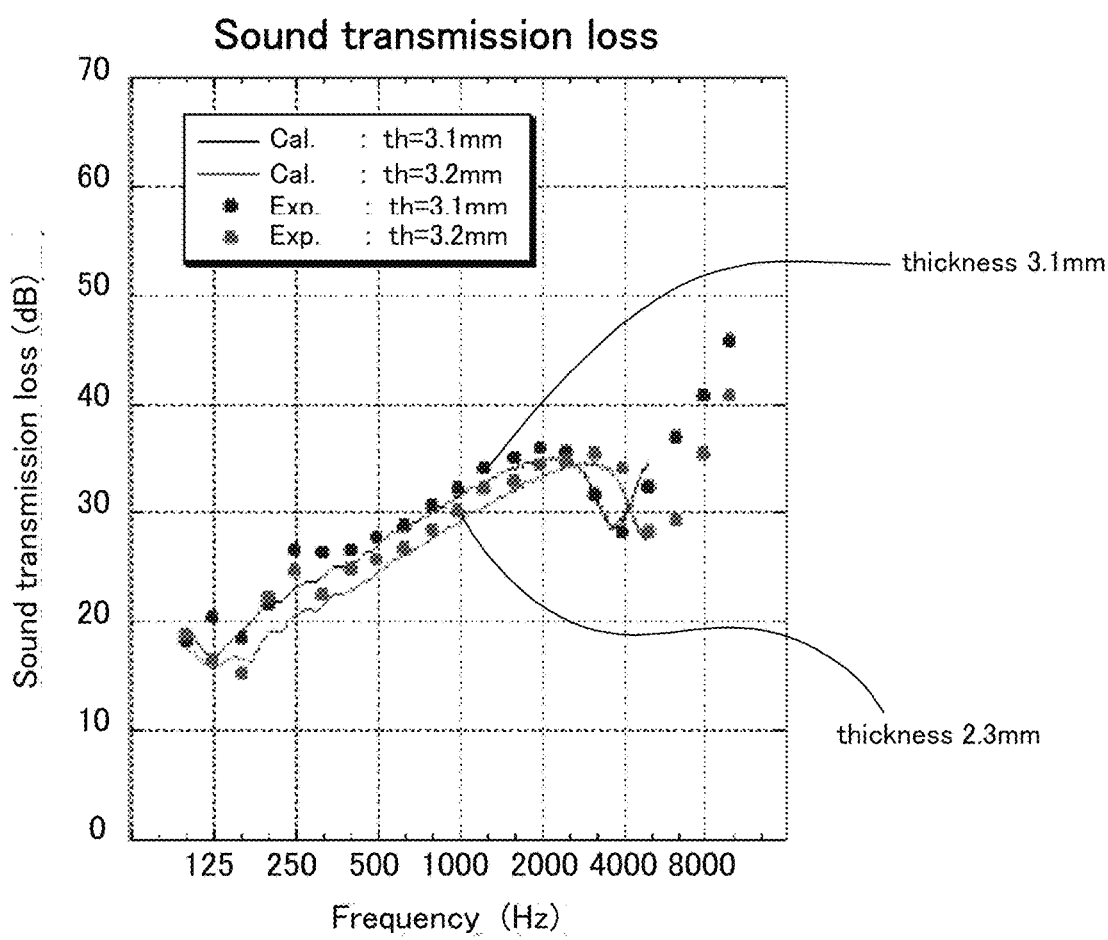
FIG. 36 is a graph showing a relationship between frequency and sound transmission loss with respect to pieces of conventional single-sheet glass.
Figure 37:
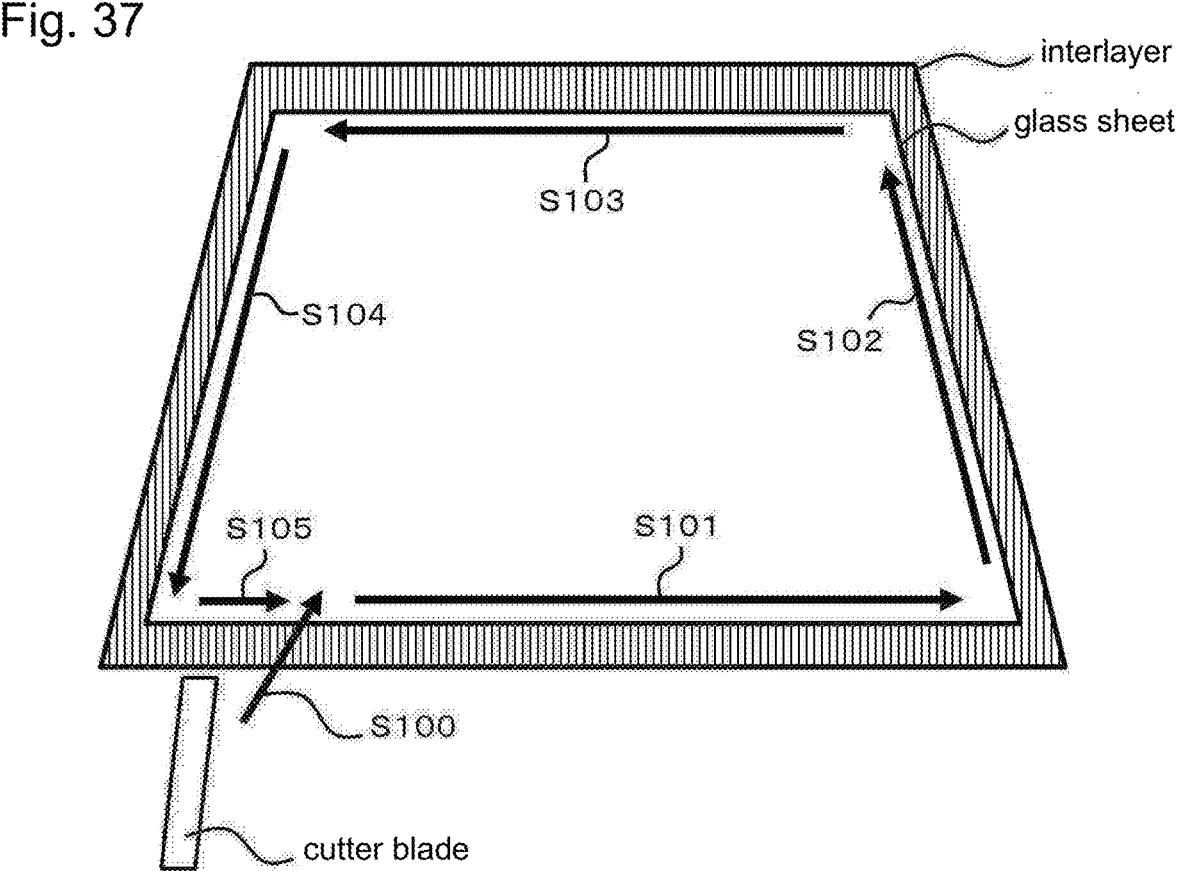
FIG. 37 shows an example of an edge cutting step according to a conventional example.

The results are as shown in FIG. 34. It was found that the Young's modulus of the core layer is reduced in this test B, but as in Evaluation 1, when the Young's modulus of each of the outer layers is increased, the STL in a high frequency range significantly increases, and the sound insulation performance in this frequency range is significantly improved. It was also found that the Young's modulus of the core layer in this test B is set to half of that in Evaluation 1, and this causes the STL in the frequency range of 1000 to 3500 Hz to slightly increase.

Accordingly, it was found that when the Young's modulus of each of the outer layers was increased, the STL in a high frequency range increased, and thus the sound insulation performance was improved. It was also confirmed that the Young's modulus of the core layer was reduced, the sound insulation performance in the frequency range of 1000 to 3500 Hz was improved.

REFERENCE SIGNS LIST

1 Outer glass sheet
2 Inner glass sheet
3 Interlayer
31 Core layer
32 Outer layer

The invention claimed is:

1. A laminated glass including:
an outer glass sheet;
an inner glass sheet arranged opposite to the outer glass sheet; and
an interlayer arranged between the outer glass sheet and the inner glass sheet;
wherein the interlayer comprises indium tin oxide (ITO) fine particles,
wherein a transmittance with respect to light having a wavelength of 700 to 800 nm is 40% or more and 60% or less,
wherein the interlayer includes a core layer, and a first outer layer and a second outer layer between which the core layer is sandwiched and that each have a higher hardness than that of the core layer,
wherein the ITO fine particles are contained in at least one of the first outer layer and the second outer layer, and
wherein the content of the ITO fine particles in the first outer layer is larger than the content of the ITO fine particles in the second outer layer.

2. The laminated glass according to claim 1,
wherein at least the second outer layer out of the first outer layer and the second outer layer has a Young's modulus of 560 MPa or more at a frequency of 100 Hz and a temperature of 20° C.

3. The laminated glass according to claim 1,
wherein the first outer layer is arranged on the outer glass sheet side.

4. The laminated glass according to claim 1,
wherein the core layer has a Young's modulus of 18 MPa or less at a frequency of 100 Hz and a temperature of 20° C.

5. The laminated glass according to claim 1,
wherein the core layer has a Young's modulus of 14 MPa or less at a frequency of 100 Hz and a temperature of 20° C.

6. The laminated glass according to claim 1,
wherein the core layer has a tan δ of 0.9 or less at a frequency of 100 Hz and a temperature of 20° C.

7. The laminated glass according to claim 1,
wherein the outer layer arranged on the outer glass sheet side has a larger Young's modulus than that of the outer layer arranged on the inner glass sheet side.

8. The laminated glass according to claim 1,
wherein the thickness of the outer glass sheet is different from the thickness of the inner glass sheet.

* * * * *